(12) United States Patent
Hikem et al.

(10) Patent No.: US 12,251,723 B2
(45) Date of Patent: Mar. 18, 2025

(54) METERING APPARATUS FOR DISPENSING HOUSEHOLD, POOL, AND INDUSTRIAL FLUIDS AND METHODS FOR MAKING AND USING SAME

(71) Applicant: Hiketron Inc., Sealy, TX (US)

(72) Inventors: Aziz Hikem, Sealy, TX (US); Tara Lee Hikem, Sealy, TX (US)

(73) Assignee: Hiketron Inc., Houston, TX (US)

( * ) Notice: Subject to any disclaimer, the term of this patent is extended or adjusted under 35 U.S.C. 154(b) by 0 days.

(21) Appl. No.: 18/405,039

(22) Filed: Jan. 5, 2024

(65) Prior Publication Data

US 2024/0226928 A1   Jul. 11, 2024

Related U.S. Application Data

(62) Division of application No. 17/018,824, filed on Sep. 11, 2020, now Pat. No. 11,865,566.

(51) Int. Cl.
| | |
|---|---|
| *C02F 1/68* | (2023.01) |
| *B05B 7/04* | (2006.01) |
| *B05B 7/12* | (2006.01) |
| *C02F 103/42* | (2006.01) |
| *D06F 33/37* | (2020.01) |
| *D06F 34/28* | (2020.01) |
| *D06F 39/02* | (2006.01) |
| *D06F 105/42* | (2020.01) |

(52) U.S. Cl.
CPC .......... *B05B 7/0408* (2013.01); *B05B 7/1254* (2013.01); *C02F 1/686* (2013.01); *D06F 33/37* (2020.02); *D06F 34/28* (2020.02); *D06F 39/022* (2013.01); *C02F 2103/42* (2013.01); *C02F 2209/006* (2013.01); *C02F 2209/40* (2013.01); *C02F 2307/12* (2013.01); *D06F 2105/42* (2020.02)

(58) Field of Classification Search
CPC ........ C02F 1/686; C02F 1/68; C02F 2103/42; C02F 2209/006; C02F 2209/40; C02F 2209/00; C02F 2307/12; B05B 7/0408; B05B 7/1254; B05B 7/04; B05B 7/12; B05B 12/008; B05B 9/0866; B05B 9/0872; B05B 9/0861; B05B 15/40; B67D 7/02; B67D 7/0227; D06F 33/37; D06F 34/28; D06F 34/05; D06F 34/32; D06F 39/022; D06F 39/088; D06F 39/02; D06F 2105/42; D06F 2105/60; D06F 2101/00; D06F 2103/22; G16H 20/10
USPC ......................................... 210/739
See application file for complete search history.

(56) References Cited

U.S. PATENT DOCUMENTS

| | | | |
|---|---|---|---|
| 8,950,447 B2 * | 2/2015 | De Rosa | B05B 11/0038 141/285 |
| 2015/0283570 A1 * | 10/2015 | West | F04B 17/06 239/373 |
| 2017/0202411 A1 * | 7/2017 | Bouton | B05B 1/28 |

* cited by examiner

*Primary Examiner* — Akash K Varma
(74) *Attorney, Agent, or Firm* — Robert W. Strozier

(57) ABSTRACT

Apparatuses for dispensing household fluids including a handheld device or wand including a pump for dispensing one or more household fluids at a rate and for a time sufficient to dispense a pre-determined or variable amount of the fluids into an appliance, and to methods for making and using same. Apparatuses for dispensing pool chemicals including pool chemical containers, pool chemical sensors, and pumps for introducing pool chemical into pool water on a periodically basis.

16 Claims, 48 Drawing Sheets

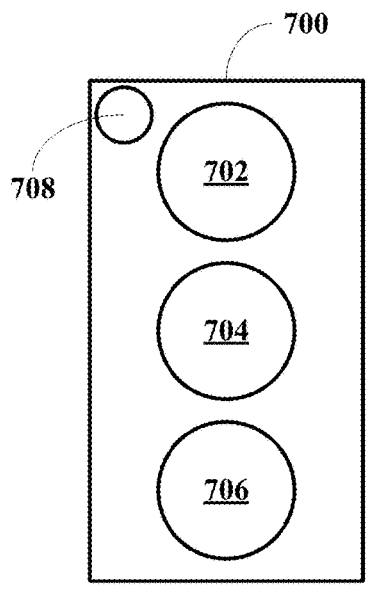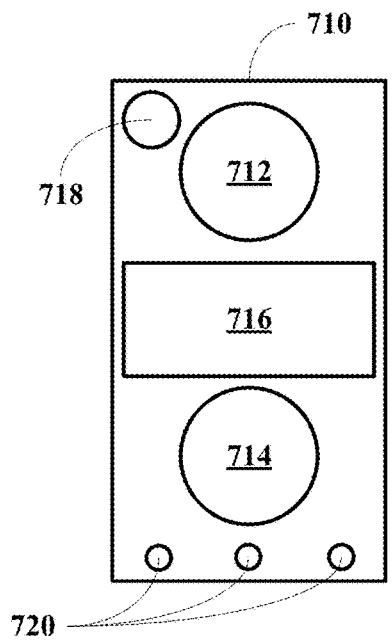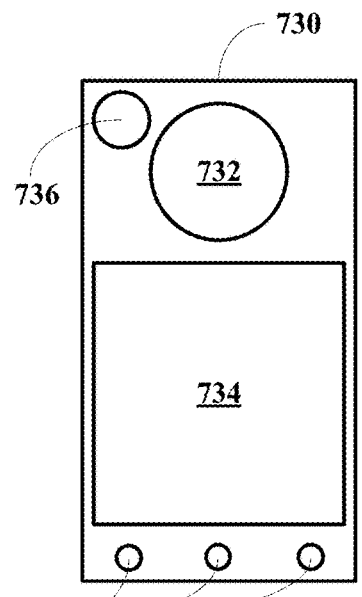
FIG. 7A  FIG. 7B  FIG. 7C
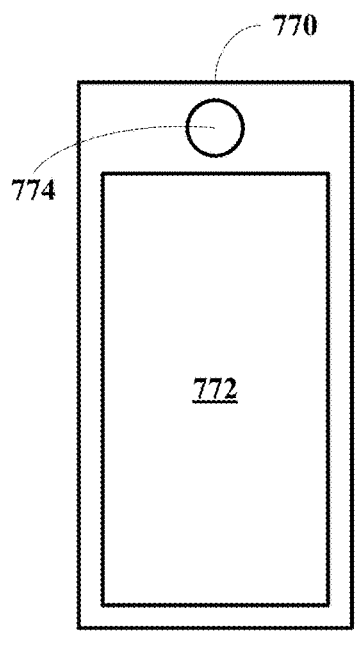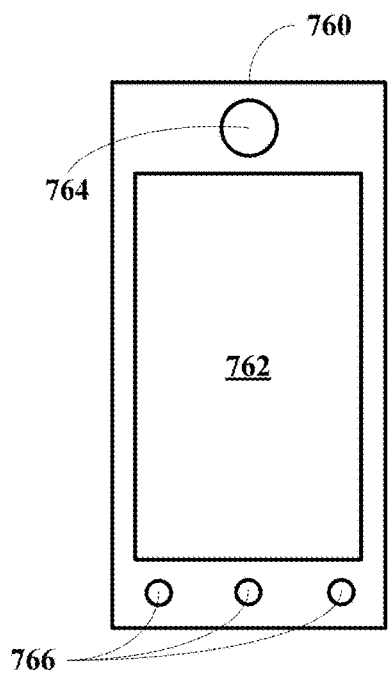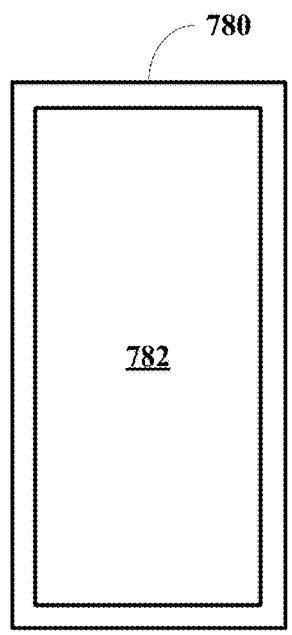
FIG. 7D  FIG. 7E  FIG. 7F

FIG. 12A  FIG. 12B

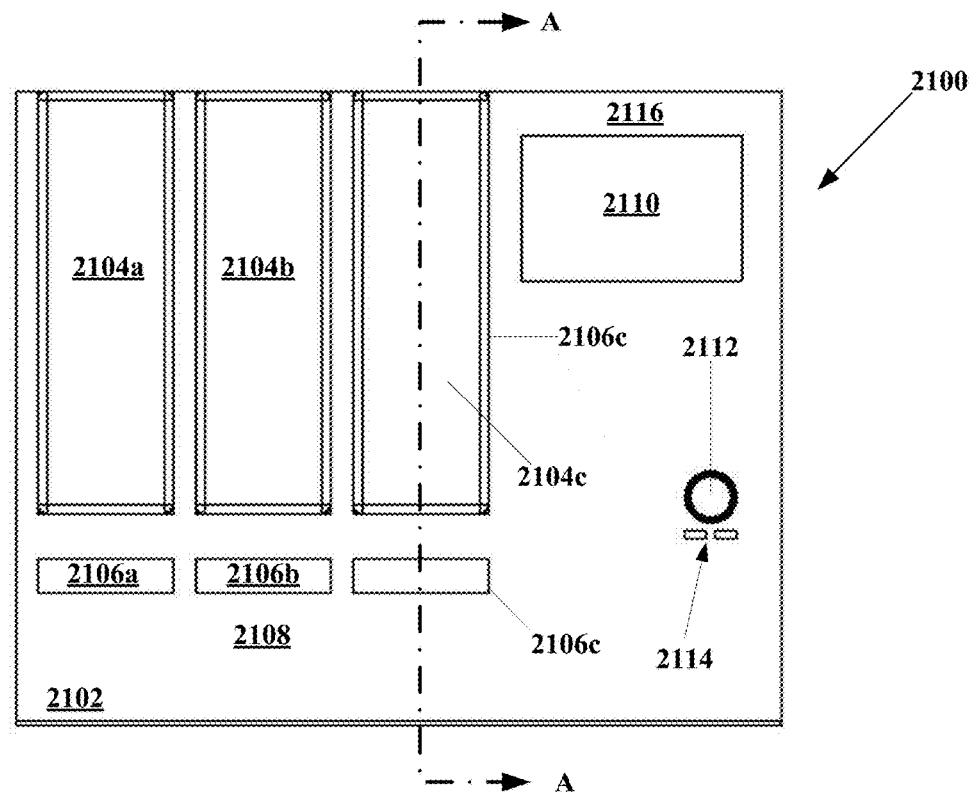
FIG. 21C
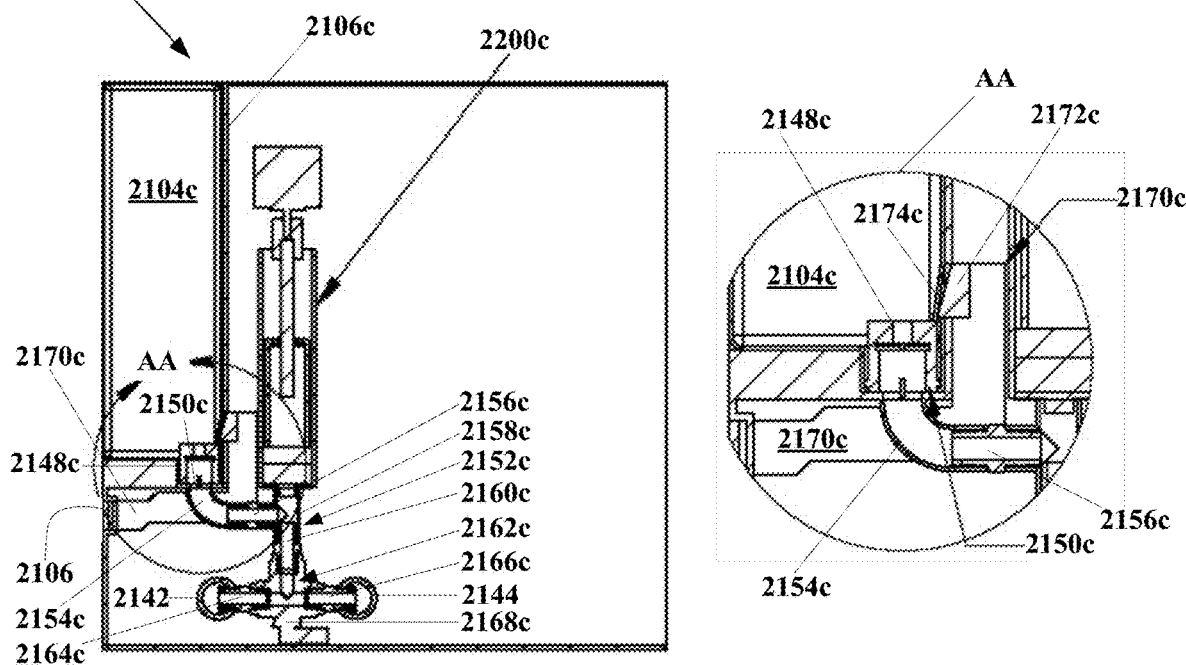
FIG. 21D  FIG. 21E

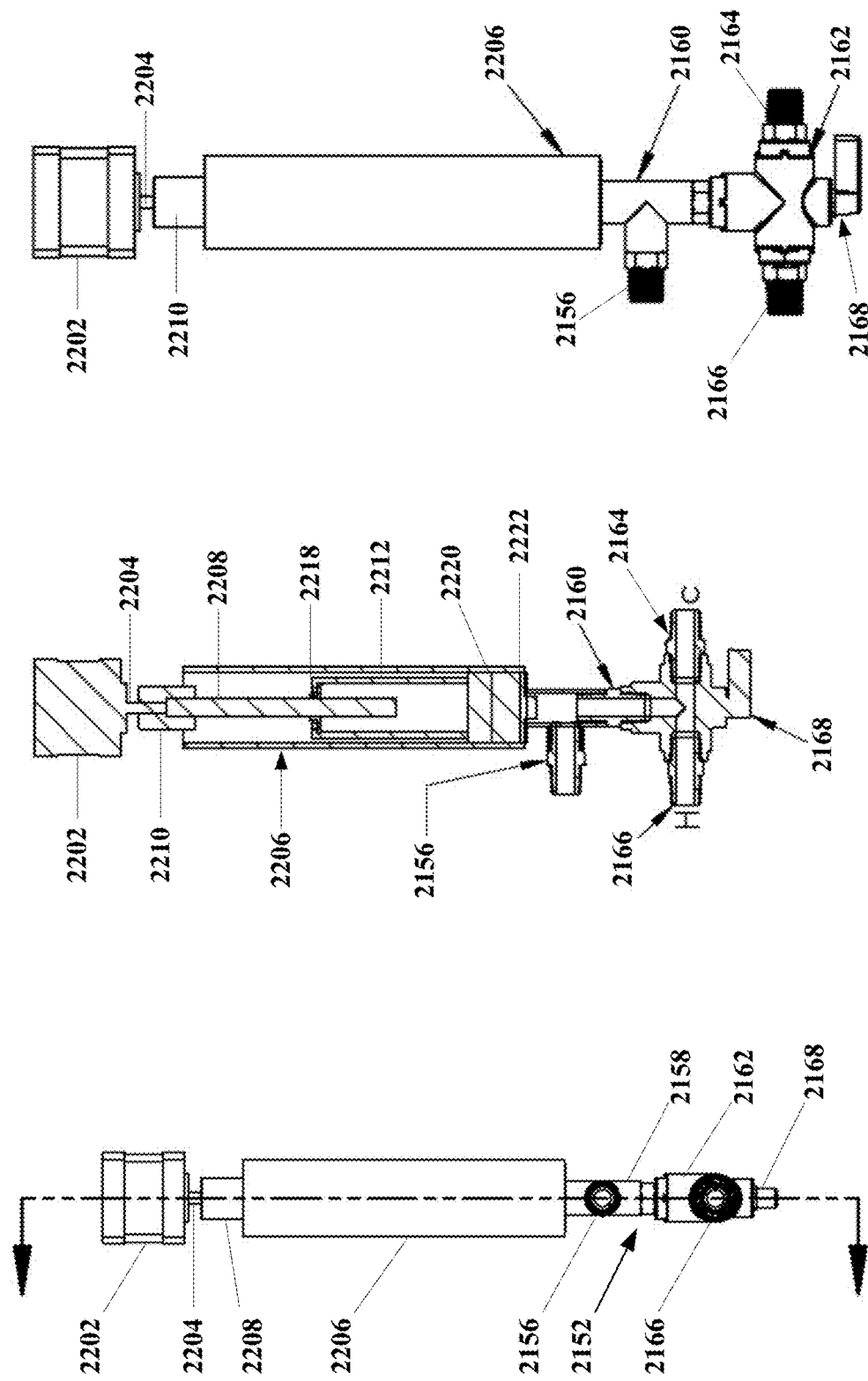

METERING APPARATUS FOR DISPENSING HOUSEHOLD, POOL, AND INDUSTRIAL FLUIDS AND METHODS FOR MAKING AND USING SAME

RELATED APPLICATIONS

This application is a division of U.S. patent application Ser. No. 17/018,824 filed Sep. 11, 2020 (11 Sep. 2020), now U.S. Pat. No. 11,865,566 issued Jan. 9, 2024 (9 Jan. 2024).

BACKGROUND OF THE DISCLOSURE

1. Field of the Disclosure

Embodiments of the present disclosure relate to apparatuses for dispensing a household fluid including a handheld device or wand or a dispensing unit and a handheld device or wand, and to methods for making and using same.

In particular, embodiments of the present disclosure relate to apparatuses for dispensing laundry detergent including a handheld device or wand including a pump or a dispensing unit including a pump and a wand for dispensing a household fluid at a rate and for a time sufficient to dispense a pre-determined or variable amount of the fluid to a household appliance, and to methods for making and using same.

2. Description of the Related Art

The problem with the current bottles is their weights once full and the complexity of handling them especially for people with disabilities, senior citizens and even normal people.

Most bottles with dispensing spouts are messy and not accurate in dispensing the liquids even though most bottles come with measuring cups, but only for one load. Some bottles are clear so you can see how much product is left, but most of the bottles are made with solid colors so you can't see how much product is left.

Deepening bleach is also a big issue, because it's a hazardous material and its affect on color when in contact with clothes.

Dispensing laundry detergent is a sloppy business. Often times users are faced with spillages, dispensing inconsistent amounts of detergent for each wash, or dispensing more or less than manufacturers recommended amount of detergent for a given load of laundry for a given machine.

Consumers don't feel fully in control when using/dosing current laundry detergent, fabric softener or any other big volume household products. Most current packages are not Intuitive to dose the correct amount; they are messy and not easy to handle and most importantly they are not flexible or adjustable to dose different volumes for varying jobs. Most consumers have difficulties in dispensing these products and usually end up overdosing them.

In addition to the lack of control, it appears that too much waste is generated in current packages and there is always product left behind or more often difficult to get out.

Consumers feel disconnected from the manufacturers of household products they use every day despite a massive social media presence.

The problem has been addressed by making smaller bottles and more lightweight bottles with different shapes and construction materials. The problem with smaller bottles is cost per ounce is high and the frequency of purchasing the product is high.

Another solution was to create a washing machines with integrated reservoirs to be filled with liquids and to be dispensed internally just like water. The issue is that this technology has some limitations because of the moving parts of the washing machine and even if this model will become popular it will take many years before all the existing washing machines will be converted.

Blending concentrated products also has been offered as another way to minimize cost and save storage space. The issue with this method is that most products are too thick and they present challenges in their manufacturing process and they do not dissolve as good.

Others offered combined products such as softener and laundry detergent. The issue with these products is that they are not as effective as if they are dispensed separately because of their competing and incompatible chemistries. Most softeners are usually acidic in nature and most laundry detergent is basic in nature.

While many apparatuses and methods have been purposed for controlling the amount of household fluid dispensed from a household fluid container into a household appliance prior to running the appliance, there is still a need in the art for improved systems and methods for dispensing household fluid to household appliances

SUMMARY OF THE DISCLOSURE

Embodiments of this disclosure provide apparatuses including at least one cap for engaging at least one container, where one container contains a household fluid, having a dip tube, a handheld fluid metering device or a wand including a processing unit or a microprocessing unit having wireless communication hardware and software, a pump, optionally a flow meter, optionally a flow controller, a power supply, at one fluid inlet, a fluid outlet, at least one fluid conduit, and a control unit, where the processing unit or the microprocessing unit, the pump, the optional flow meter, the optional flow controller, the control unit, and the power supply are in electrical communication and where the pump and the flow meter are under the control of the processing unit. In certain embodiments, the apparatuses include at least two caps having a dip tube and the wand further includes a mixing chamber for mixing at least two fluids together prior to being pumped through the pump and out the outlet. In certain embodiments, the household fluid is a laundry detergent. In other embodiments, one of the household fluids is a laundry detergent and another of the household fluids is water. In other embodiments, one of the household fluids is a laundry detergent, one of the household fluids is water and one of the household fluids is fabric softener, a stain removing fluid, a bleaching fluid, any other fluid used for washing clothes, or mixtures thereof.

Embodiments of this disclosure provide methods for dispensing at least one household fluid including receiving a first input from a control unit of a handheld unit associated with a household fluid dispensing apparatus of this disclosure, turning on a pump of the handheld unit, and dispensing a specific amount of the fluid into a household appliance. The methods may also include receiving a second input from the control unit corresponding to selecting the specific amount. The methods may also include outputting a signal corresponding to an amount of fluid remaining a container containing the fluid from which the fluid is dispensed. The methods also include pulling information from a website associated with the fluid to set the specific amount of fluid to be dispensed to the appliance.

Embodiments of this disclosure provide apparatuses including a dispensing unit comprising a household fluid compartment containing a household fluid and a dip tube, a handheld fluid metering device or a wand including a microprocessing unit or a microprocessor or a processor having wireless communication hardware and software, a pump, optionally a flow meter, optionally a flow controller, a power supply, at one fluid inlet, a fluid outlet, at least one fluid conduit, and a control unit, where the processing unit, the pump, the optional flow meter, the optional flow controller, the control unit, and the power supply are in electrical communication and where the pump and the flow meter are under the control of the processing unit. In certain embodiments, the apparatuses include at least two caps having a dip tube and the wand further includes a mixing chamber for mixing at least two fluids together prior to being pumped through the pump and out the outlet. In certain embodiments, the household fluid is a laundry detergent. In other embodiments, one of the household fluids is a laundry detergent and another of the household fluids is water. In other embodiments, one of the household fluids is a laundry detergent, one of the household fluids is water and one of the household fluids is fabric softener, a stain removing fluid, a bleaching fluid, any other fluid used for washing clothes, or mixtures thereof.

Embodiments of this disclosure provide methods for dispensing at least one household fluid including receiving a first input from a control unit of a handheld unit associated with a household fluid dispensing apparatus of this disclosure, turning on a pump of the handheld unit, and dispensing a specific amount of the fluid into a household appliance. The methods may also include receiving a second input from the control unit corresponding to selecting the specific amount. The methods may also include outputting a signal corresponding to an amount of fluid remaining a container containing the fluid from which the fluid is dispensed. The methods also include pulling information from a website associated with the fluid to set the specific amount of fluid to be dispensed to the appliance.

Embodiments of this disclosure provide apparatuses include a washing machine including a dispensing unit of this disclosure. Embodiments of this disclosure also provide methods for using the washing machines including a dispensing unit of this disclosure.

Embodiments of this disclosure provide apparatuses include a plurality of washing machines, each including a control panel and three fluid inlets so receiving one or three different fluids. The apparatuses also include a dispensing unit including three reservoirs, three different pump and flow controllers, three different conduits, a power supply, and a processor, where commands entered at a washing machine are transmitted to the processor that then dispensing the indicated fluids and amounts.

Embodiments of this disclosure provide methods for dispensing fluid to a plurality of washing machines in a laundry mat.

Embodiments of the apparatuses may also include a concierge button, where a customer is able to push a button or invoke a command to be connected to customer service to handle issues that may arise from using the apparatuses and methods disclosed herein.

Embodiments of the apparatuses and methods may also include a human cognizable feedback unit such as speakers or other audio devices, a display, or other audio visual devices so that customers may listen to music, watch TV or play video games while doing laundry or other household or commercial tasks.

Embodiments of the apparatuses and methods may also include realtime or substantially realtime sensors designed to alert consumers of low fluid levels so the re-ordering of product may be stream-lined and automated making re-ordering product less of a hassle. In other embodiments, the apparatus may have the capability for automated reordering, manually reordering, or ordering product on a pre-defined basis.

Embodiments of the apparatuses and methods may also include cartridges (containers) for ease of product replacement. On demand inventory control facilitated by the communication of the devices with company headquarters, which may result in consumer savings and increase economical use of household fluids as the apparatuses described herein increase fluid usage and fluid level monitoring.

Embodiments of the present disclosure may also relate to products exclusively tailored for use in the apparatuses described herein.

Embodiments of the present disclosure may also include apparatuses, systems, and methods that are adapted to collect fees for using of fluids in such settings as laundry mats. The fees may be collected using coin devices well known the art or by using credit card or bank withdrawal devices also well known in the art. In this way, the apparatuses and systems may be fully automated in locations, where the general public may utilize apparatuses incorporating the dispensing apparatuses of this disclosure, so that fees may be easily collected for dispensing fluids without having the consumer bring their own or having to purchase fluid or powders that may be added to the washing machines.

Embodiments of this disclosure also provide washing machine fluid dispensing apparatuses adapted to be attached to a washing machine or integrated into a wash machine.

Embodiments of this disclosure also provide pool chemical dispensing apparatuses.

BRIEF DESCRIPTION OF THE DRAWINGS OF THIS DISCLOSURE

The disclosure can be better understood with reference to the following detailed description together with the appended illustrative drawings in which like elements are numbered the same:

Mobile Household Fluid Dispensing Apparatuses

FIG. 7A depicts an embodiment of the control unit including buttons and a speaker.

FIG. 7B depicts another embodiment of the control unit including buttons, a slider, a speaker, and LEDs.

FIG. 7C depicts another embodiment of the control unit including buttons, a display, a speaker, and LEDs.

FIG. 7D depicts another embodiment of the control unit including a display and a speaker.

FIG. 7E depicts another embodiment of the control unit including a display, a speaker, and LEDs.

FIG. 7F depicts another embodiment of the control unit including a display.

Figure 12:
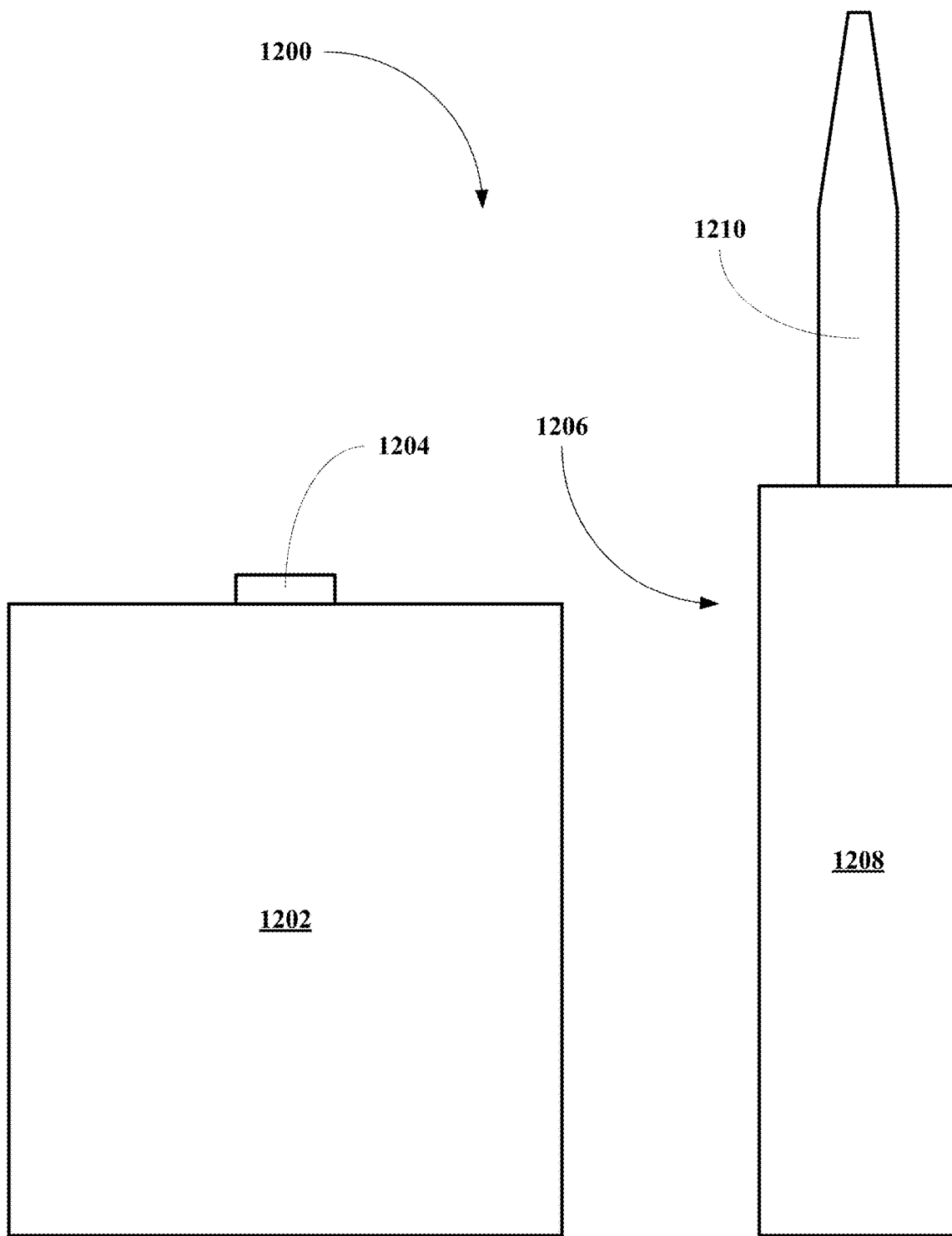

FIGS. 12A&B depicts another embodiment of a fluid dispensing apparatus of this disclosure, where the apparatus includes three fluid reservoir and a pipette.

Figure 13:
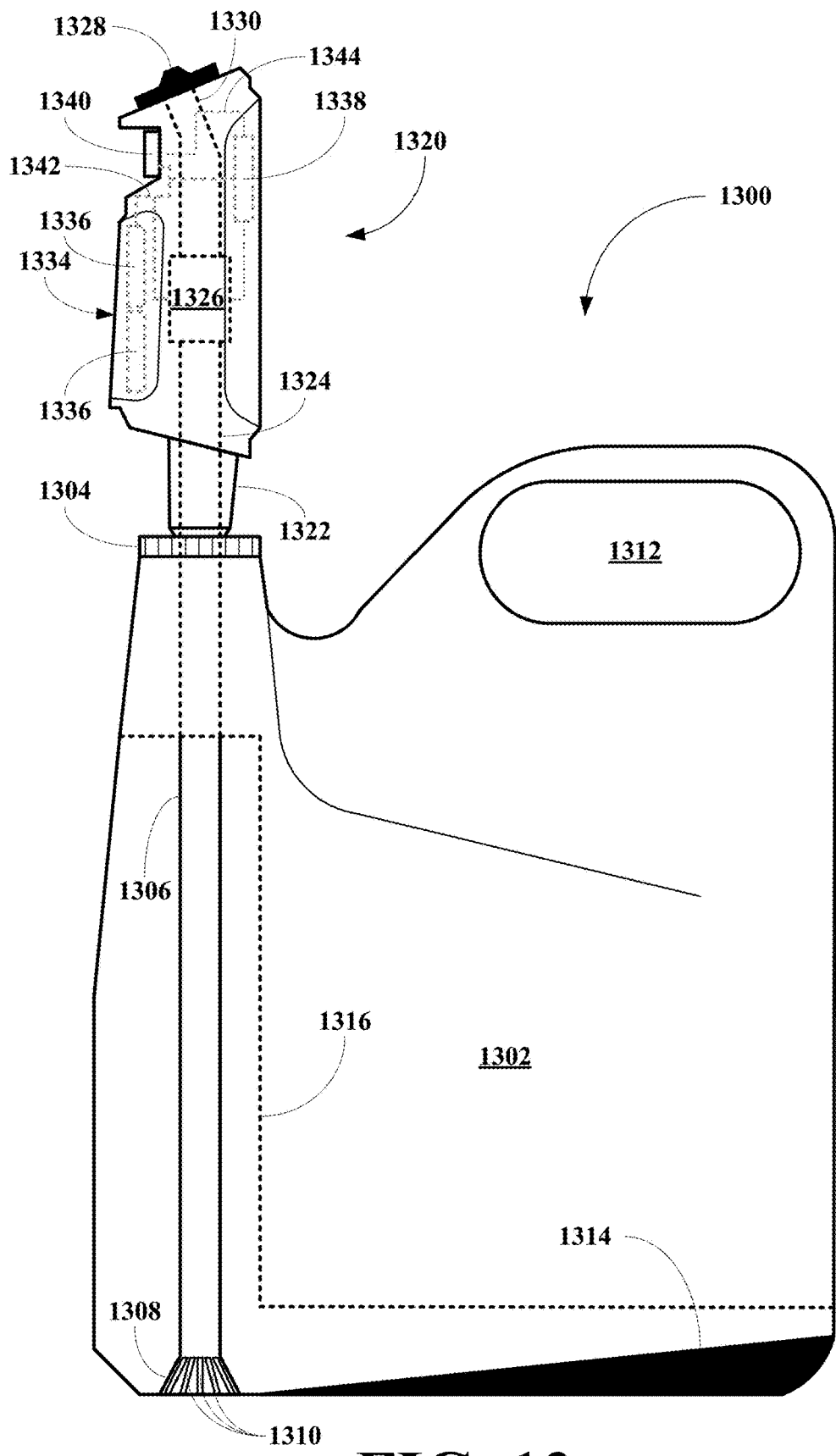

FIG. 13 depicts another embodiment of a fluid dispensing apparatus of this disclosure including a single fluid container.

Figure 14:
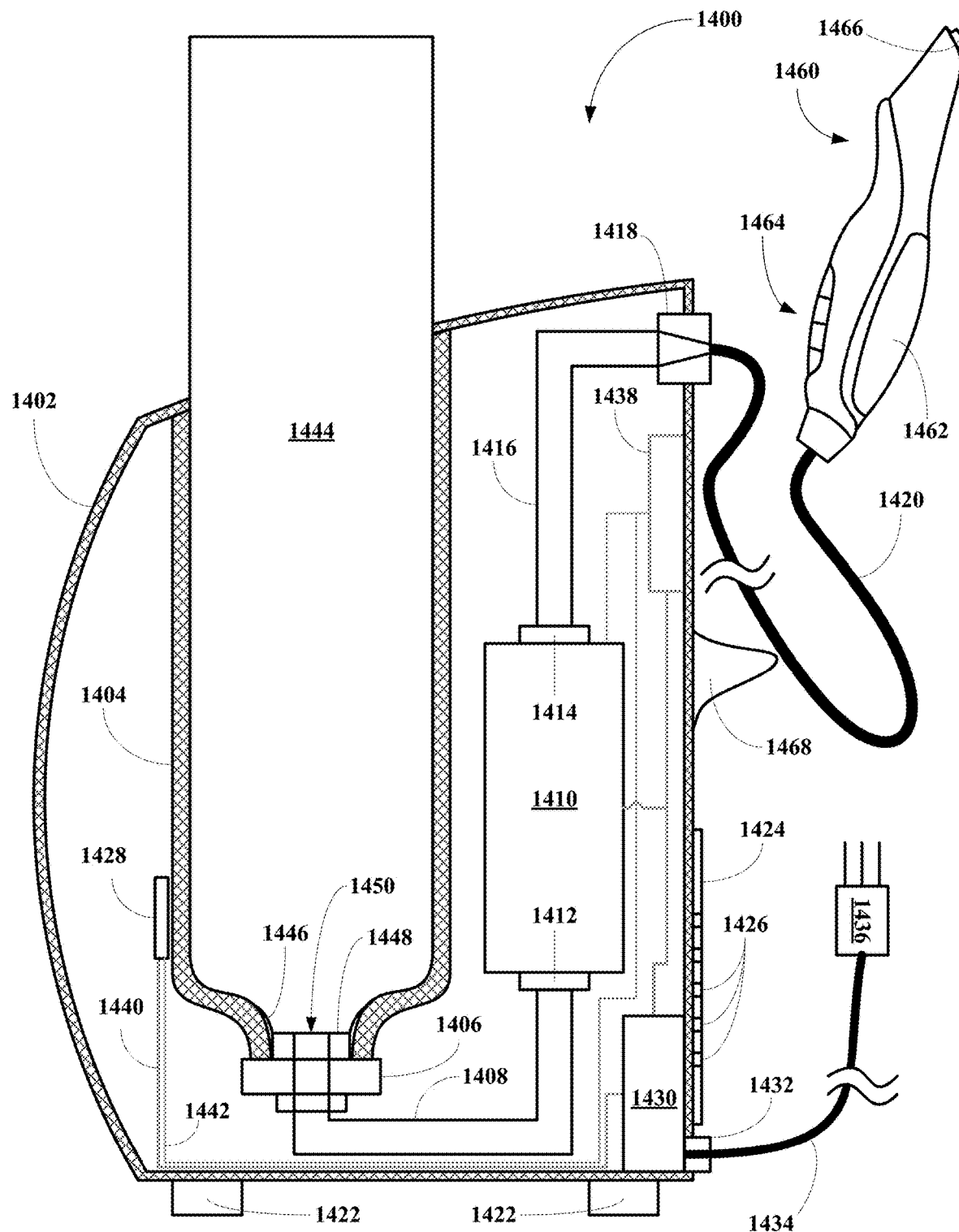

FIG. 14 depicts another embodiment of a fluid dispensing apparatus of this disclosure including a single fluid container.

Figure 15:
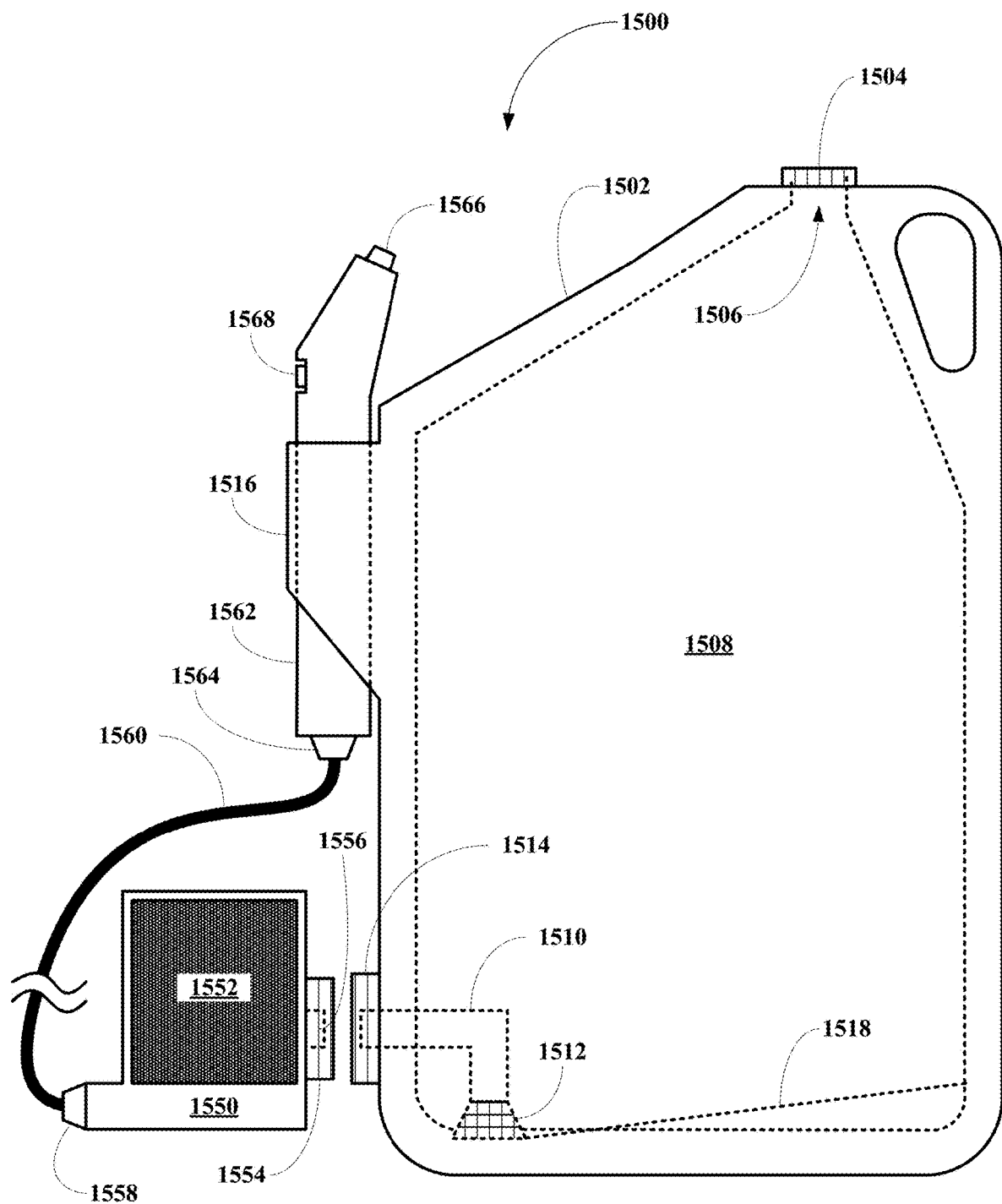

FIG. 15 depicts another embodiment of a fluid dispensing apparatus of this disclosure including a single fluid container.

Figure 16:
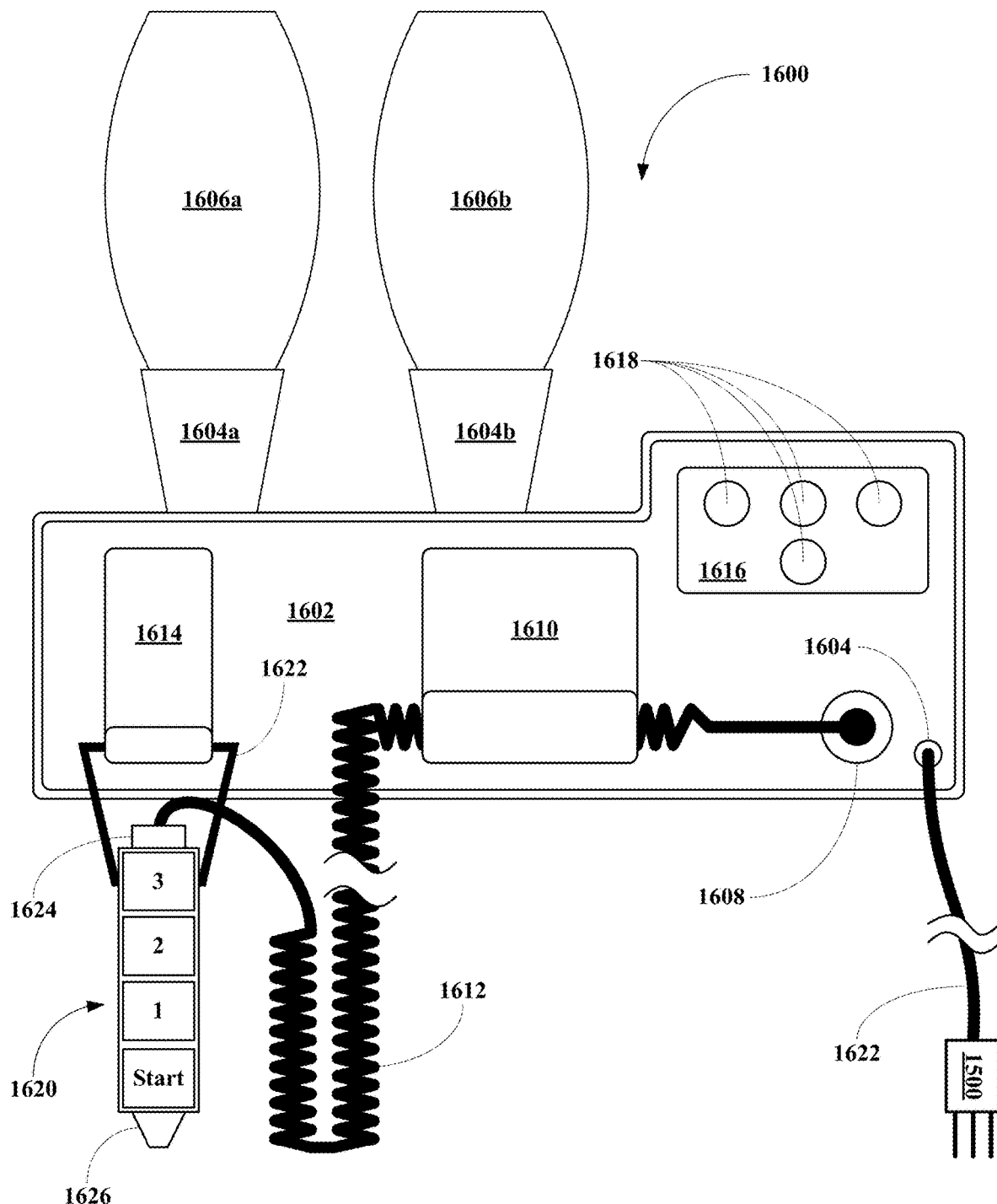

FIG. 16 depicts another embodiment of a fluid dispensing apparatus of this disclosure including two fluid containers.

Figure 17A:
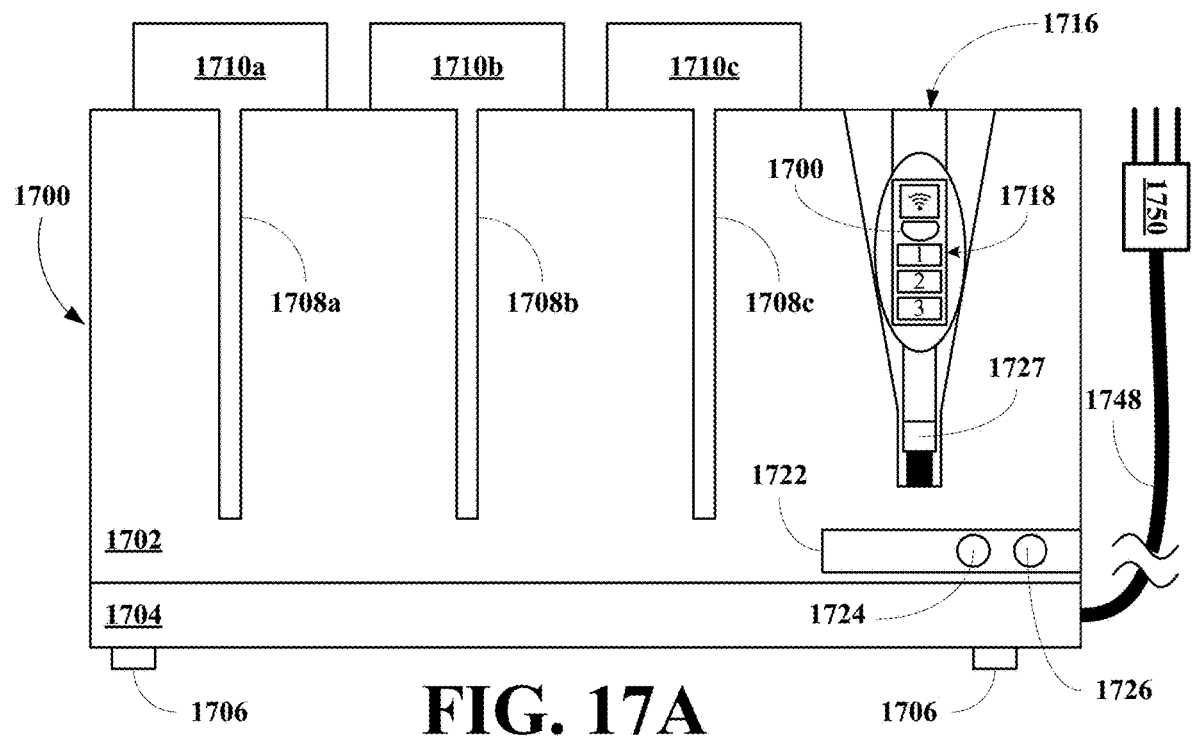

FIGS. 17A&B depict another embodiment of a fluid dispensing apparatus of this disclosure including three containers.

Figure 18:
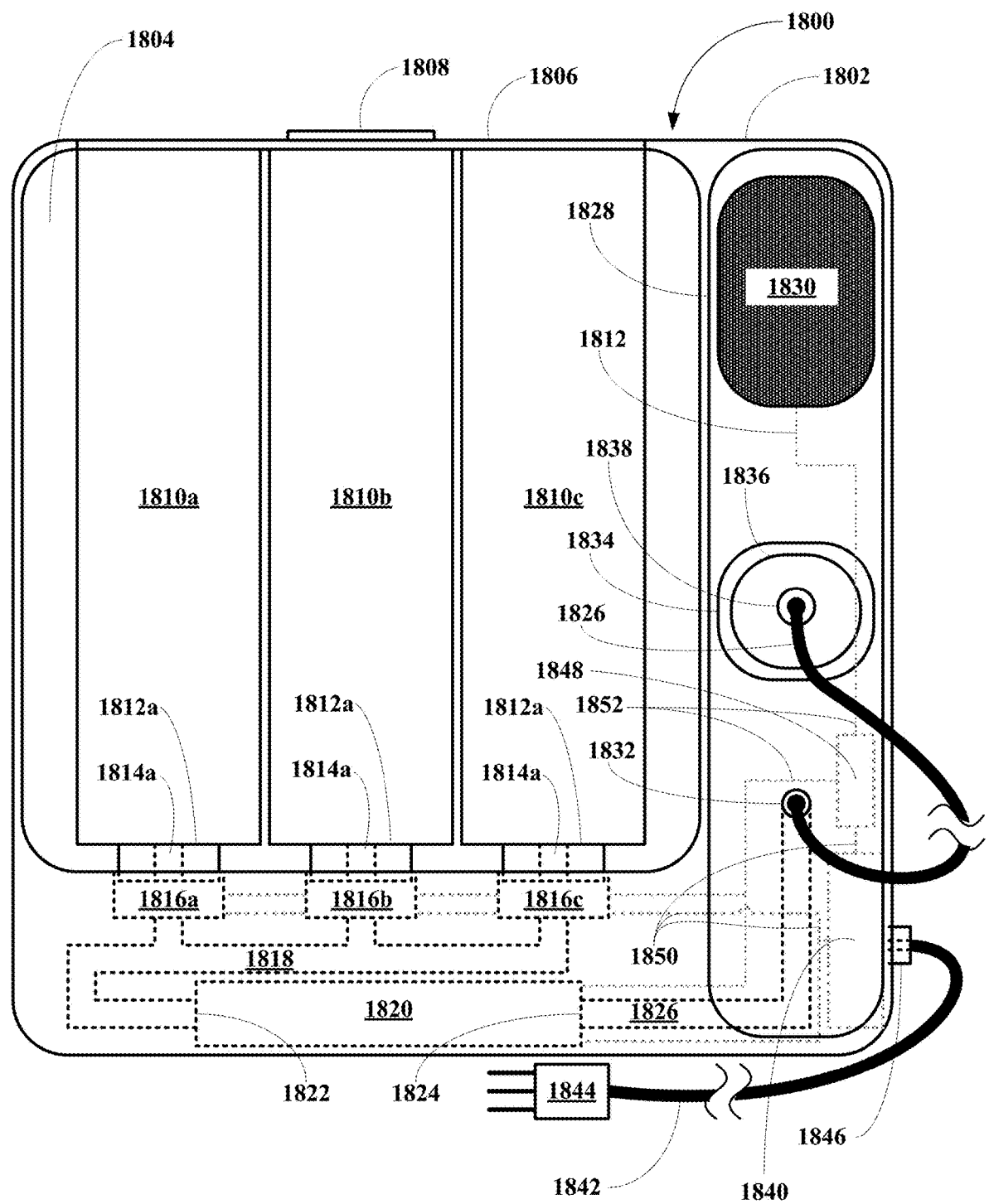

FIG. 18 depicts another embodiment of a fluid dispensing apparatus of this disclosure including three containers.

WASHING MACHINE APPARATUSES INCLUDING FLUID DISPENSING APPARATUS

Figure 19:
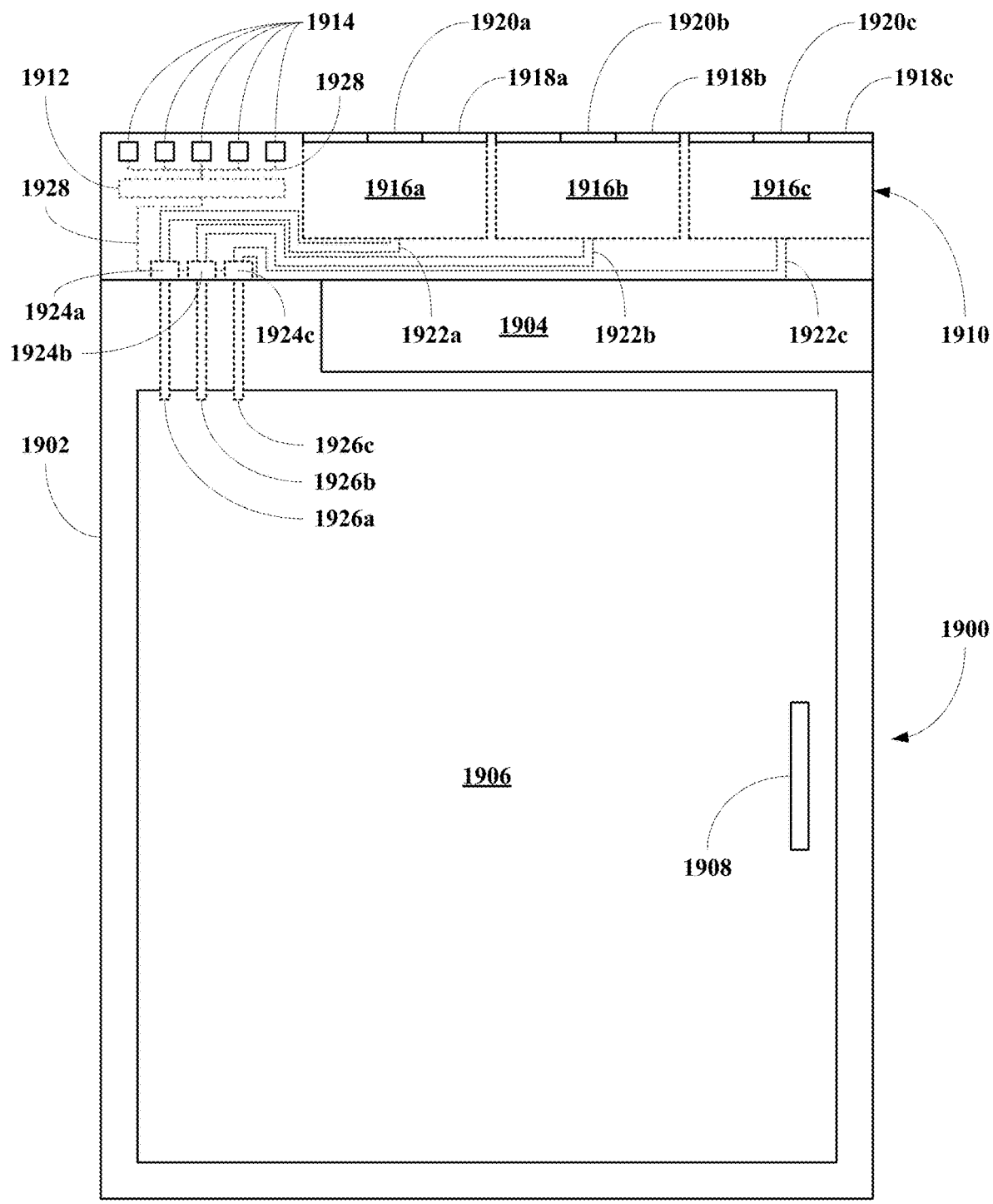

FIG. 19 depicts an embodiment of a washing machine apparatus including a fluid dispensing apparatus of this disclosure including three containers.

Figure 20A:
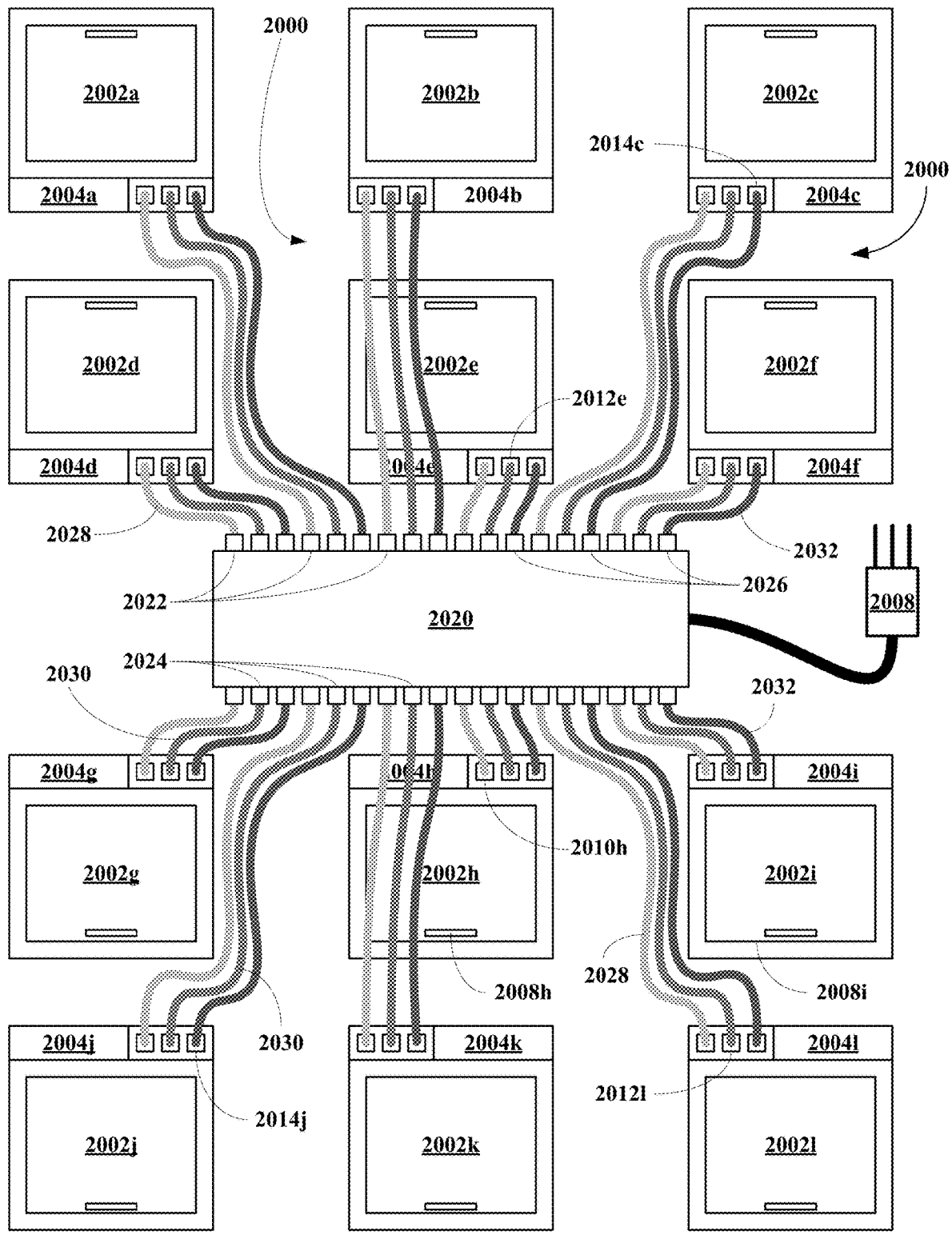

FIGS. 20A&B depict an embodiment of a washing machine fluid dispensing apparatus of this disclosure including three containers.

FIGS. 21A-H depict an embodiment of a washing machine fluid dispensing apparatus of this disclosure.

FIGS. 22A-C depict views of embodiment of the injection devices for introducing fluids into hot water and/or cold water conduits within the apparatus of FIGS. 21A-H.

Figure 23:
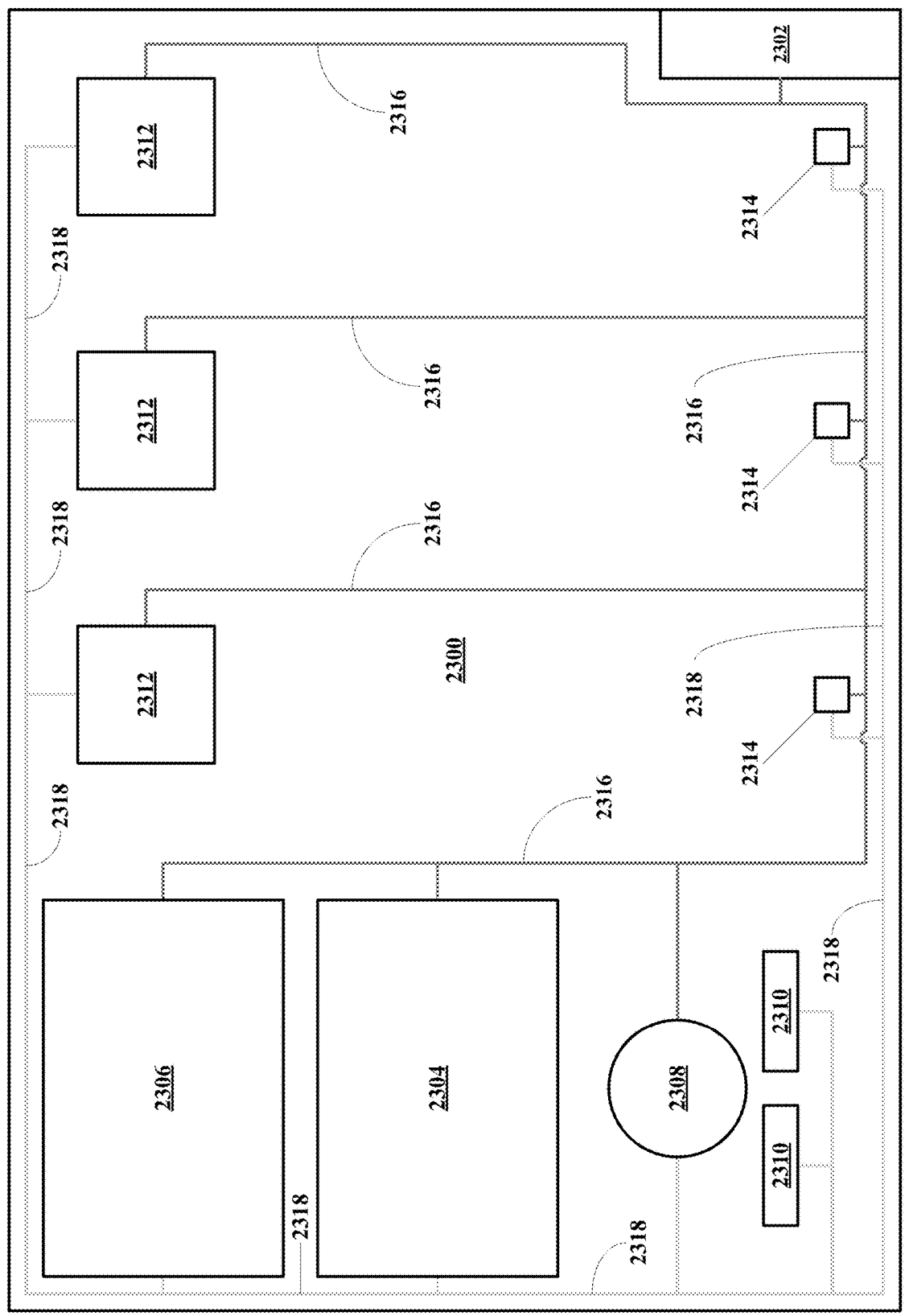

FIG. 23 depicts an embodiment of the electronics used to control the apparatuses described in FIGS. 21 and 22.

Figure 24A:
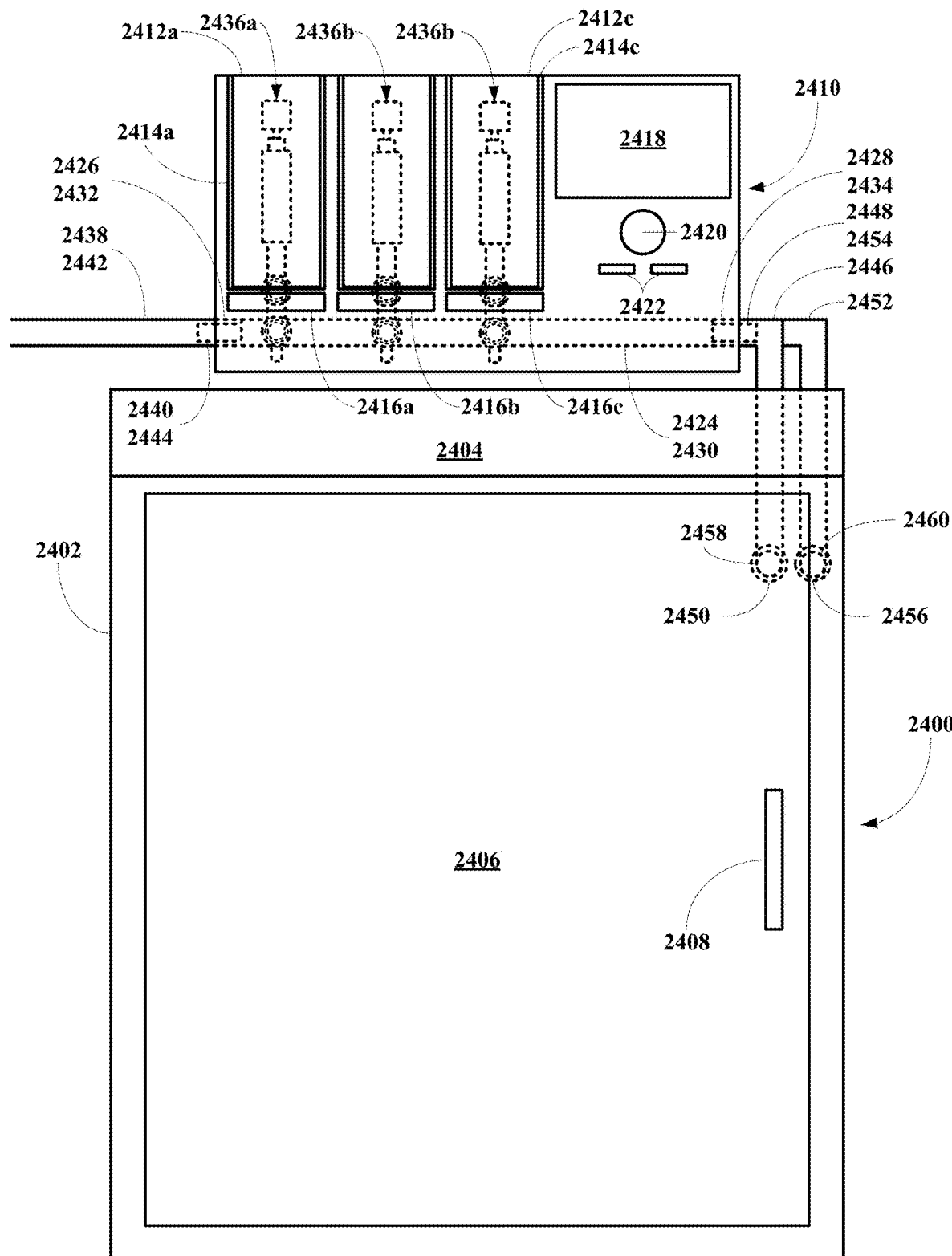
Figure 24B:
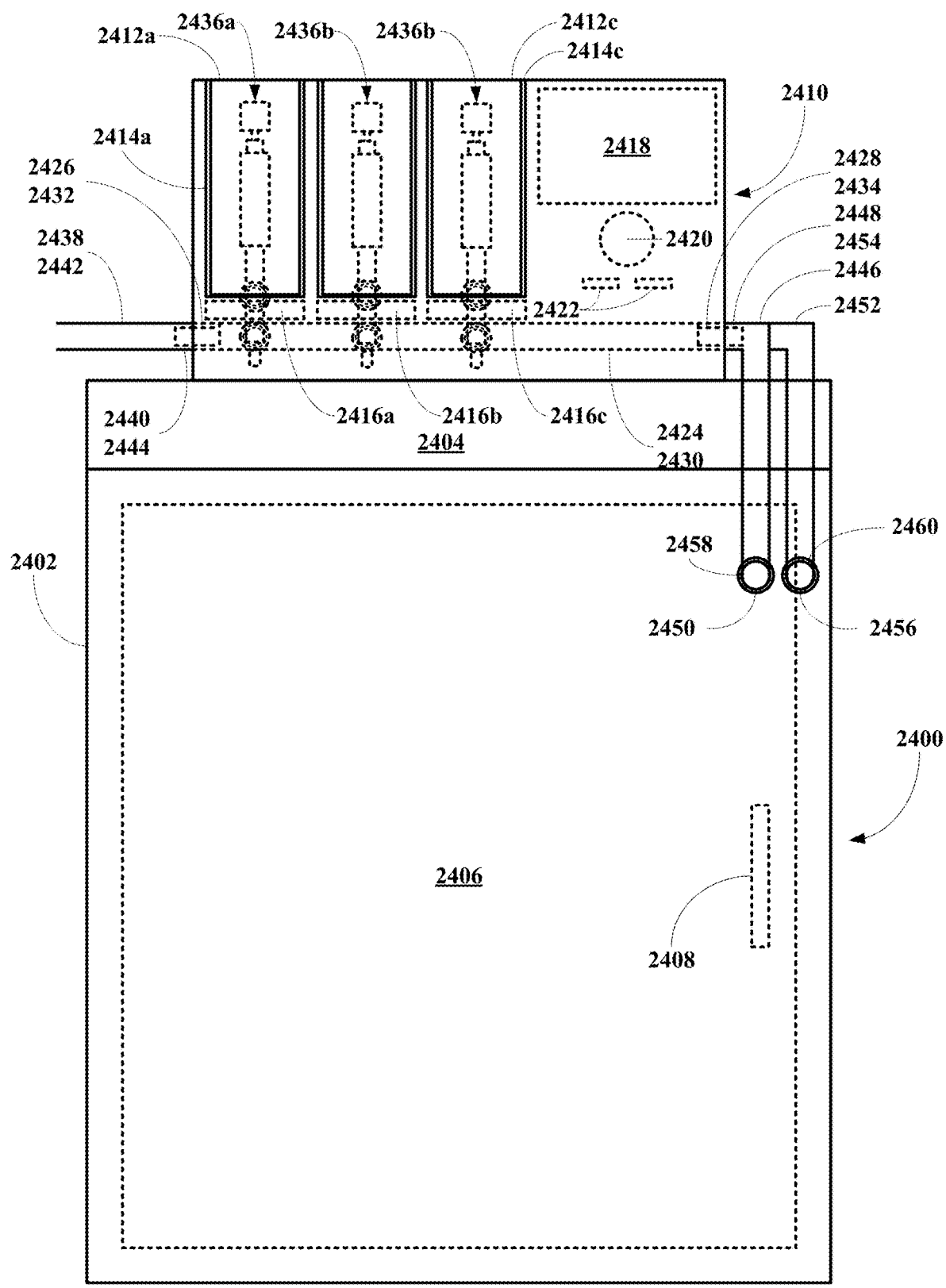

FIGS. 24A&B depict an embodiment of a washing machine including a fluid dispensing apparatus similar to the apparatuses described in FIGS. 21 and 22 attached thereto.

Figure 25A:
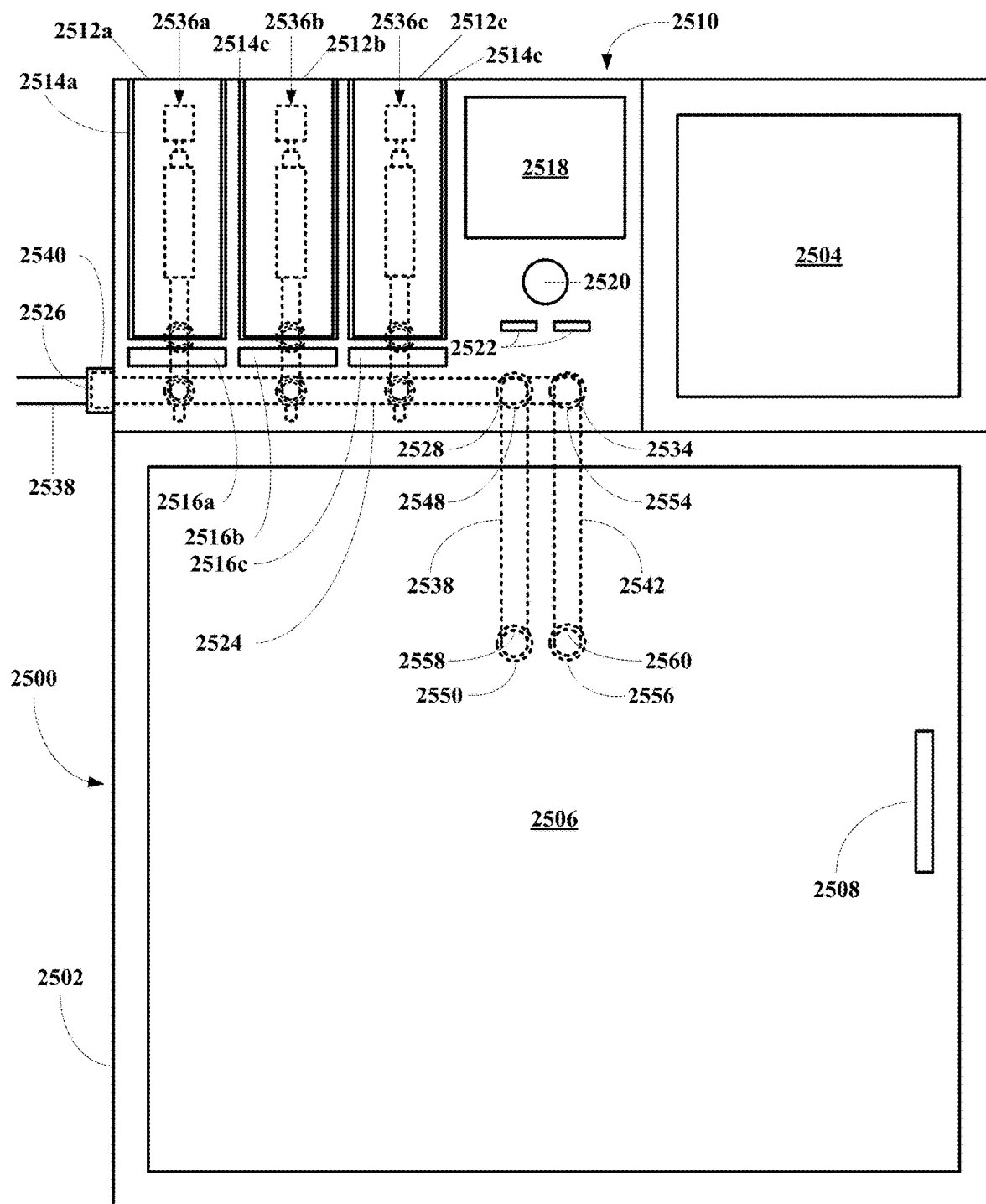

FIGS. 25A&B depict an embodiment of a washing machine including a fluid dispensing apparatus similar to the apparatuses described in FIGS. 21 and 22 integrated therewith.

Pool Chemical Sensing and Dispensing Apparatuses

Figure 26:
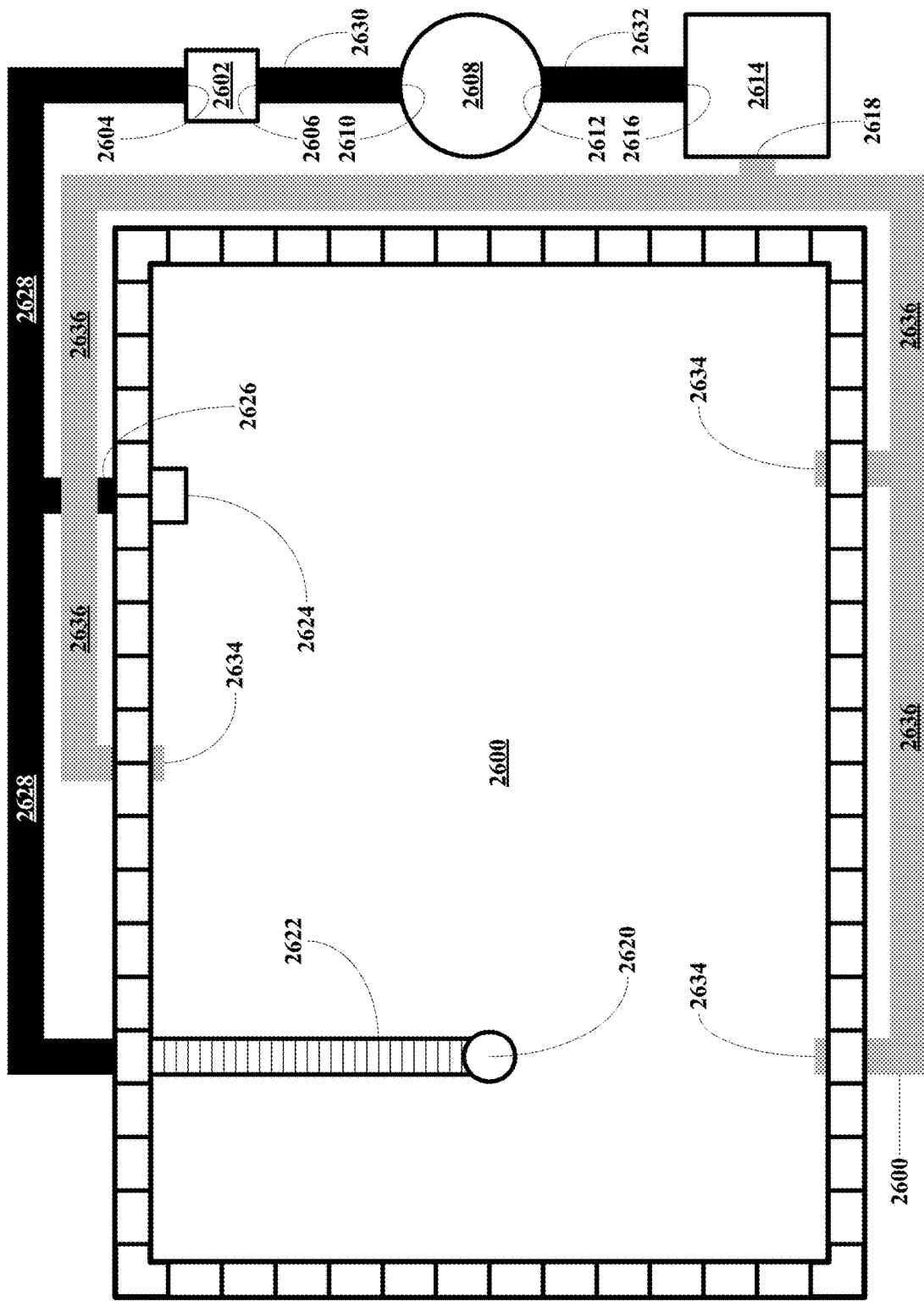

FIG. 26 depicts a pool including a pool chemical sensing and dispensing apparatus of this disclosure.

Figure 27A:
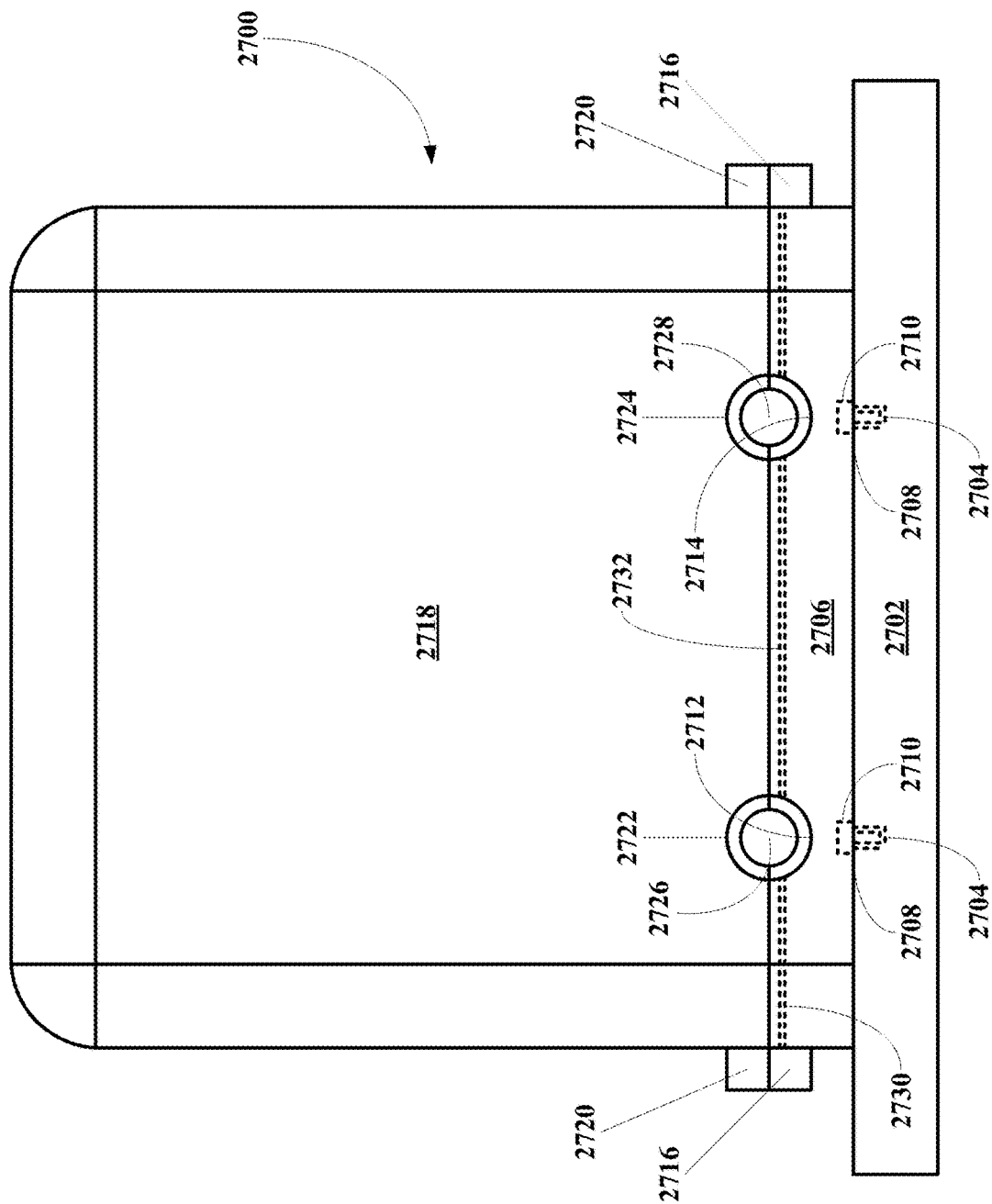
Figure 27B:
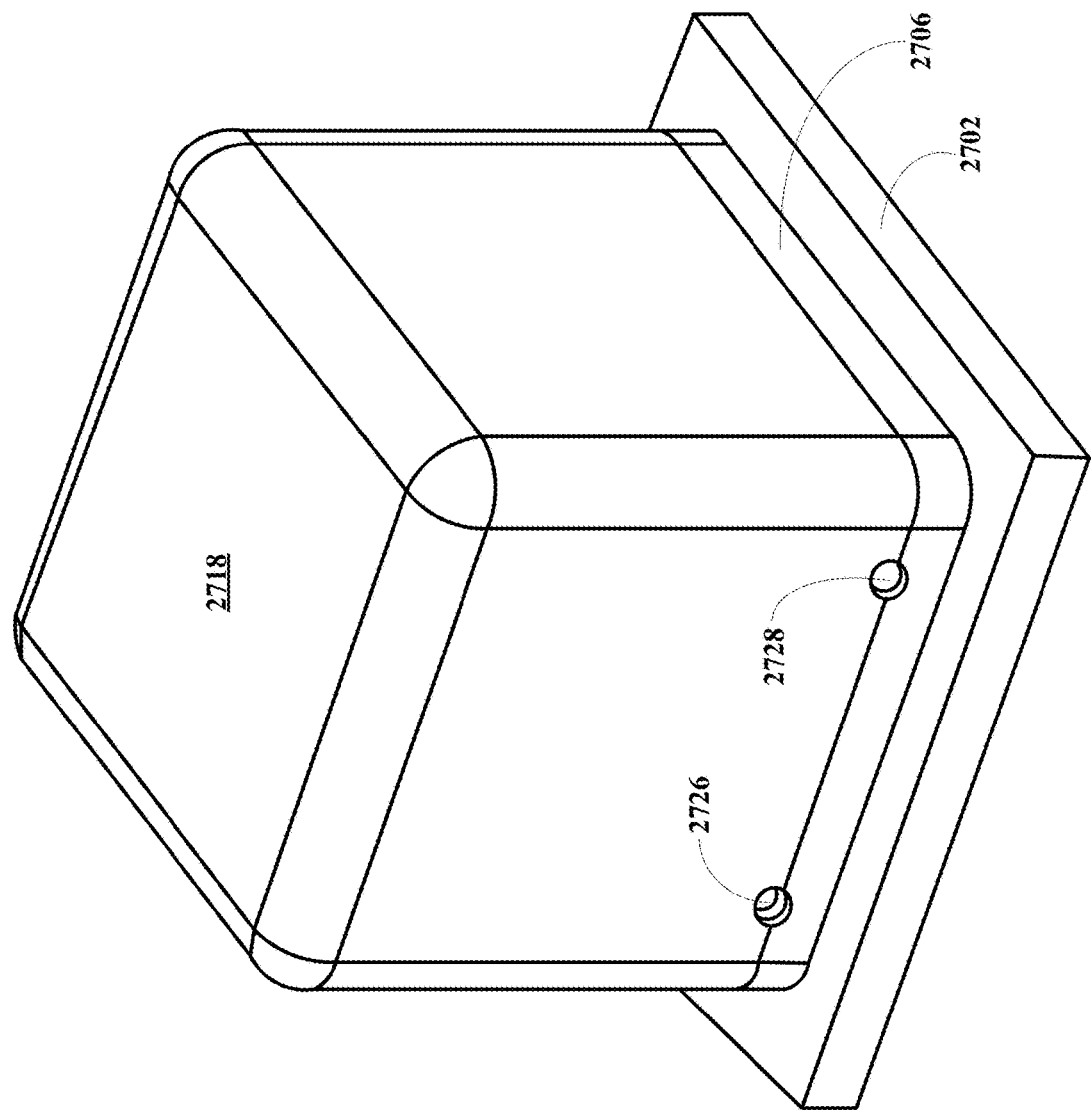
Figure 27C:
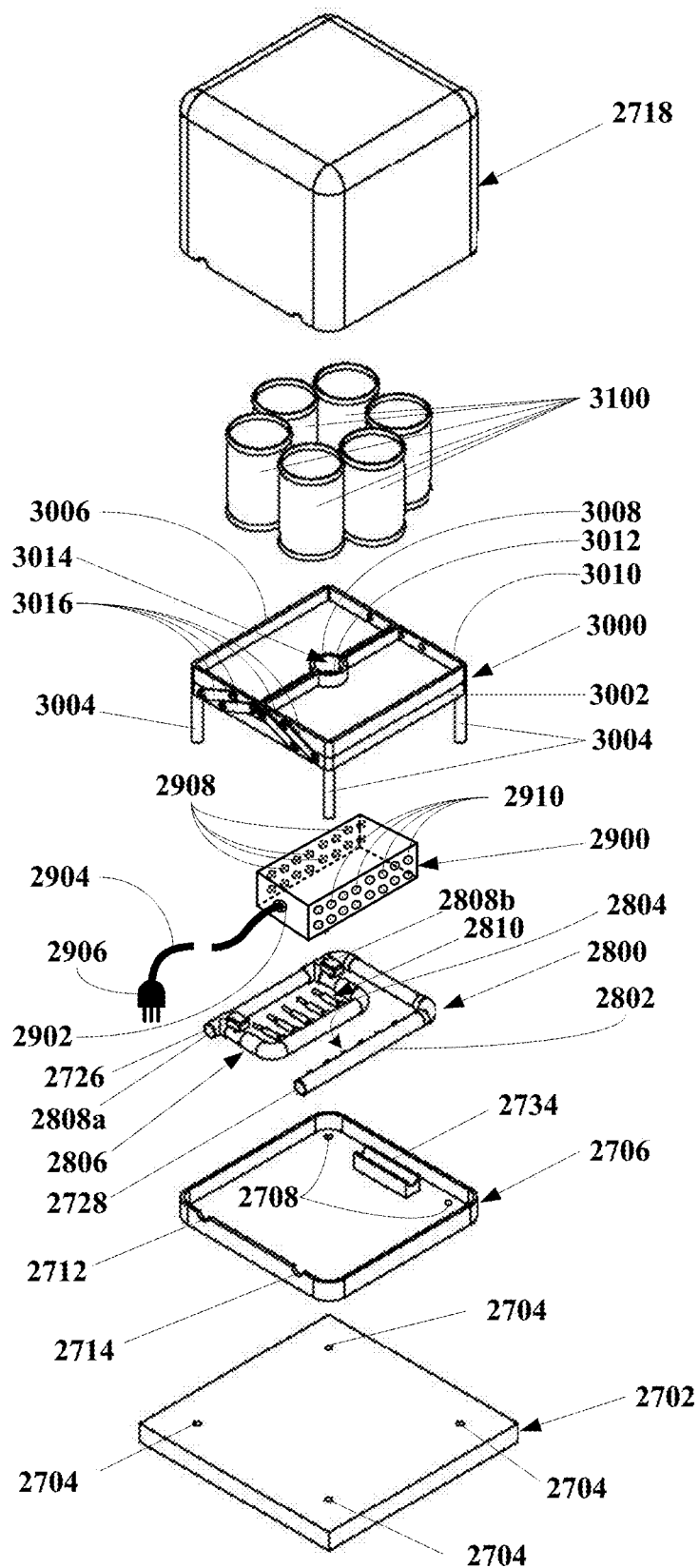

FIGS. 27A-C depict embodiments of a pool chemical hub apparatus of this disclosure.

Figure 28A:
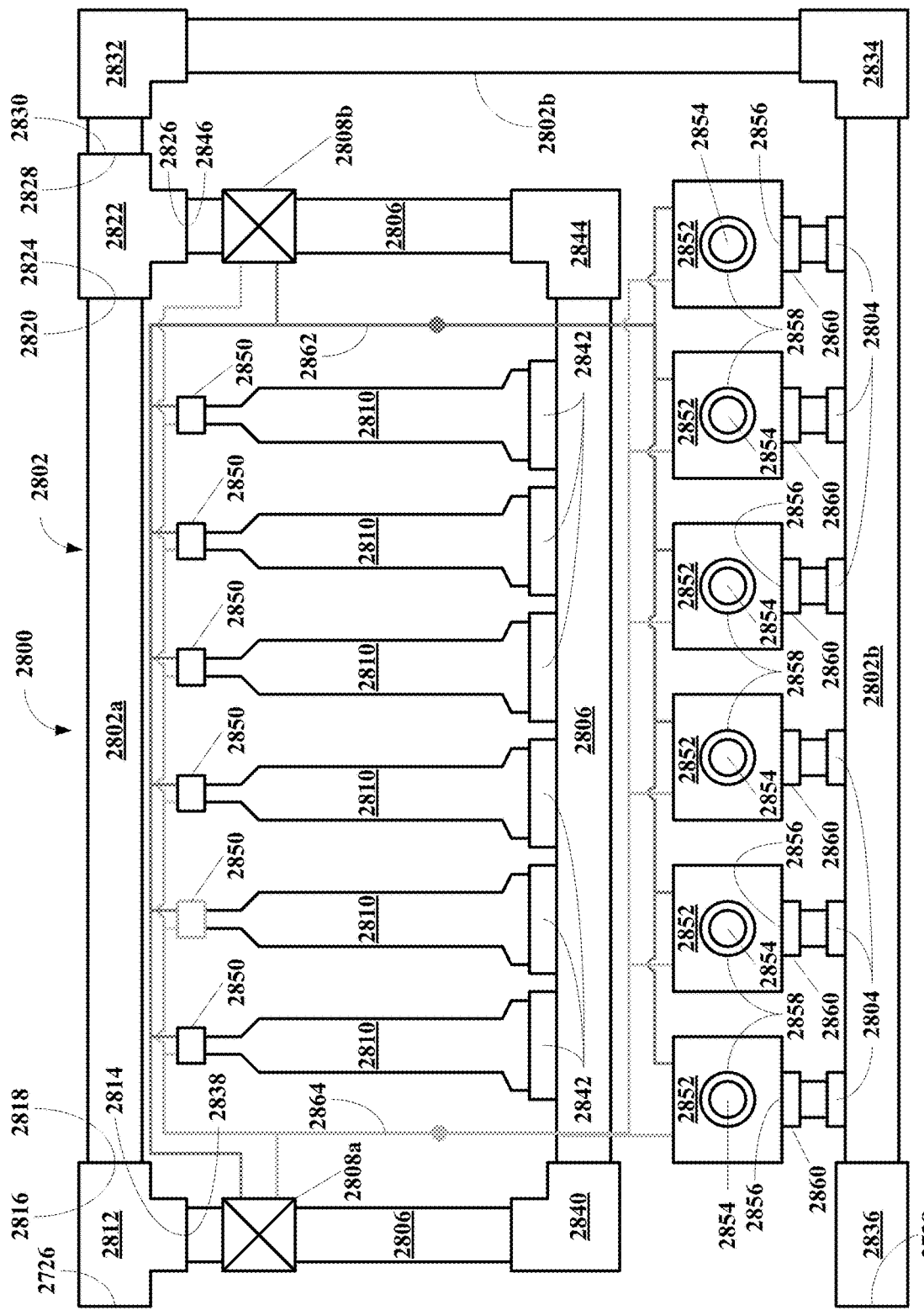
Figure 28B:
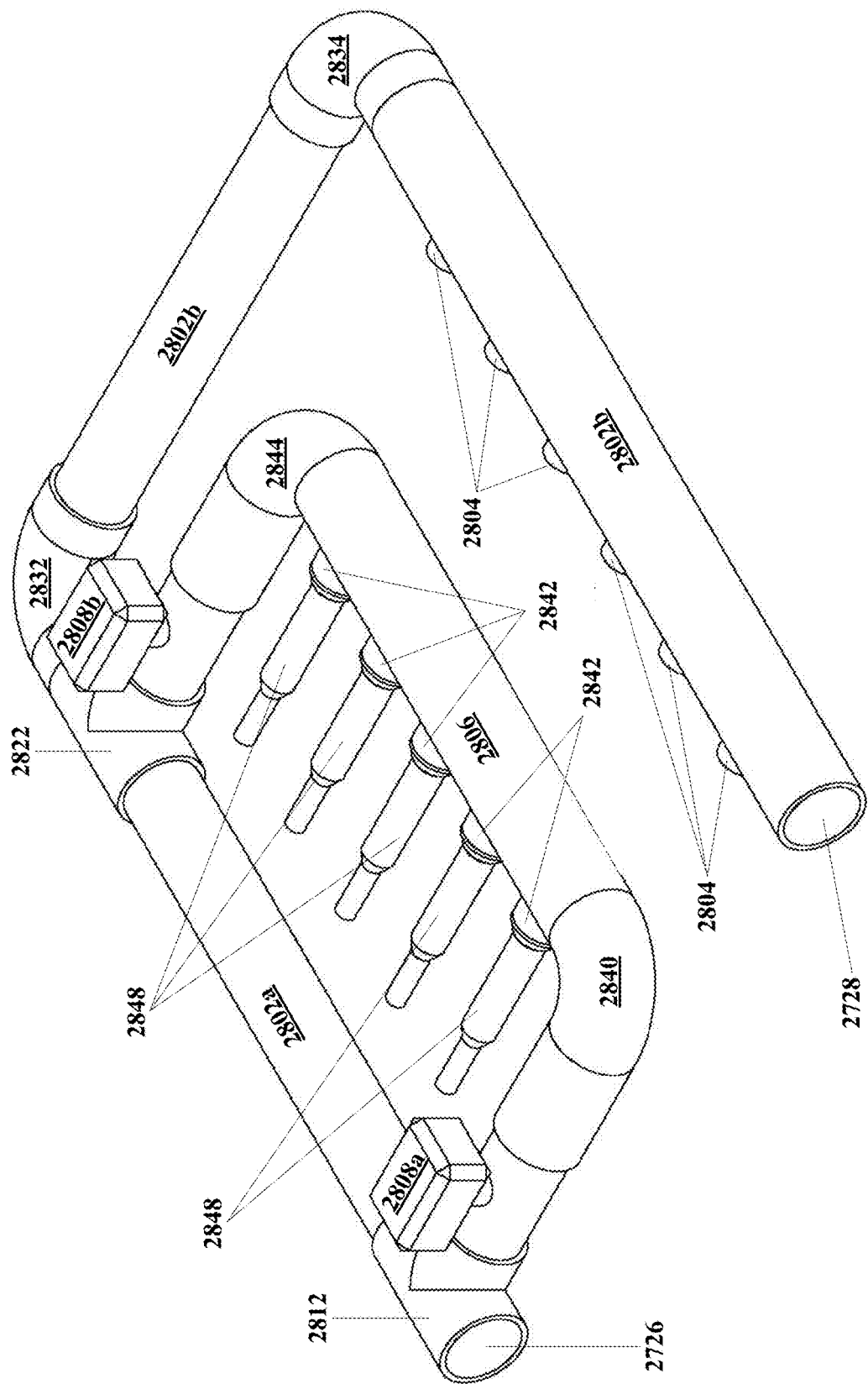
Figure 28C:
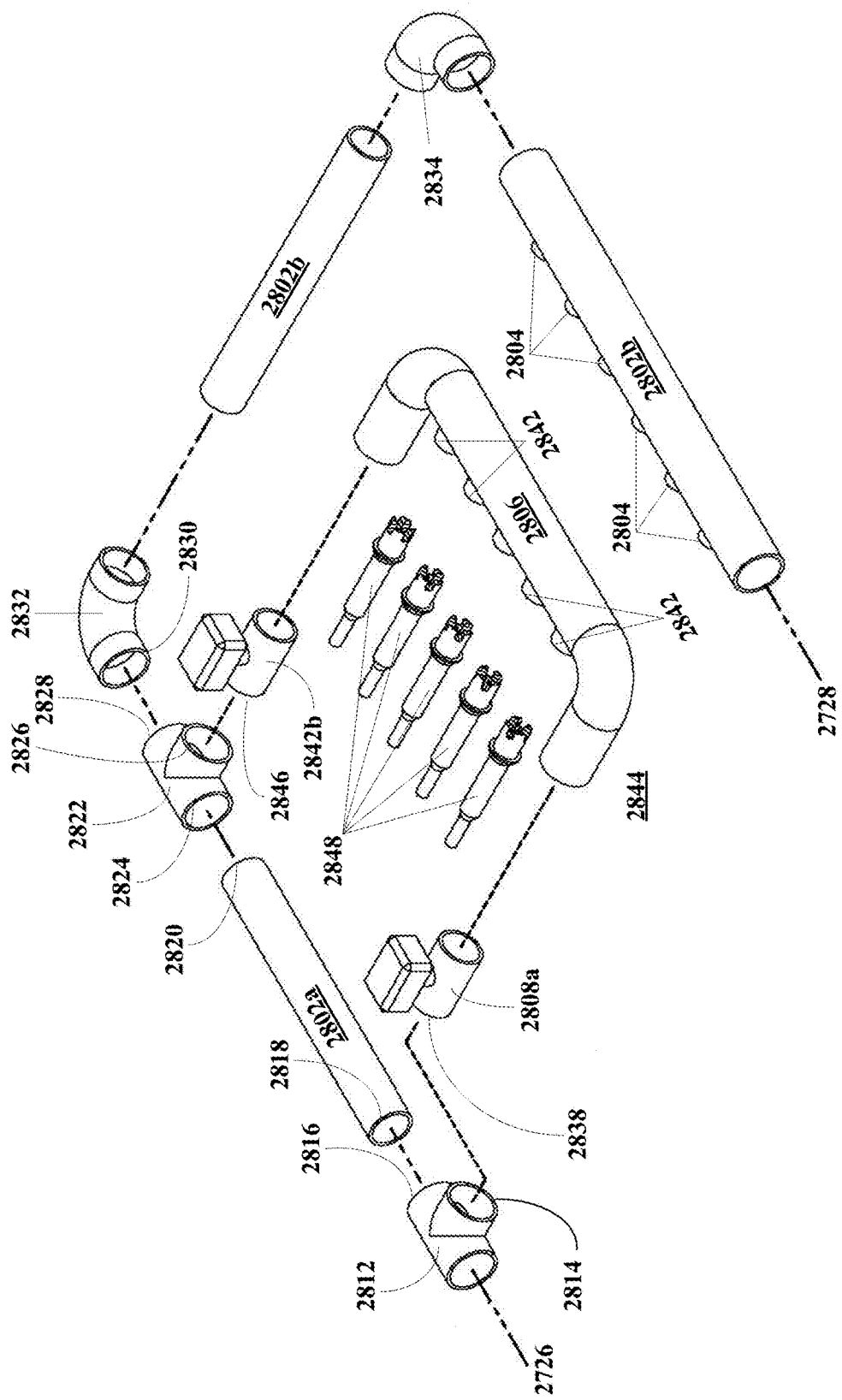

FIGS. 28A-C depict embodiments of a chemical testing and introduction assembly.

FIGS. 29A-D depict embodiments of a control unit.

FIGS. 30A-D depict two embodiments of a container support assembly shown in collapsed and expanded states.

Figure 31A:
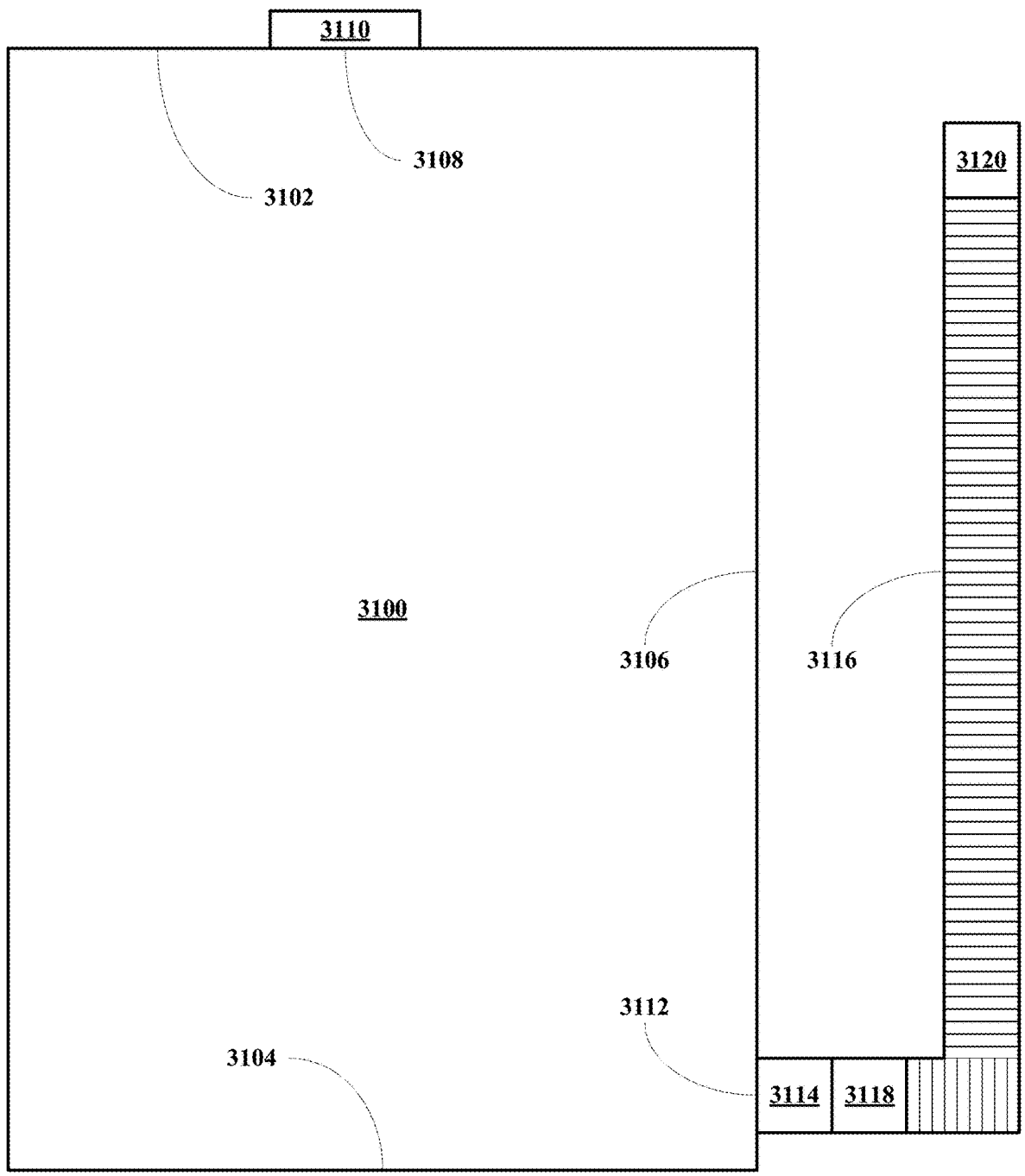
Figure 31B:
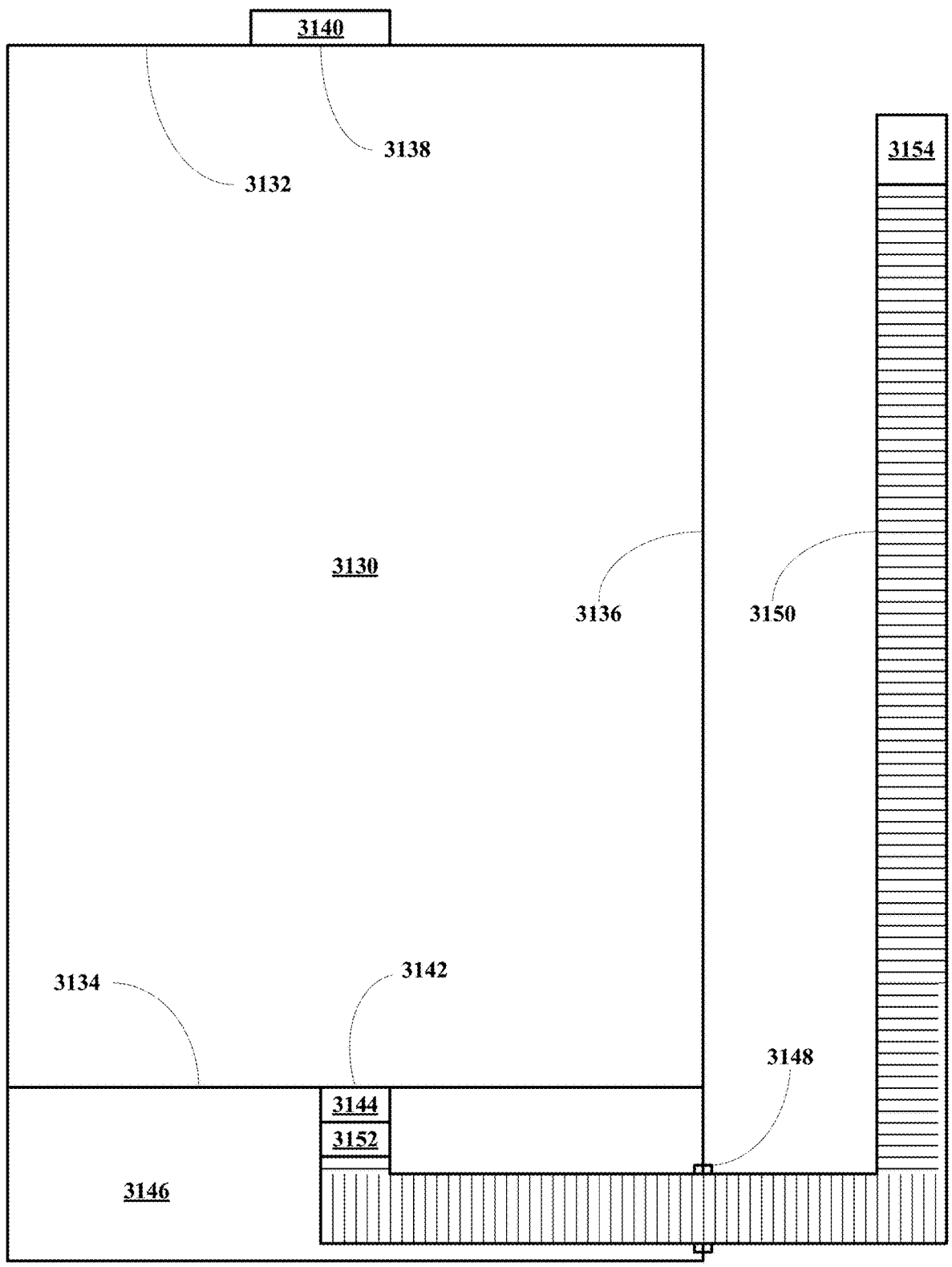
Figure 31C:
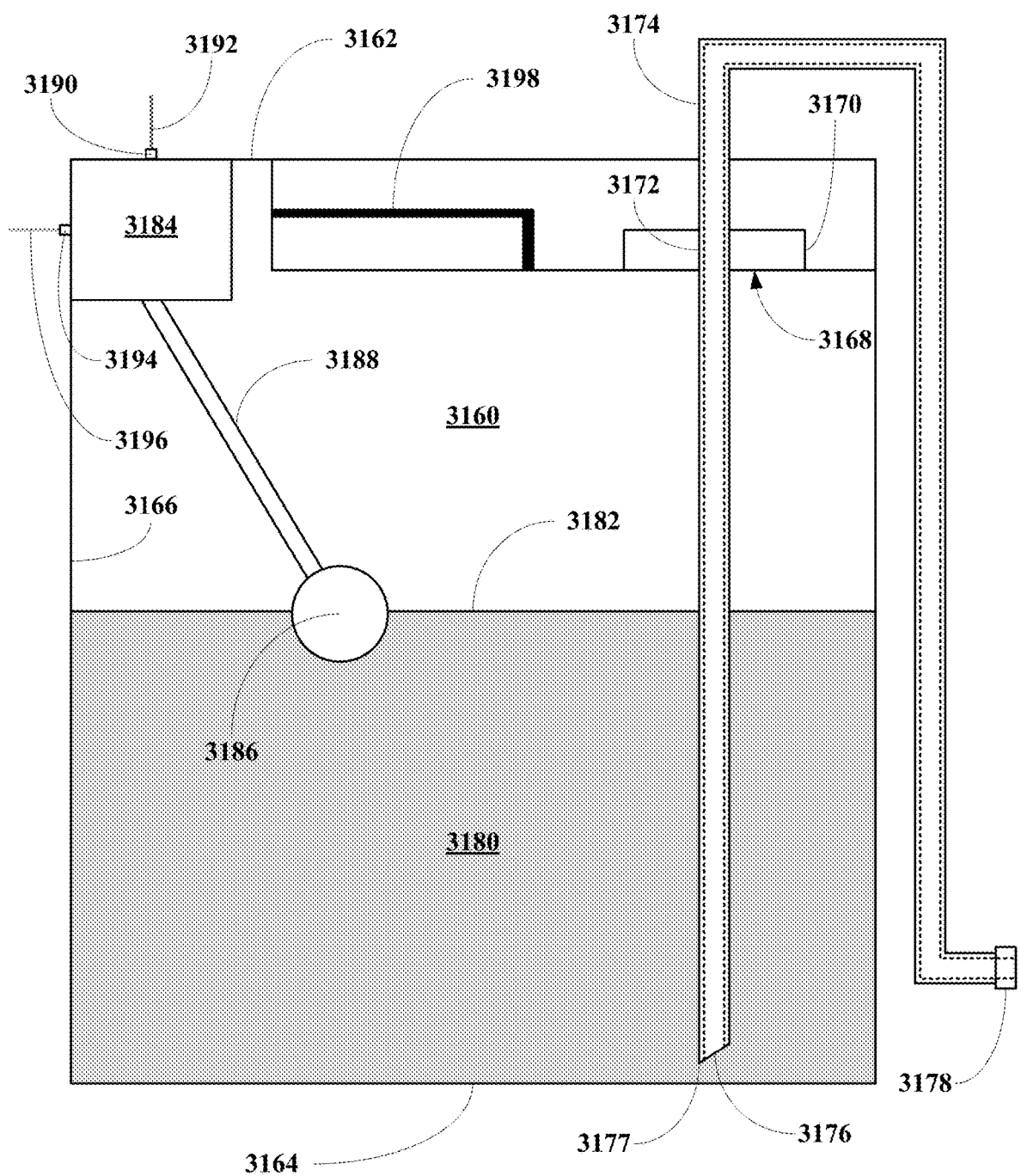

FIGS. 31A-C depict embodiments of containers.

Definitions Used in the Disclosure

In addition to having their customary and usual meaning, the following definitions apply where the context permits in the specification and claims:

The term "at least one" means one or more or one or a plurality, additionally, these three terms may be used interchangeably within this application. For example, at least one device means one or more devices or one device and a plurality of devices.

The term "one or a plurality" means one item or a plurality of items.

The term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The term "substantially" or "essentially" means that a value of a given quantity is within ±5% of the stated value. In other embodiments, the value is within ±2.5% of the stated value. In other embodiments, the value is within ±2% of the stated value. In other embodiments, the value is within ±1% of the stated value. In other embodiments, the value is within ±0.1% of the stated value.

DETAILED DESCRIPTION OF THE DISCLOSURE

The inventors have found that apparatuses for dispensing a household or industrial fluid or a plurality of household or industrial fluids may be constructed that includes a container having a cap including a dip tube, a wand or handheld device and a flexible fluid conduit interconnecting the dip tube and the wand, where the wand meters a controlled, pre-set or variable amount of the household or industrial fluid or fluids into a household appliance or industrial equipment and tracks the amount of fluid or fluids dispensed. The apparatuses are designed to simplify the dispensing of household or industrial fluid to a household appliance or industrial equipment, to control the amount of fluid or fluids supplied, and to track the amount of fluid used so that the wand may advice the user when the fluid or fluids container is low and needs to be replaced and/or refilled. The apparatuses are designed to improve the dispensing of a household appliance or industrial equipment fluids such as liquid detergents, liquid fabric softeners, liquid stain removers, liquid bleach, liquid bleach alternatives, and/or any other household fluid or any industrial fluid. The package includes a new bottle design and a battery-operated wand having a microprocessing unit or microprocessor having wireless hardware and software. Of course, it should be recognized that the processing unit or processor may be of any size including those used by traditional desktop and tap top computers.

The package also has a pump and flow meters for dispensing controlled, pre-set or variable amount of one or more household appliance or industrial equipment fluids. The wand may be connected to the bottle via a cap having unique threads, which cannot be used on any other bottles than the bottles described in this disclosure. The wand is designed to improve delivery of the household appliance or industrial equipment fluids. The processors include software or software applications to track usage and alert a consumer when it is time to replace, reorder, or refill associated containers or refill container with appropriate product. The application may also send reminders, offers, and discounts for the fluids and adjust amounts based on manufacturing recommendations. Additionally, for wands that dispense two or more (a plurality) household or industrial equipment fluids, the apparatuses may be capable of controlling the amount of each fluid and optionally mix them together prior to dispensing the mixed fluid.

The wand is designed to be purchased only once along with a laundry fluid container. Once the first bottle is empty, the consumer may buy additional fluid in a replacement container or a larger container and refill the existing container. In one embodiment, each fluid may have its own container and wand.

In other embodiments, the wand includes two or more fluid conduits, flow meters, flow controllers and an optionally a mixing chamber for mixing two or more fluids prior to the mixed fluid being dispensed. In other embodiments, the apparatuses include a multiple compartment container and a wand for each compartment, where each wand dispenses its corresponding fluid. In other embodiments, the apparatuses include a multiple compartment container and a wand having multiple fluid conduits, a fluid meter, multiple flow controllers, and an optionally a mixing chamber for mixing multiple fluids from some or all of the compartments prior to dispensing the mixed fluid.

The inventors have also found that the fluid dispensing apparatuses and methods of this disclosure have the advantage of making the dispensing of household fluids easier, cleaner, and more accurate. The controlled metering of household fluids represents distinct advantages over simply pouring fluids from containers. The present dispensing apparatus may also be used to determine the amount of fluid being poured out of a container, or changing the amount of fluids being dispensed depending on load size and changing recommendations on amounts. In fact, the controller and microprocessor used in the present apparatuses may be configured to receive information from the washing machine or other household appliance concerning such things as load size, load dirt content, floor dirtiness, or other factors that would affect the amounts and types of fluids being dispensed. Thus, if the apparatuses are dispensing laundry fluids, then information from the washing machine (either from sensor or from user input) may be used to control the amounts, types and timing of fluids being dispensed. If the apparatuses include detergent, softeners, and stain removers, then the information may be used to control the amounts of each fluid being dispensed, the timing of the fluid being dispenses, and whether the fluid are better dispensed mixed or unmixed, especially if the apparatuses are integrated into the washing machine.

The inventors also believe that apparatuses and methods of this disclosure provide the consumer with improved product control when using/dosing the product for the following reasons: (1) the present systems are intuitive to dose the correct amount for the job to be done, (2) the present systems are less messing, mess-free, or substantially mess-free, (3) the present systems are easy to handle and use, (4) the present systems are flexible or adjustable to dose different volumes for varying jobs, and (5) the present system are accurate and in control to avoid overdosing and minimizing waste and spillage. The present systems generate reduced waste, no waste or substantially no waste, use all or substantially all of the product, are easy to empty, minimize packaging waste and minimize overdosing or over use of products. The present systems allow complete and direct access to consumer to real-time or substantially real-time tracking of fluid usage. The present systems also allow Wi-Fi compatible or other wireless communication protocols and fully control of the apparatuses from a downloadable computer/phone app that tracks fluid usage. The present systems also allow consumers to be notified when it is time to reorder fluids and make reordering fluids easier such as a one click ordering methodology permitting the product to be delivered directly to the consumer's house or place of business. The downloadable app may also allow the user to access useful information on how to use the fluids effectively and efficiently.

Embodiments of this disclosure provide apparatuses including at least one cap for engaging at least one container, where one container contains a household fluid, having a dip tube, a handheld fluid metering device or a wand including a microprocessing unit having wireless communication hardware and software, a pump, optionally a flow meter, optionally a flow controller, a power supply, at one fluid inlet, a fluid outlet, at least one fluid conduit, and a control unit, where the processing unit, the pump, the optional flow meter, the optional flow controller, the control unit, and the power supply are in electrical communication and where the pump and the flow meter are under the control of the processing unit. In certain embodiments, the apparatuses include at least two caps having a dip tube and the wand further includes a mixing chamber for mixing at least two fluids together prior to being pumped through the pump and out the outlet. In certain embodiments, the household fluid is a laundry detergent. In other embodiments, one of the household fluids is a laundry detergent and another of the household fluids is water. In other embodiments, one of the household fluids is a laundry detergent, one of the household fluids is water and one of the household fluids is fabric softener, a stain removing fluid, a bleaching fluid, any other fluid used for washing clothes, or mixtures thereof.

Embodiments of the present disclosure broadly related to apparatuses including: (a) a laundry fluid container having a cap including a dip tube; (b) a wand including: (i) a microprocessor, (ii) a power supply, (iii) a control unit, (iv)

a pump, (v) a flow meter, (vi) a fluid inlet, and (vii) a fluid outlet or dispensing head; and (c) a flexible fluid conduit interconnecting the dip tube to the fluid inlet of the wand, wherein: (1) the pump and the flow meter are under the control of the microprocessor, (2) microprocessor include wireless communication hardware and software and software for receiving output signals from the control unit and for controlling the pump and the flow controller, (3) the power supply supplies power to the microprocessor, the control unit, the pump, and the flow controller, and (4) the control unit provides a user to control the wand via the microprocessor.

Embodiments of the present disclosure broadly related to apparatuses including: (a) a plurality of laundry fluid containers, each container having a cap including a dip tube; (b) a wand including: (i) a microprocessor, (ii) a power supply, (iii) a control unit, (iv) a pump, (v) a flow meter, (vi) a plurality of flow controllers, (vii) a mixing chamber including a mixing device, (viii) an equal plurality of fluid inlets, and (ix) a fluid outlet or dispensing head; and (c) a flexible fluid conduit interconnecting the dip tube to the fluid inlet of the wand, wherein: (1) the pump, and the flow meter are under the control of the microprocessor, (2) microprocessor include wireless communication hardware and software and software for receiving output signals from the control unit and for controlling the pump and the flow controller, (3) the power supply supplies power to the microprocessor, the control unit, the pump, and the flow controller, (4) the mixing chamber and the mixer mix one or more fluid to form a mixed fluid, and (5) the control unit provides a user to control the wand via the microprocessor. In certain embodiments, the control unit includes buttons for controlling the wand. In other embodiments, the control unit includes a user feedback device such as a touchscreen for controlling the wand and for displaying information to the user.

Embodiments of the present disclosure broadly related to apparatuses including: (a) a laundry fluid container having a cap including a dip tube; (b) a wand including: (i) a microprocessor, (ii) a power supply, (iii) an control unit having a user feedback device, (iv) a pump, (v) a flow meter, (vi) a plurality of flow controllers, (vii) a mixing chamber including a mixing device, (viii) an equal plurality of fluid inlets, and (ix) a fluid outlet or dispensing head; and (c) a flexible fluid conduit interconnecting the dip tube to the fluid inlet of the wand, wherein: (1) the control unit, the pump, and the flow meter are under the control of the microprocessor, (2) microprocessor include wireless communication hardware and software and software for receiving output signals from the control unit and for controlling the pump and the flow controller, (3) the power supply supplies power to the microprocessor, the control unit, the pump, and the flow controller, (4) the mixing chamber and the mixer mix one or more fluid to form a mixed fluid, and (5) the control unit of the control unit provides a user to control the wand via the microprocessor.

Embodiments of this disclosure broadly relates to methods for including receiving a first input from a control unit of a handheld unit associated with a household fluid dispensing apparatus of this disclosure, turning on a pump of the handheld unit, and dispensing a specific amount of the fluid from a container associated with the apparatus into a household appliance. The methods may also include receiving a second input from the control unit corresponding to selecting the specific amount from a set of specific amounts. The methods may also include tracking the amount of fluid being dispensed from the container and outputting a signal corresponding to an amount of fluid remaining the container from which the fluid is being dispensed. The methods also include pulling information from a website associated with the fluid and/or appliance to set the specific amount of the fluid to be dispensed to the appliance. In certain embodiments, the signal comprises illuminating a green, yellow or red light, wherein the green light represents a fluid amount greater or equal to ¼ full, the yellow light represents a fluid amount less than ¼ full and greater or equal to ⅛ full, and the red light represents a fluid amount less than ⅛ full. In certain embodiments, the methods also include dispensing specific amounts of a plurality of fluids from a plurality of containers. In embodiments, the methods also include controlling the amount of each fluid being dispensed and tracking the amount of each fluid being dispensed. In certain embodiments, the methods also include mixing the fluids together in a mixing chamber associated with the handheld unit.

Embodiments of this disclosure provide apparatuses including at least one cap for engaging at least one container, where one container contains a household fluid, having a dip tube, a handheld fluid metering device or a wand including a microprocessing unit having wireless communication hardware and software, a pump, optionally a flow meter, optionally a flow controller, a power supply, at one fluid inlet, a fluid outlet, at least one fluid conduit, and a control unit, where the processing unit, the pump, the optional flow meter, the optional flow controller, the control unit, and the power supply are in electrical communication and where the pump and the flow meter are under the control of the processing unit. In certain embodiments, the apparatuses include at least two caps having a dip tube and the wand further includes a mixing chamber for mixing at least two fluids together prior to being pumped through the pump and out the outlet. In certain embodiments, the household fluid is a laundry detergent. In other embodiments, one of the household fluids is a laundry detergent and another of the household fluids is water. In other embodiments, one of the household fluids is a laundry detergent, one of the household fluids is water and one of the household fluids is fabric softener, a stain removing fluid, a bleaching fluid, any other fluid used for washing clothes, or mixtures thereof.

Embodiments of the present disclosure broadly related to apparatuses including: (a) a removable laundry fluid container; (b) a Base housing including: (i) a microprocessor, (ii) a power supply, (iii) a control unit having a user feedback device, (iv) a pump, (v) a flow meter, (vi) a plurality of flow controllers, (vii) a mixing chamber including a mixing device, (viii) an equal plurality of fluid inlets, and (ix) a fluid outlet or dispensing head; (c) a wand with no-drip tip, load size selection buttons and dispensing initiator button, (d) a flexible fluid conduit interconnecting the base housing to the fluid inlet of the wand, wherein: (1) the control unit, the pump, and the flow meter are under the control of the microprocessor, (2) microprocessor include wireless communication hardware and software and software for receiving output signals from the control unit and for controlling the pump and the flow controller, (3) the power supply supplies power to the microprocessor, the control unit, the pump, and the flow controller, (4) the mixing chamber and the mixer mix one or more fluid to form a mixed fluid, and (5) the control unit of the control unit provides a user to control the wand via the microprocessor.

Embodiments of the present disclosure broadly related to apparatuses including: (a) a disposable laundry fluid cartridge or multiple laundry cartridges that can contain deferent products; (b) a housing including: (i) a microprocessor, (ii) a power supply, (iii) a control unit having a user feedback device, (iv) a pump, (v) a flow meter, (vi) a plurality of flow controllers, (vii) a mixing chamber including a mixing device, (viii) an equal plurality of fluid inlets, and (ix) a fluid outlet or dispensing head; (c) a wand with no-drip tip, load size selection buttons and dispensing initiator button, (d) a flexible fluid conduit interconnecting the base housing to the fluid inlet of the wand, wherein: (1) the control unit, the pump, and the flow meter are under the control of the microprocessor, (2) microprocessor include wireless communication hardware and software and software for receiving output signals from the control unit and for controlling the pump and the flow controller, (3) the power supply supplies power to the microprocessor, the control unit, the pump, and the flow controller, (4) the mixing chamber and the mixer mix one or more fluid to form a mixed fluid, and (5) the control unit of the control unit provides a user to control the wand via the microprocessor.

Embodiments of the present disclosure broadly related to apparatuses including: (a) a reusable electronic Pipette controller including: (i) a microprocessor, (ii) a power supply, (iii) a control unit having a user feedback device, (iv) a pump, (v) a flow meter, (vi) a plurality of flow controllers, (vii) a storage chamber to store the desired amount of laundry (viii) load size selection buttons and dispensing initiator button (ix) a fluid outlet or dispensing head with no-drip tip; wherein: (1) the control unit, the pump, and the flow meter are under the control of the microprocessor, (2) microprocessor include wireless communication hardware and software and software for receiving output signals from the control unit and for controlling the pump and the flow controller, (3) the power supply supplies power to the microprocessor, the control unit, the pump, and the flow controller, (4) the mixing chamber and the mixer mix one or more fluid to form a mixed fluid, and (5) the control unit of the control unit provides a user to control the wand via the microprocessor, and (c) a container including (i) a dip tube, (ii) a cap with a one-way check valve or a fluid flow silicone check valve to create a sealed connection to the pipette.

Embodiments of the present disclosure broadly related to apparatuses including: (a) a disposable laundry fluid cartridge or multiple laundry cartridges that can contain different products; The cartridge is made in deferent shapes reflecting art objects such as animal shapes, geographical shapes such as a country map, or any other decorative shapes (b) a housing or base including: (i) a microprocessor, (ii) a power supply, (iii) a control unit having a user feedback device, (iv) a pump, (v) a flow meter, (vi) a plurality of flow controllers, (vii) a mixing chamber including a mixing device, (viii) an equal plurality of fluid inlets, and (ix) a fluid outlet or dispensing head; (c) a wand with no-drip tip, load size selection buttons and dispensing initiator button, (d) a flexible fluid conduit interconnecting the base housing to the fluid inlet of the wand, wherein: (1) the control unit, the pump, and the flow meter are under the control of the microprocessor, (2) microprocessor include wireless communication hardware and software and software for receiving output signals from the control unit and for controlling the pump and the flow controller, (3) the power supply supplies power to the microprocessor, the control unit, the pump, and the flow controller, (4) the mixing chamber and the mixer mix one or more fluid to form a mixed fluid, and (5) the control unit of the control unit provides a user to control the wand via the microprocessor.

Embodiments of the present disclosure broadly related to apparatuses including: (a) a disposable laundry fluid cartridge or multiple laundry cartridges that can contain different products; The cartridge is made in deferent shapes reflecting art objects such as animal shapes, geographical shapes such as a country map, or any other decorative shapes (b) a housing or base including: (i) a microprocessor, (ii) a power supply, (iii) a control unit having a user feedback device, (iv) a pump, (v) a flow meter, (vi) a plurality of flow controllers, (vii) a mixing chamber including a mixing device, (viii) an equal plurality of fluid inlets, and (ix) a fluid outlet or dispensing head; (c) a wand with no-drip tip, load size selection buttons and dispensing initiator button, (d) a flexible fluid conduit interconnecting the base housing to the fluid inlet of the wand, wherein: (1) the control unit, the pump, and the flow meter are under the control of the microprocessor, (2) microprocessor include wireless communication hardware and software and software for receiving output signals from the control unit and for controlling the pump and the flow controller, (3) the power supply supplies power to the microprocessor, the control unit, the pump, and the flow controller, (4) the mixing chamber and the mixer mix one or more fluid to form a mixed fluid, and (5) the control unit of the control unit provides a user to control the wand via the microprocessor.

Embodiments of this disclosure also provide washing machine fluid dispensing apparatuses adapted to be attached to a washing machine or integrated into a wash machine.

The apparatuses include one or more substantially rectangular solid slots disposed in a front, left portion thereof and one more substantially rectangular solid fluid/liquid containers adapted to fit in the slots. Each of the slots include a fluid connector and each of the containers include a fluid connector, wherein the container connectors are adapted to engage the slot connectors to support fluid flow from the containers.

The apparatuses also include a processing unit or processor having communication hardware and software, memory, and peripheral connectors disposed in an interior thereof. The apparatuses also include a touch screen, a concierge button, and one or more USB ports in communication with the processor and disposed in a front, right portion thereof. In certain embodiments, the apparatuses also include a speaker, an audio input port, a video port, or other input or output devices and associated input and output device ports.

The apparatuses also include a cold water conduit having a right side cold water inlet including a right side cold water inlet fitting and a left side cold water outlet including a left side cold water outlet fitting disposed in a lower left and right side portions thereof.

The apparatuses also include a hot water conduit having a right side hot water inlet including a right side hot water inlet fitting and a left side hot water outlet including a left side hot water outlet fitting disposed in the lower left and right side portions thereof.

The cold water conduit and hot water conduit run parallel through an interior of the apparatuses and include one or more fittings for receiving fluid from each of the containers disposed equally along a length of the hot and cold conduits.

The apparatuses also include one or more fluid injection assemblies and one or more fluid injection conduit assemblies for introducing the fluids from the containers into either the cold water conduit, the hot water conduit or both in a controlled manner.

The one or more slots are adapted to receive one or more fluid/liquid containers and adapted to allow a consumer to remove one of the containers for refilling.

Each of the fluid injector assemblies includes a pump or injector having a pump inlet and a pump outlet, wherein the pump pulls fluid from the containers and into either the cold water conduit, the hot water conduit, or both.

Each of the fluid injector conduit assemblies includes (a) an inlet section having a proximal end attached to, affixed to, or integral with the slot connector and a distal end having an inlet section check valve attached to, affixed to, or integral with the pump or injector inlet, (b) a straight section having a proximal end attached to, affixed to, or integral with the pump or injector outlet and a distal end having a straight section check valve, (c) a T section having (1) a top end attached to, affixed to, or integral with the straight section at the straight section check valve, (2) a cold water end including a cold water check valve attached to, affixed to, or integral with one of the cold water fittings, and (3) a hot water end including a hot water check valve attached to, affixed to, or integral with one of the hot water fittings, and (d) a control valve disposed on a bottom of the T section and adapted to direct fluid flow into either the cold conduit, the hot conduit or both.

In certain embodiments, the fluid injector assemblies comprise syringe injectors. Each of the syringe injectors includes a rotary motor having a motor shaft. Each of the syringe injectors a threaded syringe shaft rotationally connected to the motor shaft via a collar and a syringe plunger. Each of the plungers includes a plunger slide attachment and a threaded plunger slide disposed on a top of the plunger and a plunger pad disposed on a bottom of the plunger. In these embodiments, the pump inlets and the outlets are the same. Each of the syringe injectors operates by pulling fluid from its containers through the inlet section, through the inlet section check valve and into the plunger due to the plunger being pulled up by operation of the rotary motor. Once a desired amount of fluid has been pulled into the syringe injector, the motor reverses direction and pushes the fluid into the straight section, through the straight section check valve, through the T section and into either the cold water conduit, the hot water conduit or both based on the control valve setting. Again, the check valves all allow fluid flow in only the forward direction and stop back flow.

In other embodiments, the fluid injections assemblies may comprise any injector or pump assembly that draws fluid from a container and injects the fluid into the cold conduit, the hot conduit, or both in a controlled manner. Other injector or pump assemblies may be based on centrifugal pumps, diaphragm pumps, gear pumps, peristaltic pumps, lobe pumps, piston pumps, or any other type of pump or fluid or liquid injector assembly.

The apparatuses also include one or more container release buttons disposed below the one or more slots. Each of the one or more container release buttons are attached to, affixed to or integral with a release arm having a locking end. Each of the slots includes a locking end receiving slot adapted to receive the locking end of the arm engaging the locking end and locking the containers in place. When one of the button is pushed in, the arm move inward moving the locking end out of the locking end slot and disengaging and unlocking the container so that the container may be removed.

Suitable Components for Use in the Disclosure

Household and Industrial Fluids

Suitable ready to use household and industrial fluids include, without limitation, laundry detergents, chlorine containing bleaches, non-chlorine-containing bleaches, fabric softeners, stain removing fluids, dishwashing fluids, laundry pre-spotters, pool cleaning fluids and concentrated fluids such as bathroom cleaners, tub cleaners, tile cleaner, toilet bowl cleaner, general cleaner and disinfectant, window and glass cleaner, or mixtures and combinations thereof.

Micro Pumps

Suitable micro pumps for use in this disclosure include, without limitation, peristaltic, piezoelectric micro pumps, metering pumps, any other micro pump, or mixtures and combinations thereof.

Micro Flow Meters

Suitable micro flow meters for use in this disclosure include, without limitation, metal or plastic microflow meters such as microflow meters available from MOJO Technology Co., Limited, Bitspower flow sensor available from Watercooling, UK, microflow meters available from B.I.O-TECH e.K., microflow meters available from OMEGA Engineering is a subsidiary of Spectris PLC, microflow meters available from Siemens, and any other manufacturer of micro flow meters.

Micro Flow Controllers

Suitable micro flow controller for use in this disclosure include, without limitation, metal or plastic micro flow controller such as micro flow controller available from MOJO Technology Co., Limited, micro flow controller available from Watercooling, UK, micro flow controller available from B.I.O-TECH e.K., micro flow controller available from OMEGA Engineering is a subsidiary of Spectris PLC, micro flow controller available from Siemens, and any other manufacturer of micro flow meters.

Micro Processing Units

Suitable micro processing units or microprocessors for use in the present disclosure include, without limitation, digital microprocessing units (DPUs), analog microprocessing units (APUs), micro Field Programmable Gate Arrays (FPGAs), any other technology that can receive motion sensor output and generate command and/or control functions for objects under the control of the processing unit, or mixtures and combinations thereof.

Processing Units and MicroProcessing Units

Suitable digital processing units, digital processors, (DPUs) micro processing units, and digital microprocessors (DmPUs) include, without limitation, any digital processing unit capable of accepting input from a plurality of devices and converting at least some of the input into output designed to select and/or control attributes of one or more of the devices. Exemplary examples of such DPUs include, without limitation, microprocessor, microcontrollers, or the like manufactured by Intel, Motorola, Ericsson, HP, Samsung, Hitachi, NRC, Applied Materials, AMD, Cyrix, Sun Microsystem, Philips, National Semiconductor, Qualcomm, ARM, TDK, Invensense, Xilinx, Altera or any other manufacture of microprocessors or microcontrollers.

Suitable analog processing units or processors (APUs) and micro processing units or analog microprocessors (AmPUs) include, without limitation, any analog processing unit capable of accepting input from a plurality of devices and converting at least some of the input into output designed to control attributes of one or more of the devices. Such analog devices are available from manufacturers such as Analog Devices Inc.

User Feedback Units

Suitable user feedback units include, without limitation, a haptic (touch) device, an audio device, a visual device, and/or an audiovisual device. Exemplary examples of audio devices include, without limitation, speakers or any other device the generate audio frequency vibrations. Exemplary examples of visual devices include, without limitation, liquid crystal displays, light emitting diode displays, organic light emitting diode displays, plasma displays, touch screens, touch sensitive input/output devices, holographic display devices, optical input/output device, and any other optical input/output device that permits a user to receive user intended inputs and outputs. Exemplary examples of audio-visual devices include, without limitation, liquid crystal displays including an audio component, light emitting diode displays including an audio component, organic light emitting diode displays including an audio component, plasma displays including an audio component, touch screens including an audio component, touch sensitive input/output devices including an audio component, holographic display devices including an audio component, optical input/output devices including an audio component, and any other optical input/output device that permits a user to receive user intended inputs and outputs including an audio component.

Household and Industrial Appliances

Suitable household and industrial appliance include, without limitation, washing machines, dish washing machines, and drawer dish washing machines.

DETAILED DESCRIPTION OF THE DRAWINGS OF THE DISCLOSURE

General Apparatus—First Type

Figure 1:
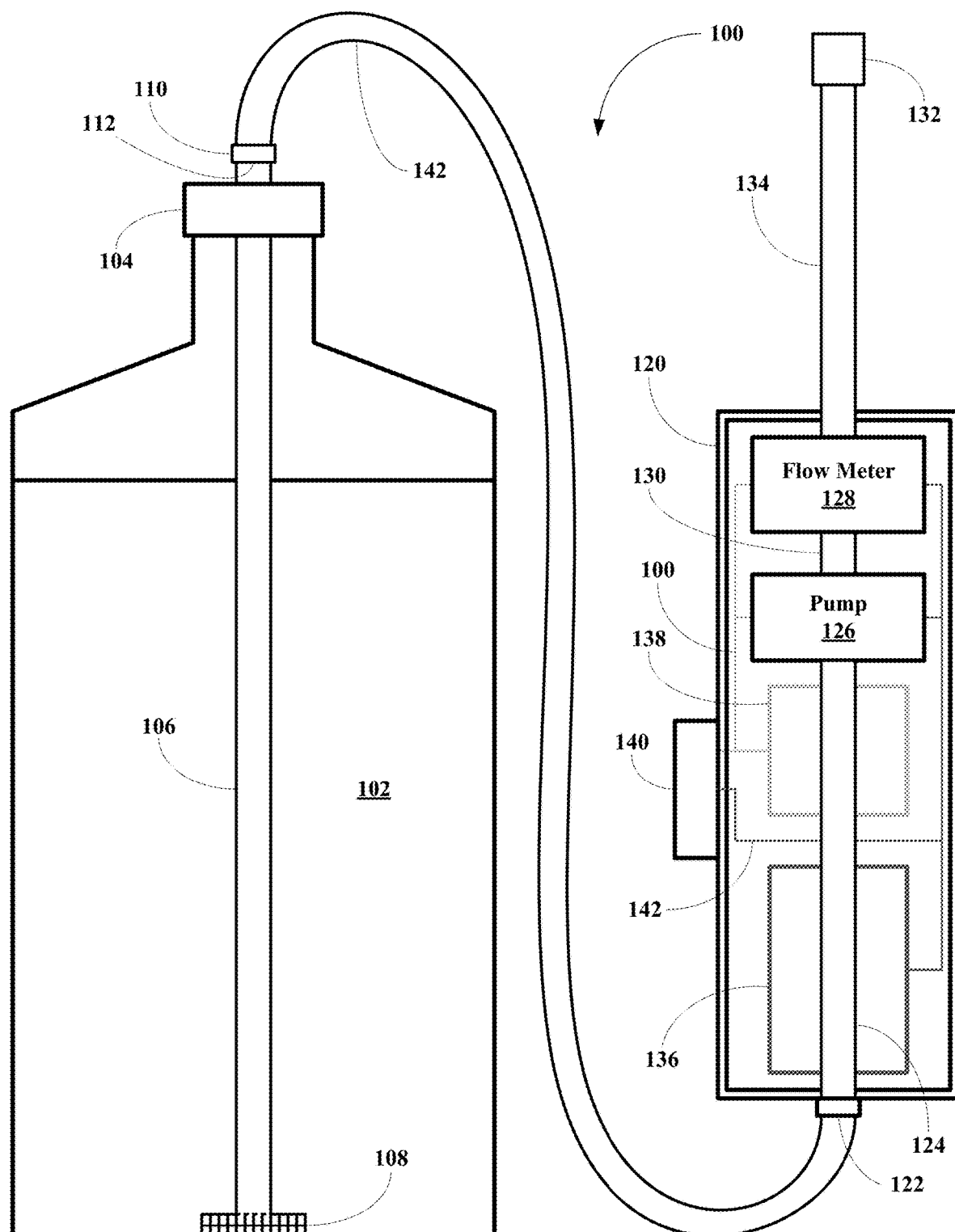
FIG. 1 depicts an embodiment of a dispensing apparatus of this disclosure, where the wand includes a pump, a flow meter, a microprocessor, and a power supply.

Referring now to FIG. 1, an embodiment of dispensing apparatus of this disclosure, generally 100, is shown to include a fluid container 102 including a cap 104 having a dip tube 106 including a wire mesh fluid inlet 108, and an outlet connector 110 associated with a fluid outlet 112.

The apparatus 100 also includes a handheld fluid dispensing device or wand 120 including an fluid inlet connector 122, a first fluid conduit 124, and a pump 126. The first fluid conduit 124 interconnects the inlet connector 122 and the pump 126. The wand 120 also includes a flow meter 128, a second fluid conduit 130, a fluid wand outlet head 132, and a third fluid conduit 134, where the second fluid conduit 130 interconnects the pump 126 to the flow meter 128 and where the third conduit 134 interconnects the flow meter 128 and the outlet head 132. The wand 120 also includes a power supply 136, a microprocessing unit 138, and a control unit 140. The power supply 136 supplies power to the pump 126, the flow meter 128, and the control unit 140 via electrical wires 142. The microprocessor 138 is in two-way communication with the pump 126, the flow meter 128, and the control unit 140 and is configured to receive an output signal or signals from the control unit 140, to turn the pump 126 ON or OFF, to monitor the fluid flowing through the flow meter 128 and to turn the pump 126 OFF when the flow meter output indicates that a pre-defined or pre-set amount of fluid has passed through the flow meter 128. Of course, it should be recognized that the pump 126 and flow meter 128 may be integrated into a single metering pump. Additionally, the microprocessor 138 is also configured to keep track of the amount of fluid dispensed and to notify a user when the fluid in the container containing the fluid is low and needs to be replaced and/or refilled.

The apparatus 100 also includes a flexible fluid conduit 144 interconnecting the fluid outlet connector 110 to the fluid inlet connector 122. The flexible fluid conduit 144 may be of any length, but should be of sufficient length so that the outlet head 132 of the wand 120 may be inserted into a fluid inlet associated with an appliance, a pool, a vehicle, or any other structure that need a fluid to operate.

Handheld Dispensing Device or Wand

Pump and Flow Meter

Figure 2A:
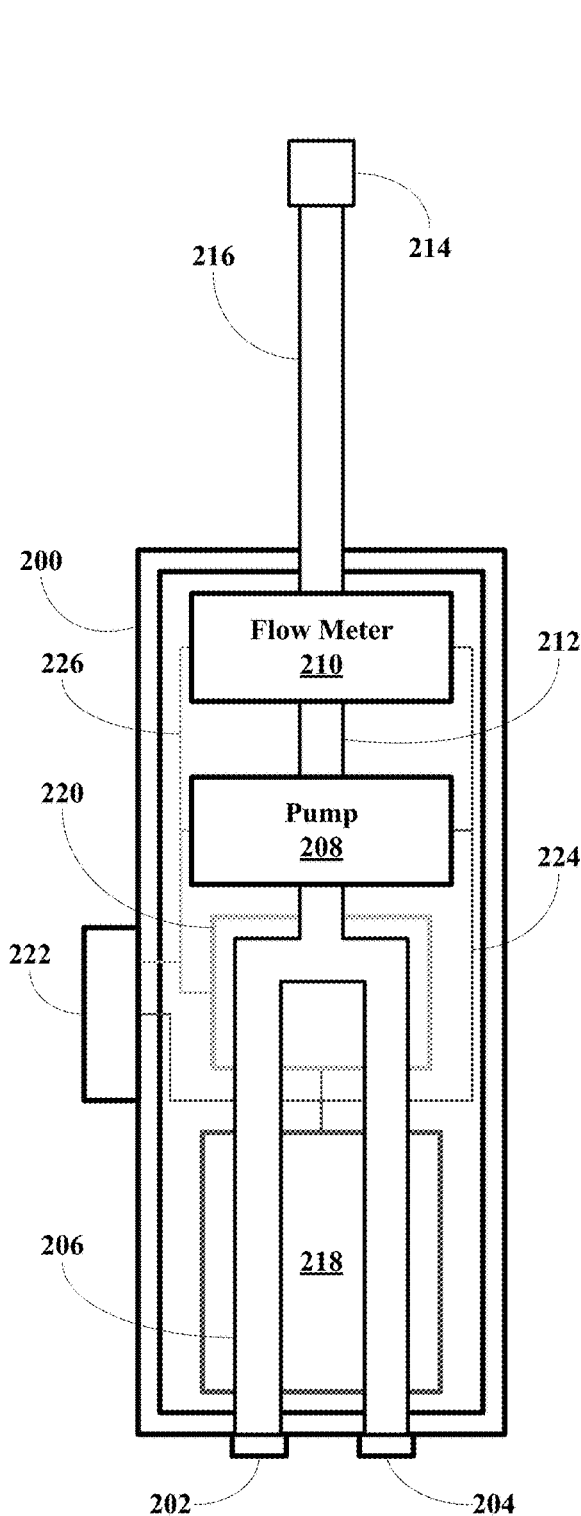
FIG. 2A depicts another embodiment of a wand of this disclosure, where the wand includes a pump, a flow meter, a microprocessor, and a power supply and capable of dispensing two fluids.

Referring now to FIG. 2A, another embodiment of a wand of this disclosure, generally 200, is shown to include a first fluid inlet connector 202, a second fluid inlet connector 204, a two legged fluid conduit 206, and a pump 208. The two-legged fluid conduit 206 interconnects the inlet connectors 202 and 204 and the pump 208 and supplies two different fluid to the pump 208. It should be recognized that the two legs of the two-legged conduit 206 may be of different sizes to control the relative ratio of the two fluid entering the pump 208.

The wand 200 also includes a flow meter 210, a second fluid conduit 212, a fluid wand outlet head 214, and a third fluid conduit 216, where the second fluid conduit 212 interconnects the pump 208 and the flow meter 210 and where the third conduit 216 interconnects the flow meter 210 and the outlet head 214.

The wand 200 also includes a power supply 218, a microprocessing unit 220, and a control unit 222.

The power supply 218 supplies power to the pump 208, the flow meter 210, and the control unit 222 via electrical wires 224. The microprocessor 220 is in two-way communication with the pump 208, the flow meter 210, and the control unit 222 via communication pathways 226.

The microprocessor 220 is configured to receive an output signal or signals from the control unit 222, to turn the pump 208 ON or OFF, to monitor the fluid flowing through the flow meter 210 and to turn the pump 208 OFF when the flow meter output indicates that a pre-defined or pre-set amount of fluid has passed through the flow meter 210.

Additionally, the microprocessor 220 is also configured to keep track of the amount of fluid dispensed and to notify a user when the fluid in the container containing the fluid is low and needs to be replaced and/or refilled. Of course, it should be recognized that the pump 208 and flow meter 210 may be integrated into a single metering pump.

Mixing Chamber, Pump, and Flow Meter

Figure 2B:
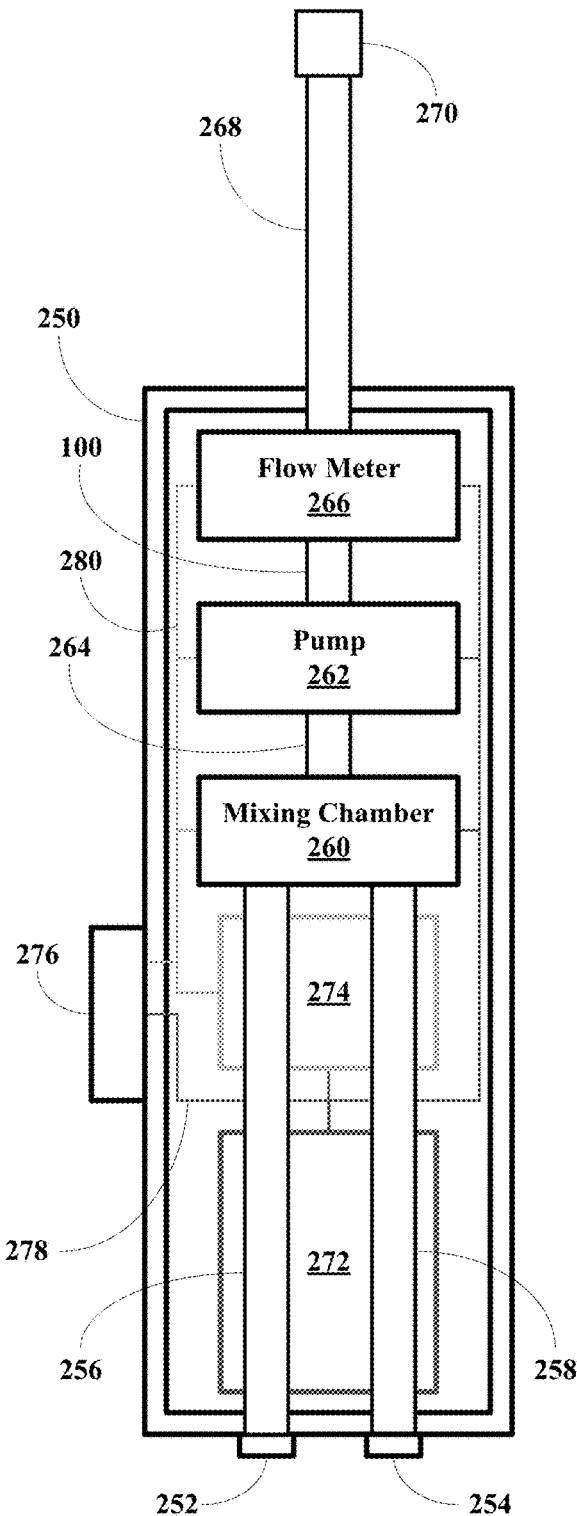
FIG. 2B depicts another embodiment of a wand of this disclosure, where the wand includes a mixing chamber, a pump, a flow meter, a microprocessor, and a power supply and capable of dispensing two fluids.

Referring now to FIG. 2B, another embodiment of a wand of this disclosure, generally 250, is shown to include a first fluid inlet connector 252, a second fluid inlet connector 254, a first fluid conduit 256, second fluid conduit 258, and a mixing chamber 260. The first and second fluid conduits 256 and 258 interconnect the inlet connectors 252 and 254 and the mixing chamber 260. It should be recognized that the two conduits 256 and 258 may be of different sizes to control the relative ratio of the two fluids entering the mixing chamber 260.

The wand 250 also includes a pump 262, a third fluid conduit 264, a flow meter 266, a fourth fluid conduit 268, and a fluid wand outlet head 270, where the third fluid conduit 264 interconnects the pump 262 to the flow meter 266 and where the fourth conduit 268 interconnects the flow meter 266 and the outlet head 270.

The wand 250 also includes a power supply 272, a microprocessing unit 274, and a control unit 276. The power supply 272 supplies power to the mixing chamber 260 with the mixing chamber includes a mixer (not shown), the pump 262, the flow meter 266, and the control unit 276 via electrical wires 278.

The microprocessor 274 is in two-way communication with the pump 262, the flow meter 266, and the control unit 276 via communication pathways 280. The microprocessor 274 is configured to receive an output signal or signals from the control unit 276, to turn the pump 262 ON or OFF, to monitor the fluid flowing through the flow meter 266 and to turn the pump 262 OFF when the flow meter output indicates that a pre-defined or pre-set amount of fluid has passed through the flow meter 266.

Additionally, the microprocessor 274 is also configured to keep track of the amount of fluid dispensed and to notify a user when the fluid in the container containing the fluid is low and needs to be replaced and/or refilled. Of course, it should be recognized that the pump 262 and flow meter 266 may be integrated into a single metering pump.

Flow Controllers, Pump, and Flow Meter

Figure 3A:
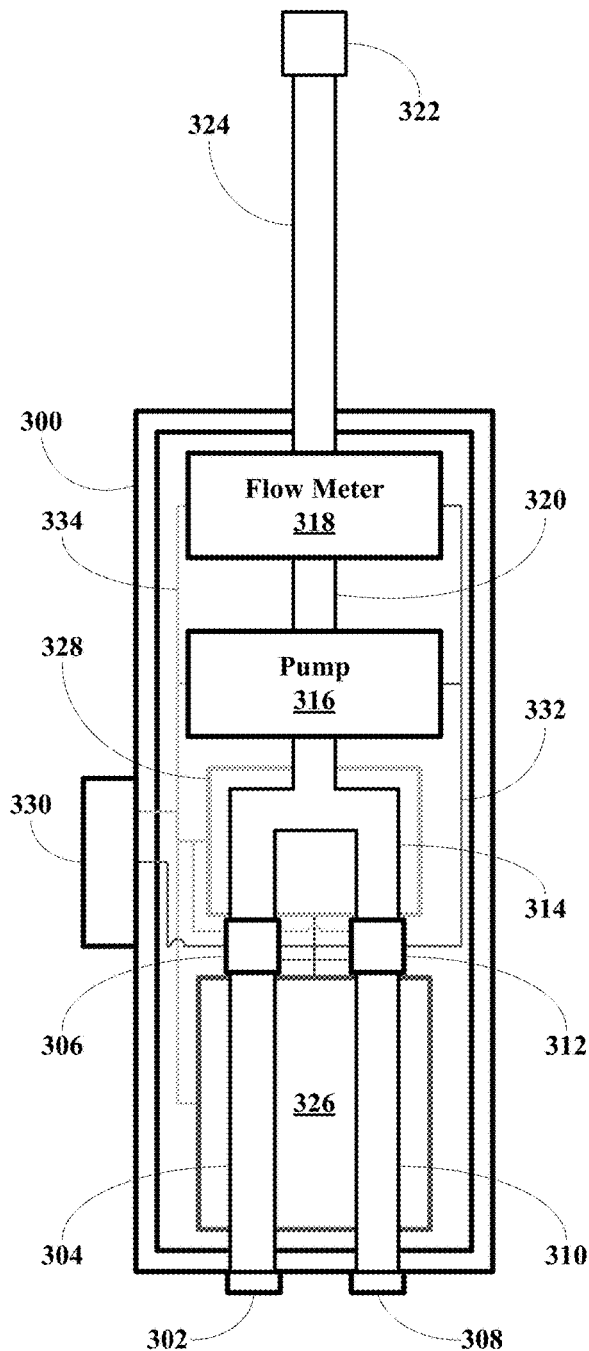
FIG. 3A depicts another embodiment of a wand of this disclosure, where the wand includes flow controllers, a pump, a flow meter, a microprocessor, and a power supply and capable of dispensing two fluids.

Referring now to FIG. 3A, another embodiment of a wand of this disclosure, generally 300, is shown to include a first fluid inlet connector 302, a first fluid conduit 304, a first flow controller 306, a second fluid inlet connector 308, a second fluid conduit 310, a second flow controller 312, a two-legged fluid conduit 314, and a pump 316. The first conduit 304 interconnects the first inlet connector 302 and the first flow controller 306. The second conduit 310 interconnects the second inlet connector 308 and the second flow controller 312. The two legged fluid conduit 314 interconnects the flow control controllers 306 and 312 and the pump 316 and supplies two different fluid to the pump 316 at a controlled rate.

The wand 300 also includes a flow meter 318, a third fluid conduit 320, a fluid wand outlet head 322, and a fourth fluid conduit 324, where the third fluid conduit 320 interconnects the pump 316 and the flow meter 318 and where the fourth conduit 324 interconnects the flow meter 318 and the outlet head 322.

The wand 300 also includes a power supply 326, a microprocessing unit 328, and a control unit 330.

The power supply 326 supplies power to the flow controllers 306 and 312, pump 316, the flow meter 318, and the control unit 330 via electrical wires 332.

The microprocessor 328 is in two-way communication with the flow controllers 306 and 312, pump 316, the flow meter 318, and the control unit 332 via communication pathways 334.

The microprocessor 326 is configured to receive an output signal or signals from the control unit 330, to turn the pump 316 ON or OFF, to monitor the fluid flowing through the flow meter 318 and to turn the pump 316 OFF when the flow meter output indicates that a pre-defined or pre-set amount of fluid has passed through the flow meter 318.

Additionally, the microprocessor 328 is also configured to keep track of the amount of fluid dispensed and to notify a user when the fluid in the container containing the fluid is low and needs to be replaced and/or refilled. Of course, it should be recognized that the pump 316 and flow meter 318 may be integrated into a single metering pump.

Flow Controllers, Mixing Chamber, Pump, and Flow Meter

Figure 3B:
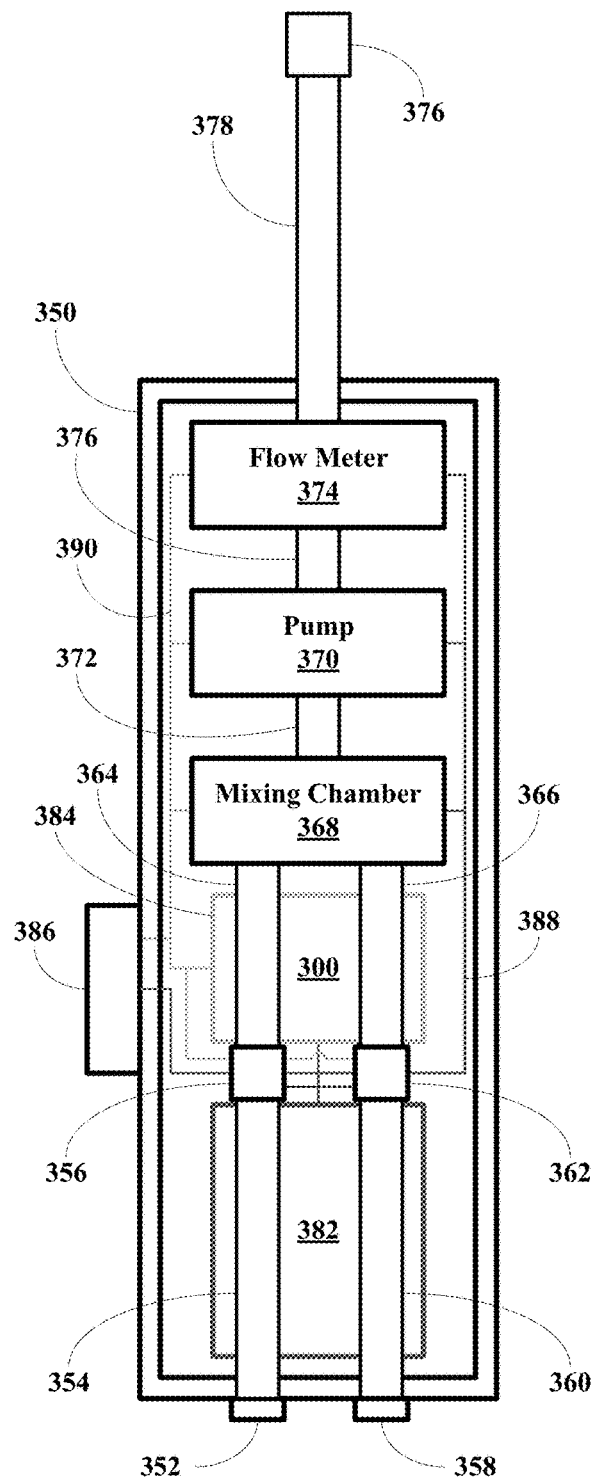
FIG. 3B depicts another embodiment of a wand of this disclosure, where the wand includes flow controllers, a mixing chamber, a pump, a flow meter, a microprocessor, and a power supply and capable of dispensing two fluids.

Referring now to FIG. 3B, another embodiment of a wand of this disclosure, generally 350, is shown to include a first fluid inlet connector 352, a first fluid conduit 354, a first flow controller 356, a second fluid inlet connector 358, a second fluid conduit 360, a second flow controller 362, a third fluid conduit 364, and a fourth fluid conduit 366, and a mixing chamber 368. The first conduit 354 interconnects the first inlet connector 352 and the first flow controller 356. The second conduit 360 interconnects the second inlet connector 358 and the second flow controller 362. The third and fourth conduits 364 and 366 interconnect the flow controllers 356 and 362 and the mixing chamber 368 and supplies two different fluids to the mixing chamber 368 at a controlled rate.

The wand 350 also includes a pump 370, a fifth fluid conduit 372, a flow meter 374, a sixth fluid conduit 376, a fluid wand outlet head 378, and a seventh fluid conduit 380, where the fifth fluid conduit 372 interconnects the pump 370 to the mixing chamber 368, the sixth fluid conduit 376 interconnects the pump 370 and the flow meter 374 and where the seventh fluid conduit 380 interconnects the flow meter 374 and the outlet head 378.

The wand 350 also includes a power supply 382, a microprocessing unit 384, and a control unit 386.

The power supply 382 supplies power to the pump 370, the flow meter 374, and the control unit 386 via electrical wires 388.

The microprocessor 384 is in two-way communication with the flow controllers 356 and 362, the pump 370, the flow meter 374, and the control unit 386 via communication pathways 390. The microprocessor 384 is configured to receive an output signal or signals from the control unit 386, to adjust the flow controllers 356 and 362, to turn the pump 370 ON or OFF, to monitor the fluid flowing through the flow meter 374 and to turn the pump 370 OFF when the flow meter output indicates that a pre-defined or pre-set amount of fluid has passed through the flow meter 374.

Additionally, the microprocessor 370 is also configured to keep track of the amount of fluid dispensed and to notify a user when the fluid in the container containing the fluid is low and needs to be replaced and/or refilled. Of course, it should be recognized that the pump 370 and flow meter 374 may be integrated into a single metering pump.

Containers

Figure 4A:
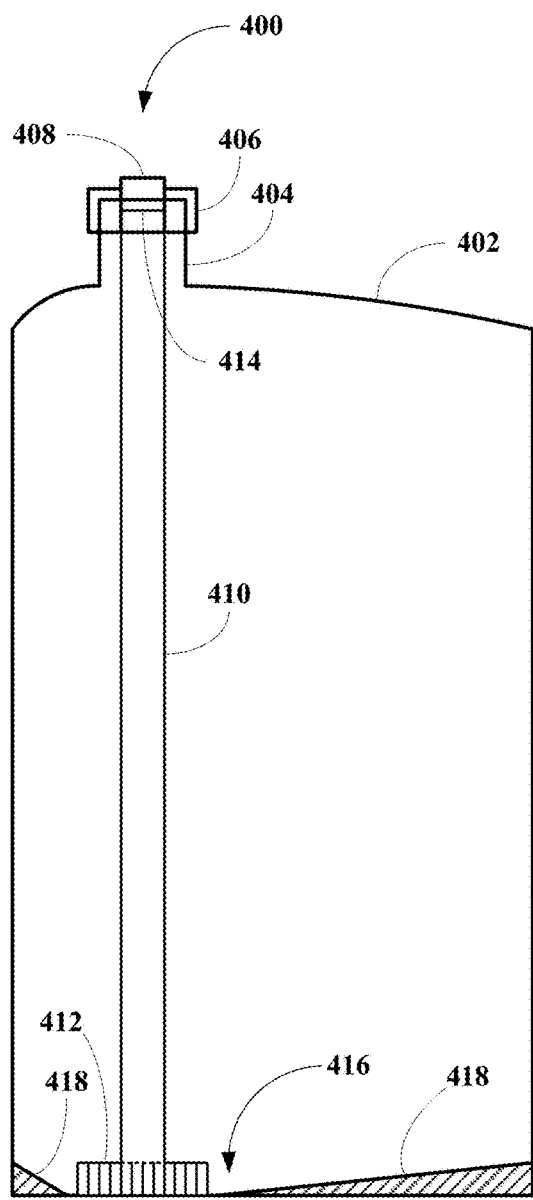
FIG. 4A depicts another embodiment of a designed container of this disclosure.

Referring now to FIG. 4A, another embodiment of a container of this disclosure, generally 400, is shown to include an outer shell 402, a neck 404, a cap 406 having a hose connector 408, and a dip tube 410 having a fretted intake distal end 412 and a proximal end 414 terminating in the connector 408. The container 400 further includes a sump region 416 in which the distal end 414 is situated. The sump region 416 is formed by a ramp 418, which improves drainage of a fluid contained in the container 400.

Figure 4B:
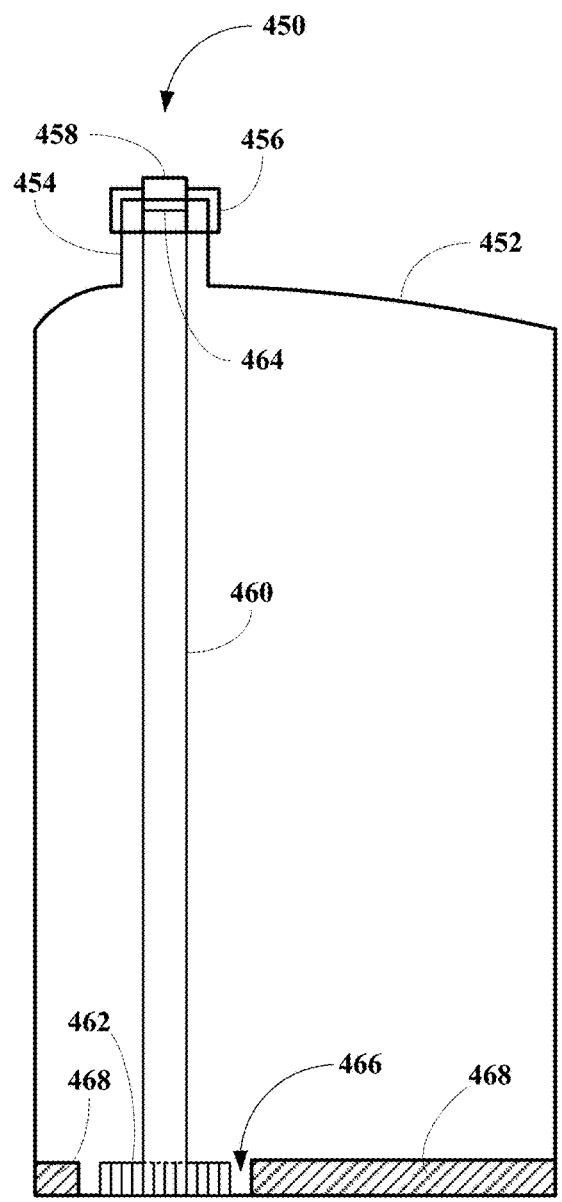
FIG. 4B depicts another embodiment of a designed container of this disclosure.

Referring now to FIG. 4B, another embodiment of a container of this disclosure, generally 450, is shown to include an outer shell 452, a neck 454, a cap 456 having a hose connector 458, and a dip tube 460 having a fretted intake distal end 462 and a proximal end 464 terminating in the connector 458. The container 450 further includes a sump region 466 in which the distal end 462 is situated. The sump region 466 is formed by a step 468, which improves drainage of a fluid contained in the container 450.

Specific Apparatuses

Figure 5A:
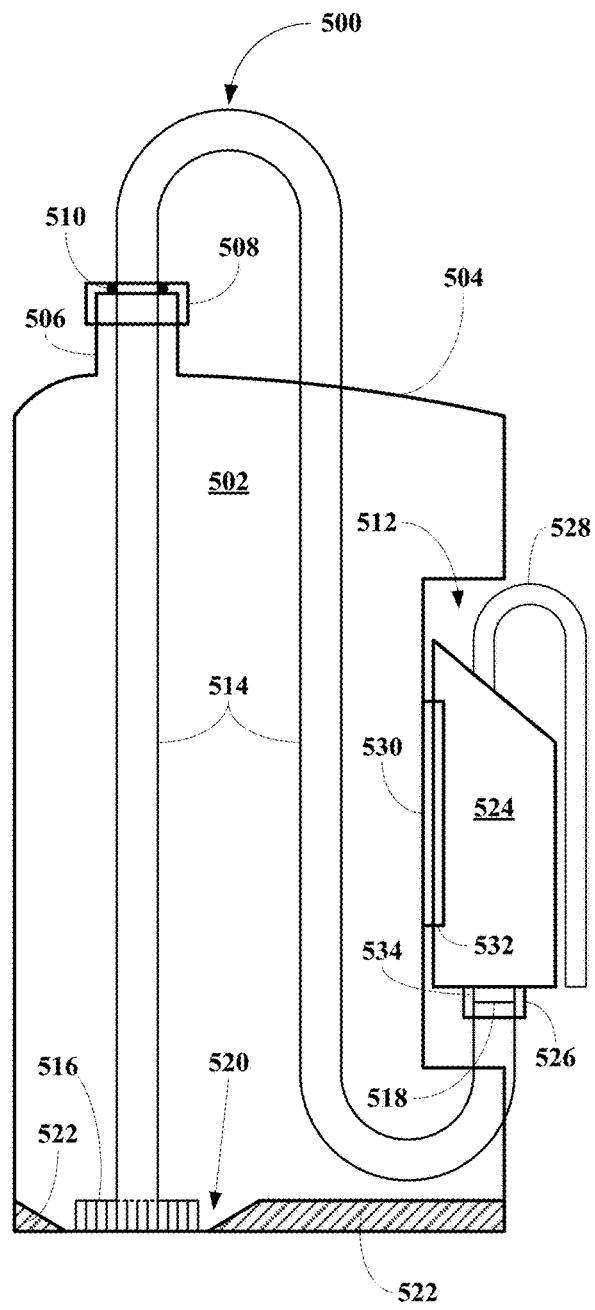
FIG. 5A depicts another embodiment of an apparatus of this disclosure including another designed container and a wand.

Referring now to FIG. 5A, another embodiment of an apparatus of this disclosure, generally 500, is shown to include a container 502 comprising an outer shell 504, a neck 506, a cap 508 having an O-ring 510, a wand receiving slot 512, and a fluid conduit 514 having a fretted intake distal end 516 and a proximate end 518. The container 502 further includes a sump region 520 in which the distal end 516 is situated. The sump region 520 is formed by a ramp 522, which improves drainage of a fluid contained in the container 502. The apparatus 500 also includes a wand 524 having a connector 526 and a dispensing conduit 528. The apparatus 500 include a protrusion 530, while the wand 524 includes a slot 532, where the slot 532 in the wand 524 is designed to receive the protrusion 530 so that the wand 524 may be detachably affixed to the container 502. The wand connector 526 is designed to receive the proximal end 518 of the fluid conduit 514 and to connect it to an internal wand fluid conduit 534.

Figure 5B:
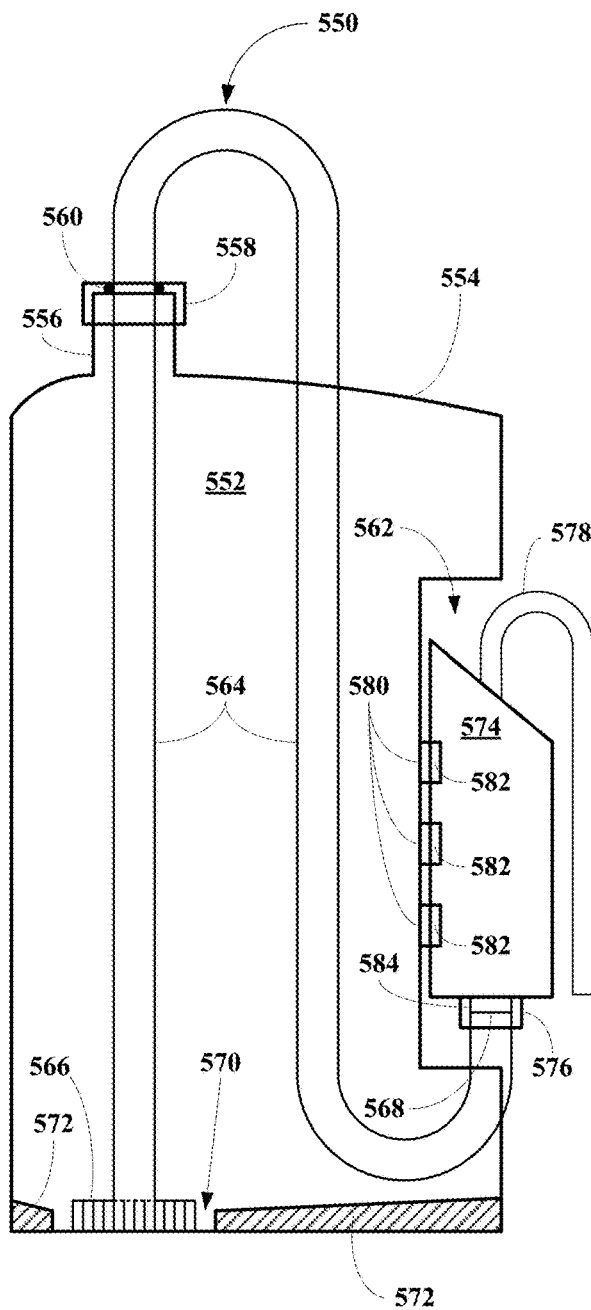
FIG. 5B depicts another embodiment of an apparatus of this disclosure including another designed container and a wand.

Referring now to FIG. 5B, another embodiment of an apparatus of this disclosure, generally 550, is shown to include container 552 comprising an outer shell 554, a neck 556, a cap 558 having an O-ring 560, a wand receiving slot 562, and a fluid conduit 564 having a fretted intake distal end 566 and a proximate end 568. The container 552 further includes a sump region 570 in which the distal end 566 is situated. The sump region 570 is formed by a ramp 572, which improve drainage of a fluid contained in the container 552. The apparatus 550 also includes a wand 574 having a connector 576 and a dispensing conduit 578. The container also includes three container magnets 580, while the wand 574 includes three wand magnets 582, where the container magnets 580 and the wand magnets 582 are designed to engage each other so that the wand 574 may be detachably affixed to the container 552; of course, the container magnets 580 are oppositely polled relative to the wand magnets 582. The wand connector 576 is designed to receive the proximal end 568 of the fluid conduit 564 and to connect it to an internal wand fluid conduit 584.

Dip Tubes

Figures 6A, 6B, 6C, 6D:
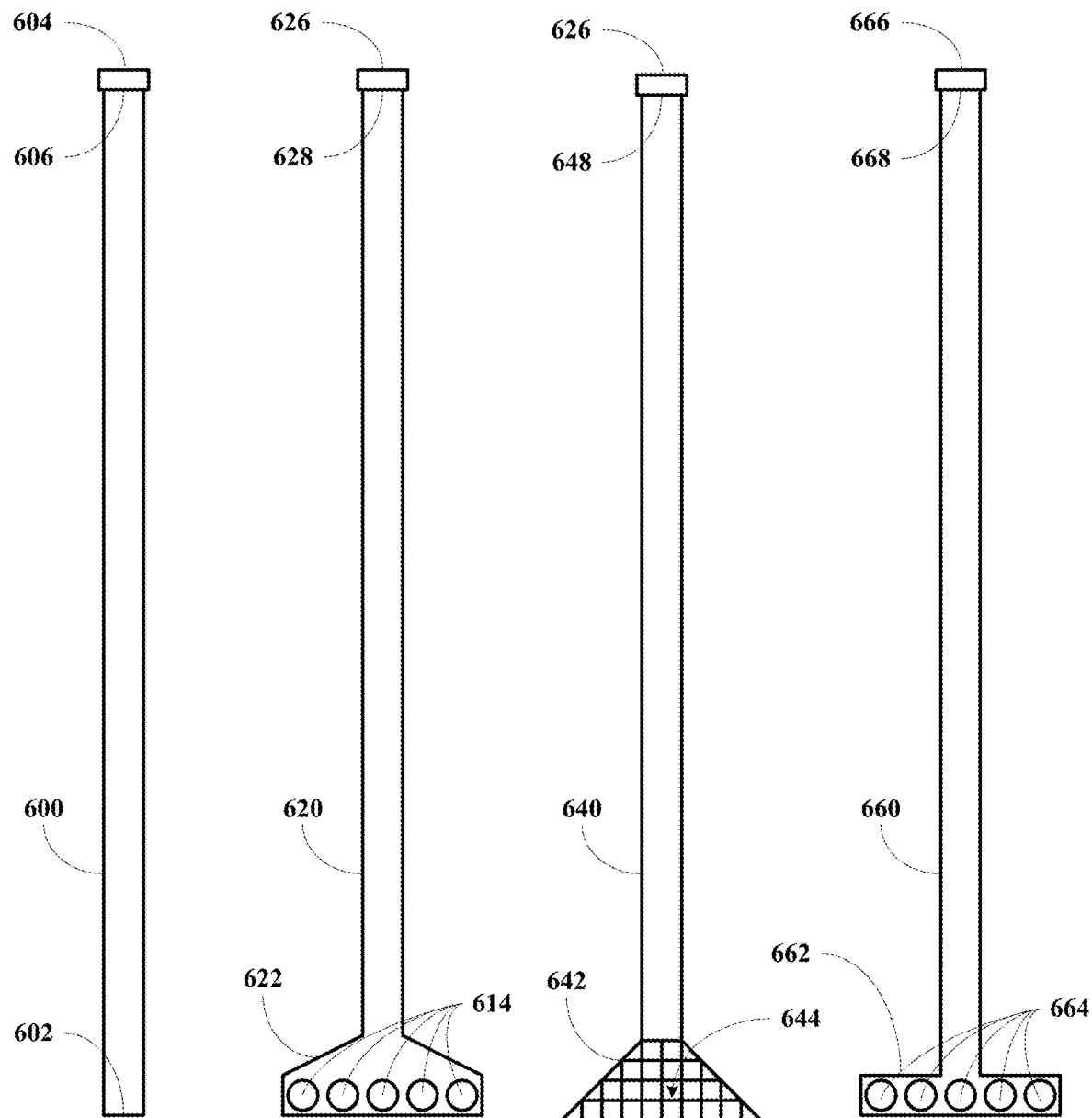
FIG. 6A depicts another embodiment of a dip tube of this disclosure including a simple inlet.
FIG. 6B depicts another embodiment of a dip tube of this disclosure including a flared inlet with circular apertures.
FIG. 6C depicts another embodiment of a dip tube of this disclosure including a triangular wire mesh flared inlet.
FIG. 6D depicts another embodiment of a dip tube of this disclosure including a rectangular flared inlet with circular apertures.

Referring now to FIG. 6A, another embodiment of a dip tube 600 include a straight inlet 602 and a connector 604 associated with an outlet 606, where fluid is sucked from the inlet 602 through the dip tube 600.

Referring now to FIG. 6B, another embodiment of a dip tube 620 include a flared inlet 622 having circular apertures 624 and a connector 626 associated with an outlet 628.

Referring now to FIG. 6C, another embodiment of a dip tube 640 include a triangular inlet 642 having wire mesh 644 and a connector 646 associated with an outlet 648.

Referring now to FIG. 6D, another embodiment of a dip tube 660 include a rectangular flared inlet 662 having circular apertures 664 and a connector 666 associated with an outlet 668.

Control Unit

Referring now to FIG. 7A, an embodiment of a control unit 700 is shown to include an ON/OFF button 702, a first amount selection button 704, a second amount selection button 706 and a speaker 708. Alternatively, the buttons 702, 704, and 706 may be replaced by a dial selector. The buttons 702, 704, and 706 produce output signals that are forwarded to the processing unit or microprocessing unit, which controls the other wand components to dispense an amount of fluid from the fluid container. The processing unit or the microprocessing unit may send signals to the speaker 708 that may also notify the user concerning fluid remaining in the container or when an amount of fluid has been dispenses.

Referring now to FIG. 7B, another embodiment of a control unit 510 is shown to include an ON/OFF button 512, a first amount selection button 514, a variable amount slider controller 516, a speaker 518, and indicator LEDs 520. The buttons 712 and 714, and the slider controller 716 produce output signals that are forwarded to the processing unit or the microprocessing unit, which controls the other wand components to dispense an amount of fluid from the fluid container. The LEDs 720 receive output from the processing unit or the microprocessing unit to indicate the amount of fluid remaining in the fluid container. In certain embodiments, the right LED is a green LED and indicates that the fluid in the fluid container is between fluid and ¼ full. The middle LED is a yellow LED indicates that the fluid is the container is below ¼ full and ⅛ full. The left LED is a red LED indicates that the fluid is less than ⅛ full. These colors are used to notify the user as to the fluid level in the container. The processing unit or the microprocessing unit may send signals to the speaker 718 that may also notify the user concerning fluid remaining in the container or when an amount of fluid has been dispenses.

Referring now to FIG. 7C, another embodiment of a control unit 730 is shown to include an ON/OFF button 732, a display 734, a speaker 736, and indicator LEDs 738. The buttons 732 and the display 734 produce output signals that are forwarded to the processing unit or the microprocessing unit, which controls the other wand components to dispense an amount of fluid from the fluid container. The display 734 also receives output signals from the processing unit or the microprocessing unit and displays information to the user as to amount of fluid dispensed and other information. The LEDs 738 receive output from the processing unit or the microprocessing unit to indicate the amount of fluid remaining in the fluid container. In certain embodiments, the right LED is a green LED and indicates that the fluid in the fluid container is between fluid and ¼ full. The middle LED is a yellow LED indicates that the fluid is the container is below ¼ full and ⅛ full. The left LED is a red LED indicates that the fluid is less than ⅛ full. These colors are used to notify the user as to the fluid level in the container. The processing unit or the microprocessing unit may send signals to the speaker 736 that may also notify the user concerning fluid remaining in the container or when an amount of fluid has been dispenses.

Referring now to FIG. 7D, another embodiment of a control unit 750 is shown to include a display 752 and a speaker 754. The processing unit or the microprocessing unit may send signals to the speaker 754 that may also notify the user concerning fluid remaining in the container or when an amount of fluid has been dispenses. The display 752 sends signals to the processing unit and receives signals from the processing unit or the microprocessing unit concerning the dispensing of fluids and notifying the user about fluid levels and amount or amount of fluid or fluids dispensed.

Referring now to FIG. 7E, another embodiment of a control unit 760 is shown to include a display 762, a speaker 764, and LEDs 766. The processing unit or the microprocessing unit may send signals to the speaker 764 that may also notify the user concerning fluid remaining in the container or when an amount of fluid has been dispenses. The display 762 sends signals to the processing unit or the microprocessing unit and receives signals from the processing unit or the microprocessing unit concerning the dispensing of fluids and notifying the user about fluid levels and amount or amount of fluid or fluids dispensed. The LEDs 766 receive output from the processing unit or the microprocessing unit to indicate the amount of fluid remaining in the fluid container. In certain embodiments, the right LED is a green LED and indicates that the fluid in the fluid container is between fluid and ¼ full. The middle LED is a yellow LED indicates that the fluid is the container is below ¼ full and ⅛ full. The left LED is a red LED indicates that the fluid is less than ⅛ full. These colors are used to notify the user as to the fluid level in the container.

Referring now to FIG. 7F, another embodiment of a control unit 780 is shown to include a display 782. The display 782 sends signals to the processing unit or the microprocessing unit and receives signals from the processing unit or the microprocessing unit concerning the dispensing of fluids and notifying the user about fluid levels and amount or amount of fluid or fluids dispensed.

General Apparatus—Second Type

Apparatus with a Single Reservoir

Figure 8:
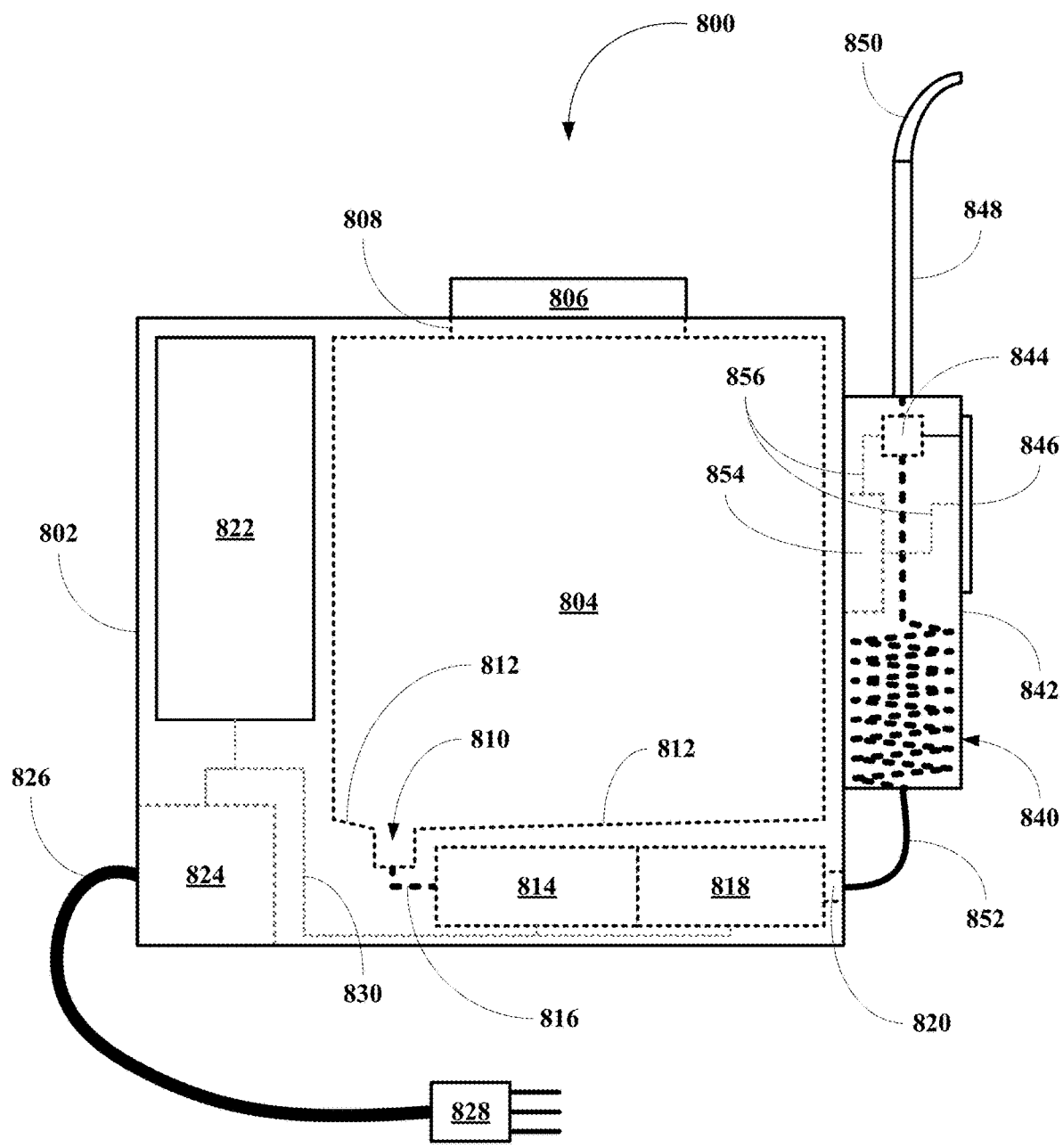
FIG. 8 depicts another embodiment of a fluid dispensing apparatus of this disclosure, where the apparatus includes a fluid reservoir, a wand, a pump, a flow meter, a microprocessor, and a power supply.

Referring now to FIG. 8, another embodiment of dispensing apparatus of this disclosure, generally 800, is shown to include a housing 802 containing a fluid reservoir 804 including a cap 806, a neck 808, a fluid outlet 810, and drainage ramps 812. The apparatus 800 also includes a flow controller 814 connected to the fluid outlet 810 via a fluid conduit 816. The flow controller 814 is in fluid communication with a pump 818 having an outlet 820. The apparatus 800 also includes a control panel 822 and a power supply 824 having a power cord 826 having a plug 828. The power supply 824 is connected to the panel 822, the flow controller 814 and the pump 818 via wires 830. The control panel 822 includes a microprocessor (not shown) and may be of any of the configuration depicted in FIGS. 7A-F.

The apparatus 800 also includes a handheld fluid dispensing device or wand 840 including a wand housing 842 containing a control valve 844, a wand control panel 846, and a dispensing conduit 848 having a nozzle 850. The control valve 844 is connected to the outlet 820 of the pump 818 via a flexible fluid conduit 852. The wand 840 also includes a power supply 854. The power supply 854 is connected to the wand panel 846 and the control valve 844 via wires 856. The wand control panel 846 includes a microprocessor (not shown) and may be of any of the configuration depicted in FIGS. 7A-F.

Apparatus with Two Reservoirs

Figure 9:
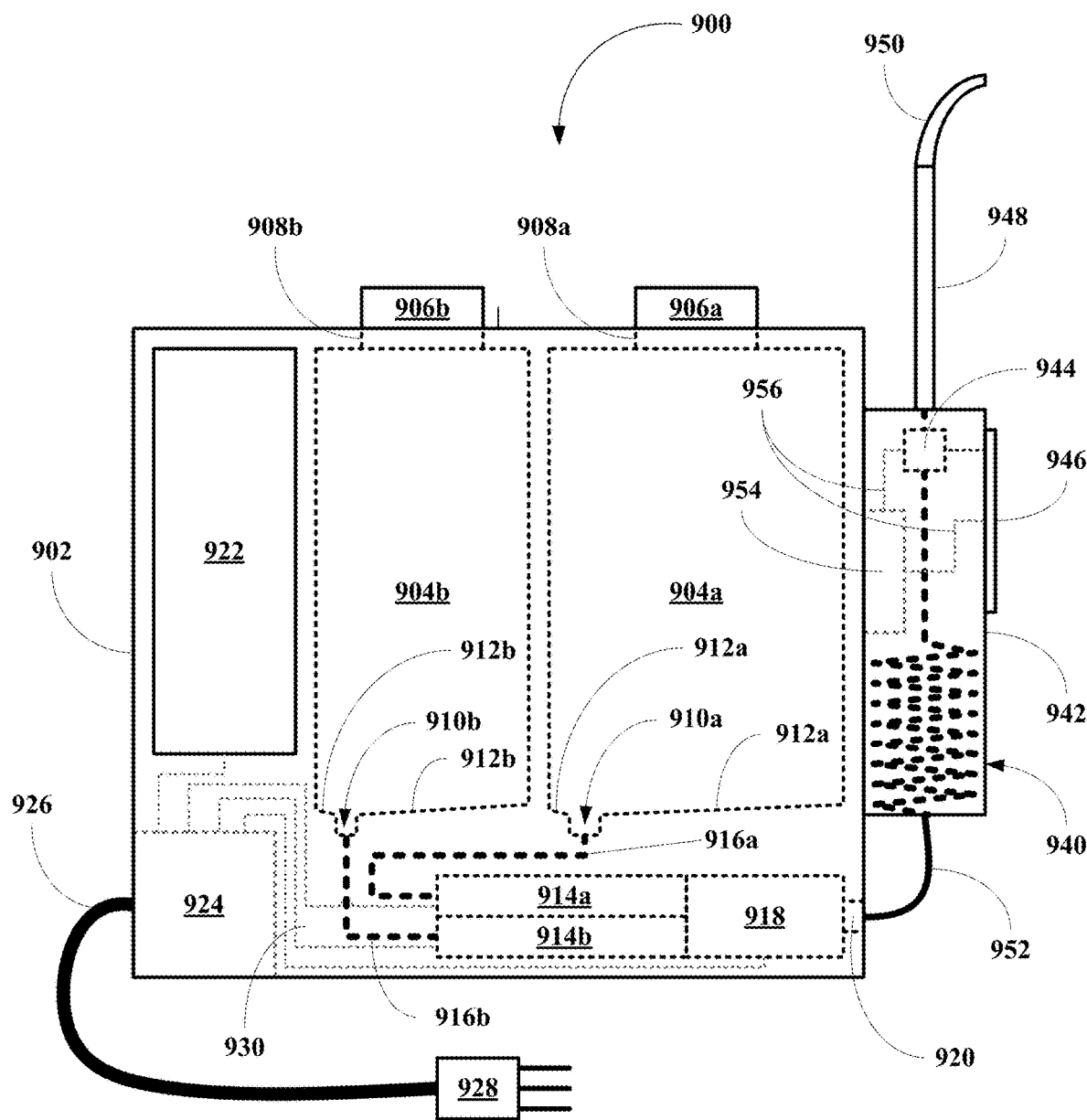
FIG. 9 depicts another embodiment of a fluid dispensing apparatus of this disclosure, where the apparatus includes two fluid reservoirs, a wand, a pump, flow meters, a microprocessor, and a power supply.

Referring now to FIG. 9, another embodiment of dispensing apparatus of this disclosure, generally 900, is shown to include a housing 902 containing two fluid reservoirs 904a&b including caps 906a&b, necks 908a&b, fluid outlets 910a&b, and drainage ramps 912a&b. The apparatus 900 also includes two flow controllers 914 connected to the fluid outlets 910a&b via fluid conduit 916a&b. The flow controllers 914a&b are in fluid communication with a pump 918 having an outlet 920. The apparatus 900 also includes a control panel 922 and a power supply 924 having a power cord 926 having a plug 928. The power supply 924 is connected to the panel 922, the flow controllers 914a&b and the pump 918 via wires 930. The control panel 922 includes a microprocessor (not shown) and may be of any of the configuration depicted in FIGS. 7A-F.

The apparatus 900 also includes a handheld fluid dispensing device or wand 940 including a wand housing 942 containing a control valve 944, a wand control panel 946, and a dispensing conduit 948 having a nozzle 950. The control valve 944 is connected to the outlet 920 of the pump 918 via a flexible fluid conduit 952. The wand 940 also includes a power supply 954. The power supply 954 is connected to the wand panel 946 and the control valve 944 via wires 956. The wand control panel 946 includes a microprocessor (not shown) and may be of any of the configuration depicted in FIGS. 7A-F.

Apparatus with Three Reservoirs

Figure 10:
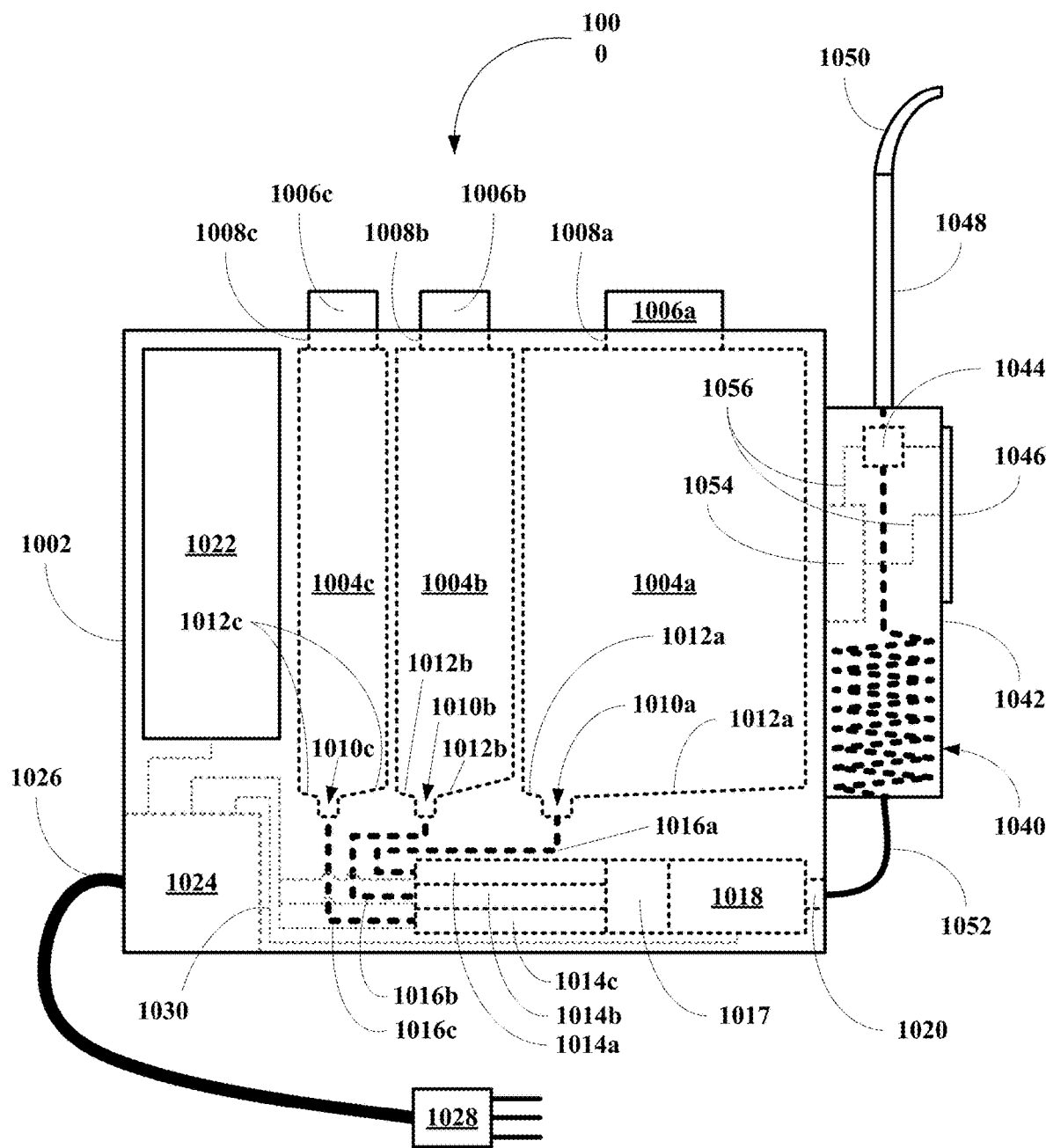
FIG. 10 depicts another embodiment of a fluid dispensing apparatus of this disclosure, where the apparatus includes three fluid reservoir, a wand, a pump, flow meters, a microprocessor, and a power supply.

Referring now to FIG. 10, another embodiment of dispensing apparatus of this disclosure, generally 1000, is shown to include a housing 1002 containing two fluid reservoirs 1004a-c including caps 1006a-c, necks 1008a-c, fluid outlets 1010a-c, and drainage ramps 1012a-c. The apparatus 1000 also includes three flow controllers 1014 connected to the fluid outlets 1010a-c via fluid conduit 1016a-c. The apparatus 1000 also includes a mixing chamber 1017 interposed between the flow controllers 1014a-c and the pump 1018. The flow controllers 1014a-c are in fluid communication with a pump 1018 having an outlet 1020. The apparatus 1000 also includes a control panel 1022 and a power supply 1024 having a power cord 1026 having a plug 1028. The power supply 1024 is connected to the panel 1022, the flow controllers 1014a-c and the pump 1018 via wires 1030. The control panel 1022 includes a microprocessor (not shown) and may be of any of the configuration depicted in FIGS. 7A-F.

The apparatus 1000 also includes a handheld fluid dispensing device or wand 1040 including a wand housing 1042 containing a control valve 1044, a wand control panel 1046, and a dispensing conduit 1048 having a nozzle 1050. The control valve 1044 is connected to the outlet 1020 of the pump 1018 via a flexible fluid conduit 1052. The wand 1040 also includes a power supply 1054. The power supply 1054 is connected to the wand panel 1046 and the control valve 1044 via wires 1056. The wand control panel 1046 includes a microprocessor (not shown) and may be of any of the configuration depicted in FIGS. 7A-F.

In FIGS. 8-10, the reservoirs 804, 904a&b, and 1004a-c may be replaced by container receptacles containing different fluids. In such embodiments, the caps 806, 906a&b, and 1006a-c would include dip tubes as shown above and the conduits 816, 916a&b, and 1016a-c would extend from the dip tubes to the flow controllers 814, 914a&b, and 1014a-c.

Apparatus with Two Reservoirs

Figure 11:
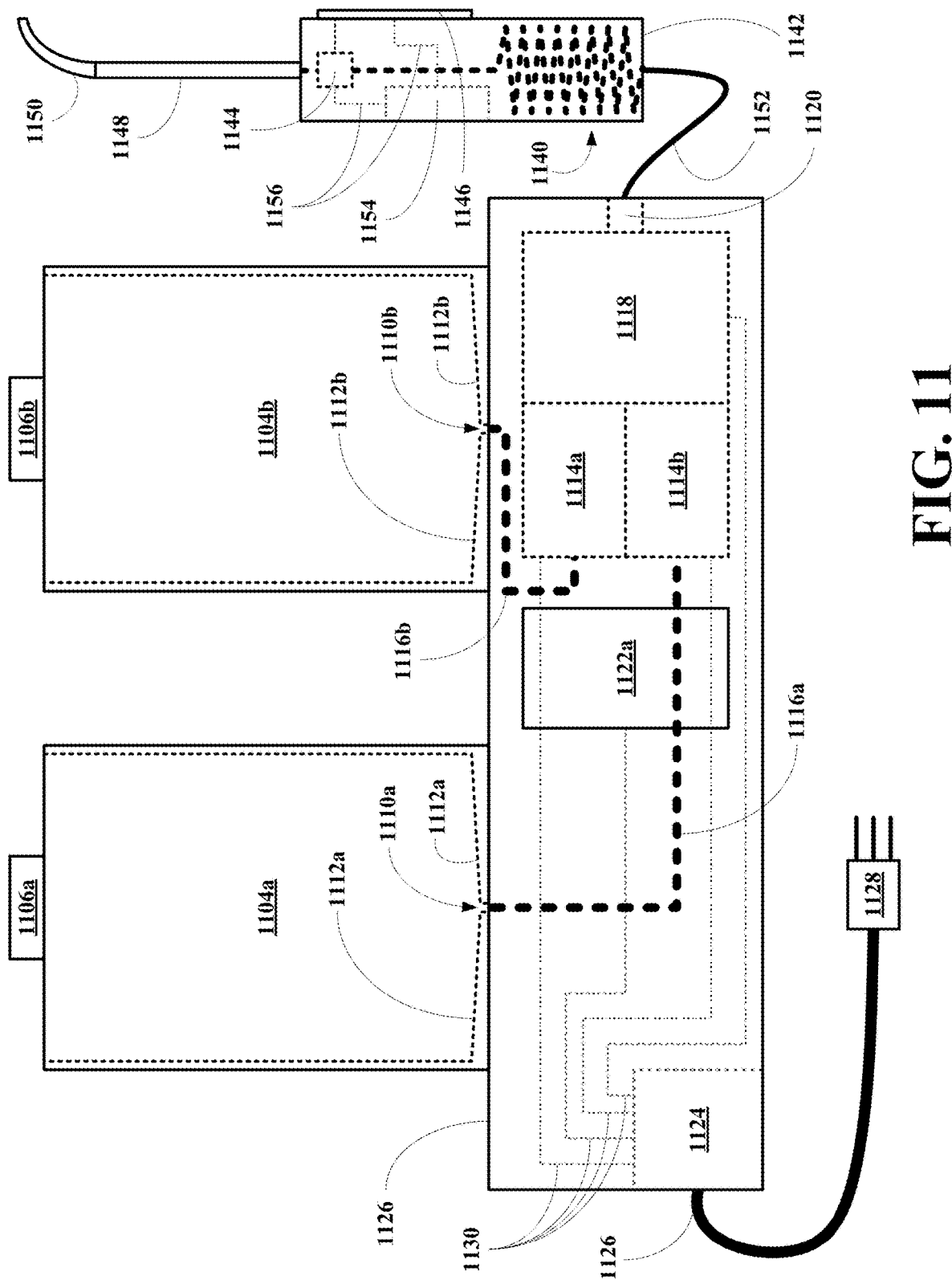
FIG. 11 depicts another embodiment of a fluid dispensing apparatus of this disclosure, where the apparatus includes three fluid reservoir, a wand, a pump, flow meters, a microprocessor, and a power supply.

Referring now to FIG. 11, another embodiment of dispensing apparatus of this disclosure, generally 1100, is shown to include a housing 1102, two fluid reservoirs 1104a&b including caps 1106a&b, fluid outlets 1110a&b, and drainage ramps 1112a-c. The apparatus 1100 also includes two flow controllers 1114a&b connected to the fluid outlets 1110a&b via fluid conduit 1116a&b. The flow controllers 1114a&b are in fluid communication with a pump 1118 having an outlet 1120. The apparatus 1100 also includes a control panel 1122 and a power supply 1124 having a power cord 1126 having a plug 1128. The power supply 1124 is connected to the panel 1122, the flow controllers 1114a&b and the pump 1118 via wires 1130. The control panel 1122 includes a microprocessor (not shown) and may be of any of the configuration depicted in FIGS. 7A-F.

The apparatus 1100 also includes a handheld fluid dispensing device or wand 1140 including a wand housing 1142 containing a control valve 1144, a wand control panel 1146, and a dispensing conduit 1148 having a nozzle 1150. The control valve 1144 is connected to the outlet 1120 of the pump 1118 via a flexible fluid conduit 1152. The wand 1140 also includes a power supply 1154. The power supply 1154 is connected to the wand panel 1146 and the control valve 1144 via wires 1156. The wand control panel 1146 includes a microprocessor (not shown) and may be of any of the configuration depicted in FIGS. 7A-F.

Apparatus with a Single Reservoir and a Pipette

Referring now to FIGS. 12A&B, another embodiment of dispensing apparatus of this disclosure, generally 1200, is shown to include a fluid reservoir 1202 including a cap 1204, wherein the cap 1204 is specially designed to work with an electronic pipette 1206 having a body 1208 and a pipette inlet/outlet 1210.

Apparatus with a Single Reservoir

Referring now to FIG. 13, another embodiment of a fluid dispensing apparatus of this disclosure, generally 1300, is shown to include a fluid container 1302 including a cap 1304 having a dip tube 1306 including a fluid inlet 1308 with radial slits 1310, a handle 1312, and a ramp 1314 as shown in the cutout area 1316.

The apparatus 1300 also includes a fluid dispensing device or wand 1320 including a fluid inlet connector 1322, an inlet fluid conduit 1324, a pump 1326, an outlet 1328, and an outlet fluid conduit 1330. The inlet fluid conduit 1324 connects the dip let 1306 to the pump 1326. The outlet fluid conduit 1332 connects that outlet 1328 to the pump 1326. The wand 1320 also includes a battery based power supply 1334 with batteries 1336, a microprocessor 1338, and a dispensing trigger 1340. The wand 1320 may also include a flow meter (not shown). The power supply 1334 supplies power to the microprocessor 1338, the pump 1326, the optional flow meter, and the trigger 1340 via electrical wires 1342. The microprocessor 1338 is in two-way communication via communication wires 1344 with the pump 1326, the optional flow meter, and the trigger 1340 and is configured to receive an output signal or signals from the trigger 1340, and to turn the pump 1326 ON or OFF. If the wand 1320 includes a flow meter to monitor fluid flow through the flow meter and to turn the pump 1326 OFF when the flow meter output indicates that a pre-defined or pre-set amount of fluid has passed through the flow meter. Of course, it should be recognized that the pump 1326 and flow meter may be integrated into a single metering pump. Additionally, the microprocessor 1338 is also configured to keep track of the amount of fluid dispensed and to notify a user when the fluid in the container containing the fluid is low and needs to be replaced and/or refilled. The apparatus 1300 also may includes a flexible fluid conduit as described above.

Apparatus with a Single Reservoir

Referring now to FIG. 14, another embodiment of a fluid dispensing apparatus of this disclosure, generally 1400, is shown to include a housing 1402 including a container receiving structure 1404 including an inlet connector 1406 having an inlet fluid conduit 1408 connect to a solenoid 1410 including an inlet connector 1412, and an outlet connector 1414. The housing 1402 also includes a solenoid outlet conduit 1416 connect to an housing fluid outlet connector 1418 terminating in a flexible conduit 1420. The housing 1402 also includes feet 1422 and an air grill 1424 and air flow channels 1426.

The housing 1402 also includes a fluid level sensor 1428 and a power supply 1430 having a power cord connector 1432 through which a power cord 1434 extends and having a plug 1436. The housing 1402 also includes a microprocessor 1438. The power supply 1430 provide power to the microprocessor 1438 and to the solenoid 1410 via wires 1440. The microprocessor 1438 is in two-way communication with the solenoid 1410 and the sensor 1428 via communication wires 1442.

The apparatus 1400 also includes a replaceable fluid container 1444 including a neck 1446 ending in an outlet connector 1448 having a fluid outlet 1450. The outlet connector 1448 and the fluid outlet 1450 are adapted to engage the inlet connector 1406 and the inlet fluid conduit 1408. The sensor 1428 supplies information to the microprocessor 1438 so that a user may be informed when the fluid level is low or the container 1444 is empty.

The apparatus 1400 also includes a handheld fluid dispensing device or wand 1460 connected to the flexible conduit 1420 and includes a battery pack 1462, a wand control panel 1464, and a dispensing outlet nozzle 1466. The housing also includes a wand bracket 1468 for storing the wand 1460 when it is not being used. The wand 1460 and the control panel 1464 may be any wand or control panel described therein. Of course, the wand 1460 may be connected to the power supply 1430 via a wire (not shown) attached to the flexible conduit 1420.

Apparatus with a Single Reservoir

Referring now to FIG. 15, another embodiment of a fluid dispensing apparatus of this disclosure, generally 1500, is shown to include a fluid container 1502 including a cap 1504, an inlet conduit 1506, an interior 1508, an outlet fluid conduit 1510 including a wire mesh fluid inlet 1512, a male outlet quick connector 1514 associated with the outlet fluid conduit 1510, a wand bracket 1516, and a ramp 1518.

The apparatus 1500 also includes a control unit 1550 having a control panel 1552 comprising a touchscreen. The control unit 1550 also includes a female inlet quick connector 1554, a inlet fluid conduit 1556, and a fluid outlet 1558 connected to a flexible fluid conduit 1560. The control unit 1550 also includes a microprocessor (not shown), a power supply (not shown), a pump (not shown) and may include a flow control (not shown), all of these components may be any of the components described in any of the embodiments therein. The apparatus 1500 also includes a handheld fluid dispensing device or wand 1562 including an fluid inlet connector 1564, a fluid outlet 1566, and a dispenser trigger 1568. The wand 1562 may also include any of the components of the wands described in any of the embodiments herein.

Apparatus with Two Single Reservoirs

Referring now to FIG. 16, another embodiment of a fluid dispensing apparatus of this disclosure, generally 1600, is shown to include a housing 1602 including two fluid container receiving members 1604*a&b* adapted to receive two fluid containers 1606*a&b*. The housing 1602 also includes a fluid outlet connector 1608, a flexible conduit bracket 1610, a flexible coiled fluid conduit 1612, a wand bracket 1614, a control panel 1616, and a plurality of control buttons 1618. The apparatus 1600 also includes a wand 1620 including a hanger 1622, a fluid inlet 1624, a fluid outlet 1626, a Start button, a 1 button, a 2 button, and a 3 button connected for starting fluid flow, select which fluid or a combination of both fluids; of course, the wand may be any wand described herein.

The apparatus 1600 may also include a microprocessor (not shown), a power supply (not shown), a pump (not shown) and flow controls (not shown), or any other components described in any of the embodiments therein. The wand 1620 may also include any of the components of the wands described in any of the embodiments herein.

Apparatus with Three Reservoirs

Figure 17B:
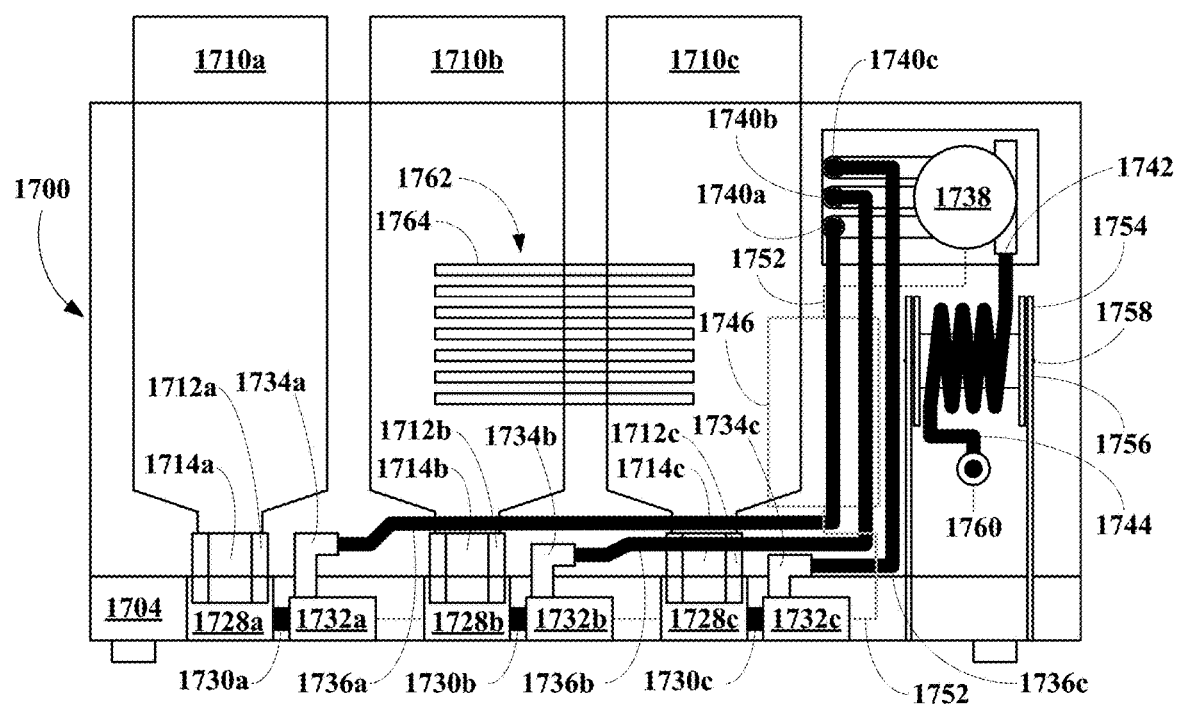

Referring now to FIGS. 17A&B, another embodiment of a fluid dispensing apparatus of this disclosure, generally 1700, is shown to include a removable housing 1702 and a stationary housing 1704 including feet 1706. The removable housing 1702 includes fluid sight windows or slots 1708*a-c*. The apparatus 1700 also includes three fluid containers 1710*a-c* including container fluid connectors 1712*a-c* having fluid outlet 1714*a-c* as shown in FIG. 17B, where the removable housing 1702 has been removed. The apparatus 1700 also include a wand receiving slot or area 1716 including a handheld wand 1718 positioned therein. The wand 1718 includes three selector buttons 1, 2, and 3 for selecting the fluid, a dispensing button 1720 and wireless communication hardware and associated software. The wand 1718 may also include a power supply such as batteries or a wire from a power supply in the apparatus 1700. The removable housing 1702 also include a control panel 1722 including an ON/OFF button 1724 and a support button 1726. The wand 1718 also includes a fluid inlet connector 1727.

The stationary housing 1704 includes three housing fluid connectors 1728*a-c* designed to receive the container connectors 1712*a-c* and including inlet conduits 1730*a-c*. The inlet conduits 1730*a-c* are connected to flow controllers 1732*a-c* including outlet fittings 1734*a-c*. The outlet fittings 1734*a-c* are connected to fluid conduits 1736*a-c*. The stationary housing 1704 includes a pump 1738 including pump inlets 1740*a-c* into which the conduits 1736*a-c* terminate and an outlet 1742 and an outlet conduit 1744. The apparatus 1700 also includes a control unit and power supply 1746 having a power cord 1748 having a plug 1750. The control unit/power supply 1746 is connected to the control panel 1722, the flow controllers 1732*a-c* and the pump 1738 via wires 1752. The control panel 1746 includes a microprocessor (not shown) and may be of any of the configuration described herein. The stationary housing 1704 also includes a bracket 1754 for a spool 1756 mounted on a shaft 1758 supported in the bracket 1754. The spool 1756 spools a length of the outlet conduit 1744. The stationary housing 1704 also includes an outlet fitting 1760. The outlet conduit 1744 is connected to the wand connector 1727. The stationary housing 1704 also include an air grill 1762 including air slits 1764.

Apparatus with Three Reservoirs

Referring now to FIGS. 18, another embodiment of a fluid dispensing apparatus of this disclosure, generally 1800, is shown to include a housing 1802 including a window 1804, an access door 1806 having a handle 1808 and three containers 1810a-c including outlet connectors 1812a-c having fluid conduits 1814a-c. The housing 1802 also includes inlet flow controllers 1816a-c. The flow controllers 1816a-c are connected to a fluid conduit 1818. The apparatus 1800 also includes a solenoid or pump 1820 including a solenoid inlet 1822 connected to the conduit 1818, and a solenoid outlet 1824 connected to an outlet conduit 1826. The housing 1802 also includes a panel 1828 including a touchscreen 1830, a conduit fitting 1832 through which the conduit 1826 passes, and a wand receiver 1834 having a wand 1836 deposited therein. The wand 1836 includes an inlet connector 1838 to which the conduit 1826 connects. The apparatus 1800 also includes a power supply 1840 connected to a power cord 1842 having a plug 1844 and passing through a power fitting 1846. The apparatus 1800 also includes a controller 1848 having a microprocessor (not shown). The power supply 1840 supplies power to the solenoid 1820, the touchscreen 1830, and the flow controllers 1816a-c via power wires 1850. The controller 1848 is connected to the solenoid 1820, the touchscreen 1830, and the flow controllers 1816a-c via 2-way communication wires 1852.

Washing Machine with Three Container Fluid Dispenser

Referring now to FIG. 19, an embodiment of a washing machine apparatus, generally 1900, is shown to include a washing machine 1902 having a washing machine control panel 1904 for controlling the washing machine (controls not shown), a door 1906 having a handle 1908. The apparatus 1900 also includes a fluid dispensing unit 1910. The fluid dispensing unit 1910 includes a microprocessor 1912 and control buttons 1914, where the microprocessor 1912 and buttons 1914 are connected to the power supply of the washing machine (not shown). The unit 1910 also includes three fluid reservoirs 1916a-c and three covers 1918a-c having handles 1920a-c for opening the covers 1918a-c to add fluid into the reservoirs 1916a-c. The unit 1910 also includes conduits 1922a-c connecting the reservoirs 1914a-c to fluid flow controllers 1924a-c, which may also include pumps, but because the reservoirs are above the flow controllers, gravity may be sufficient to provide the needed pressure for adequate fluid flow. The controllers 1922a-c are connected to discharge conduits 1926a-c for discharging fluids into the interior of the washing machine 1902. The microprocessor 1912 controls the controllers 1924a-c and the buttons 1914 via communication wires 1928. It should be recognized that the microprocessor 1926 and the buttons 1928 may be integrated into the washing machine controls. The unit 1910 is designed to dispense laundry detergent, softener, or stain fluids or other fluids into the washing machine according to the buttons pushed. Of course, the buttons may be replaced by any controller described herein.

Distributed Washing Fluid Dispenser for Laundry Mats

Referring now to FIG. 20A, an embodiment of a laundry mat system of this disclosure, generally 2000, is shown to include a plurality of washing machines 2002a-1 including doors 2004a-1 having handles 2006a-1, control panels 2008a-1, and three different fluid inlets 2010a-1, 2012a-1, and 2014a-1. The system 2000 also includes a fluid dispensing unit 2020 including three different outlets 2022, 2024, and 2026 and three different fluid conduits 2028, 2030, and 2032.

Figure 20B:
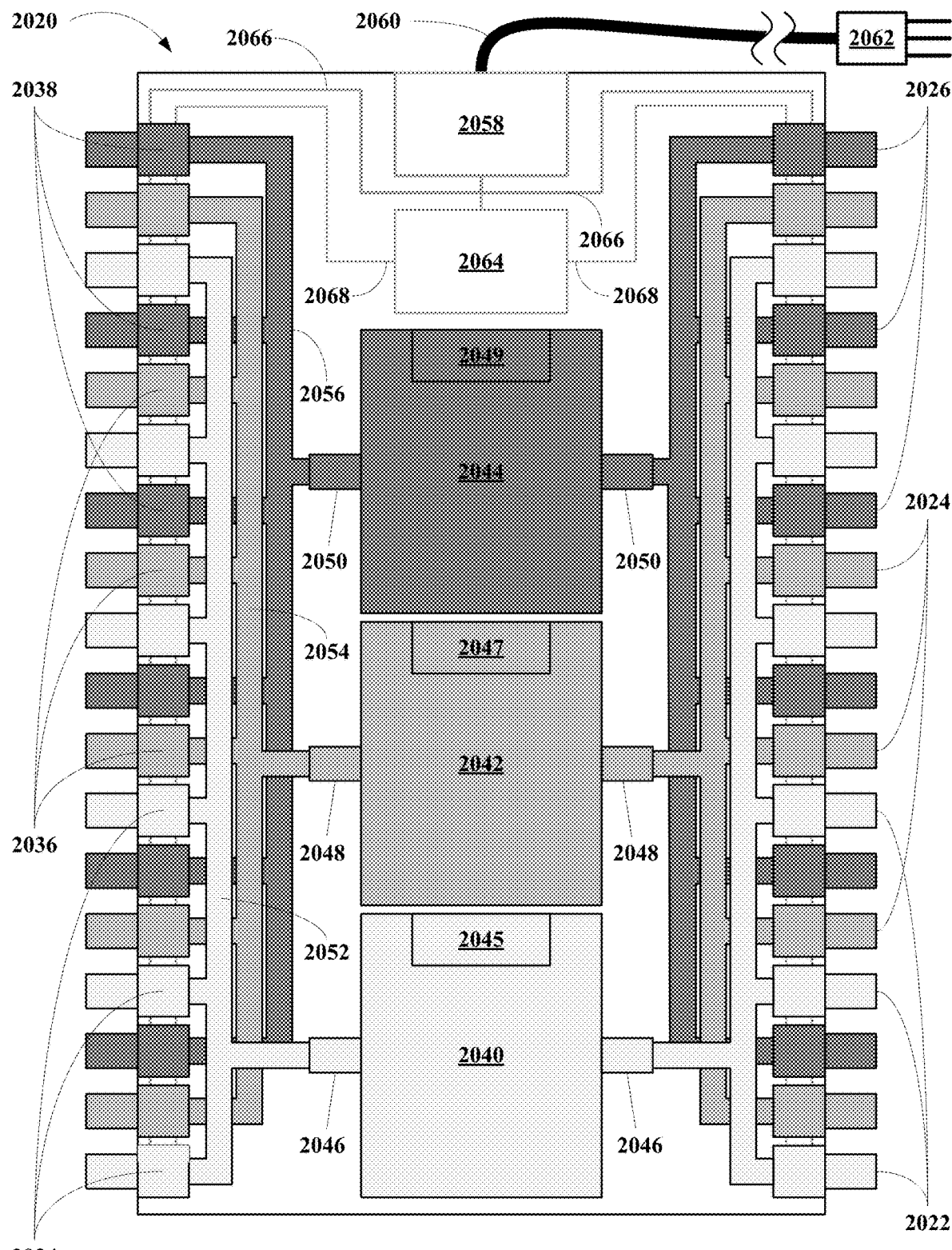

Referring now to FIG. 20B, the unit 2020 also includes three pump and fluid flow controllers 2034, 2036, and 2038 for controlling the fluid flow to the washing machines 2002a-1. The unit 2020 also include fluid reservoirs 2040, 2042, and 2044. The reservoir 2040 includes a refilling door 2045 and outlets 2046; the reservoir 2042 includes a refilling door 2047 and outlets 2048; and the reservoir 2044 includes a refilling door 2049 and outlets 2050. The unit 2020 includes conduits 2052, 2054, and 2056, where the conduit 2052 interconnects the reservoir 2040 to the pump/controllers 2034, the conduit 2054 interconnects the reservoir 2042 to the pump/controllers 2036, the reservoir 2044 to the pump/controllers 2038. The unit 2020 also includes a power supply 2058 including a cord 2060 having a plug 2062 and a processor 2064. The power supply 2058 supplies power to the pump/controllers 2034, 2036, and 2038 and the processor 2064 via power wires 2066. The processor 2064 controls the pump/controllers 2034, 2036, and 2038 via communication wires 2068. The processor 2064 is in wire less or wired communication with the washing machines 2002a-1.

When a user enters liquid commands via the washing machine control panels 2008a-1, the liquid commands are transmitted via the wireless communication or wired communication to the processor 2064 which issues instruction to the appropriate pump/controllers 2034, 2036, and 2038 to dispense the appropriate type and volume of fluid to the washing machines 2002a-1. Of course, each washing machine may be configured as shown in FIG. 19. All payments for use of the fluids may be affected via coin apparatuses well known in the art or via credit or debit card transactions or via automated account debiting. It should also be recognized that the apparatus of FIGS. 20A&B may include containers dedicated to specific detergents, softeners, or other laundry fluids, where the control panel of each washing machine may permit the consumer to select the type of laundry detergent, softener, and other fluid to be used.

Washing Machine Embodiments Including a Dispensing Apparatus Connected to Cold and Hot Water Lines Washing Machine Dispensing Apparatus Referring to FIGS. 21A-H, another embodiment of a washing machine fluid dispensing apparatus, generally 2100, shown in multiple views.

Figure 21A:
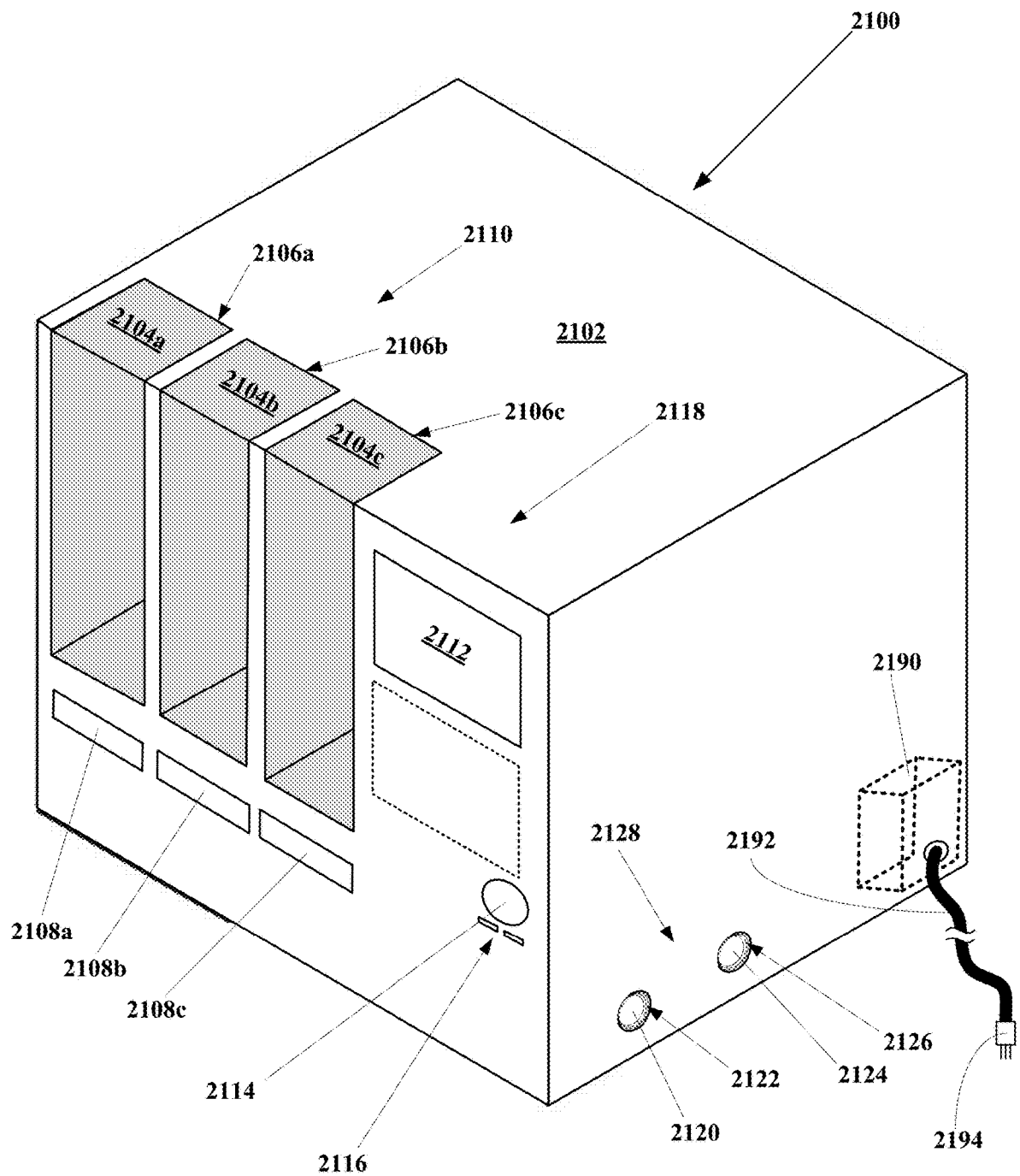

Looking at FIG. 21A, a front perspective view and a front plan view of the apparatus 2100 is shown to include a housing 2102. The apparatus 2100 also includes three substantially rectangular solid fluid/liquid containers 2104a-c, three container receiving slot 2106a-c, and three container release buttons 2108a-c disposed in a front, left portion 2110 of the apparatus 2100.

The apparatus 2100 also includes a touch screen 2112, a concierge button 2114, and one or more USB ports 2116 disposed in a front, right portion 2118 of the apparatus 2100 all in communication with a processor 2119 including an operating system, memory, peripheral ports, and communication hardware and software. The apparatus 2100 also includes a right side cold water inlet 2120 and a right side cold water inlet fitting 2122 and a right side hot water inlet 2124 and a right side hot water inlet fitting 2126 disposed on a right side portion 2128 of the apparatus 2100. The apparatus 2100 also includes a power supply 2190 including a power chord 2192 ending in a wall plug 2194.

Figure 21B:
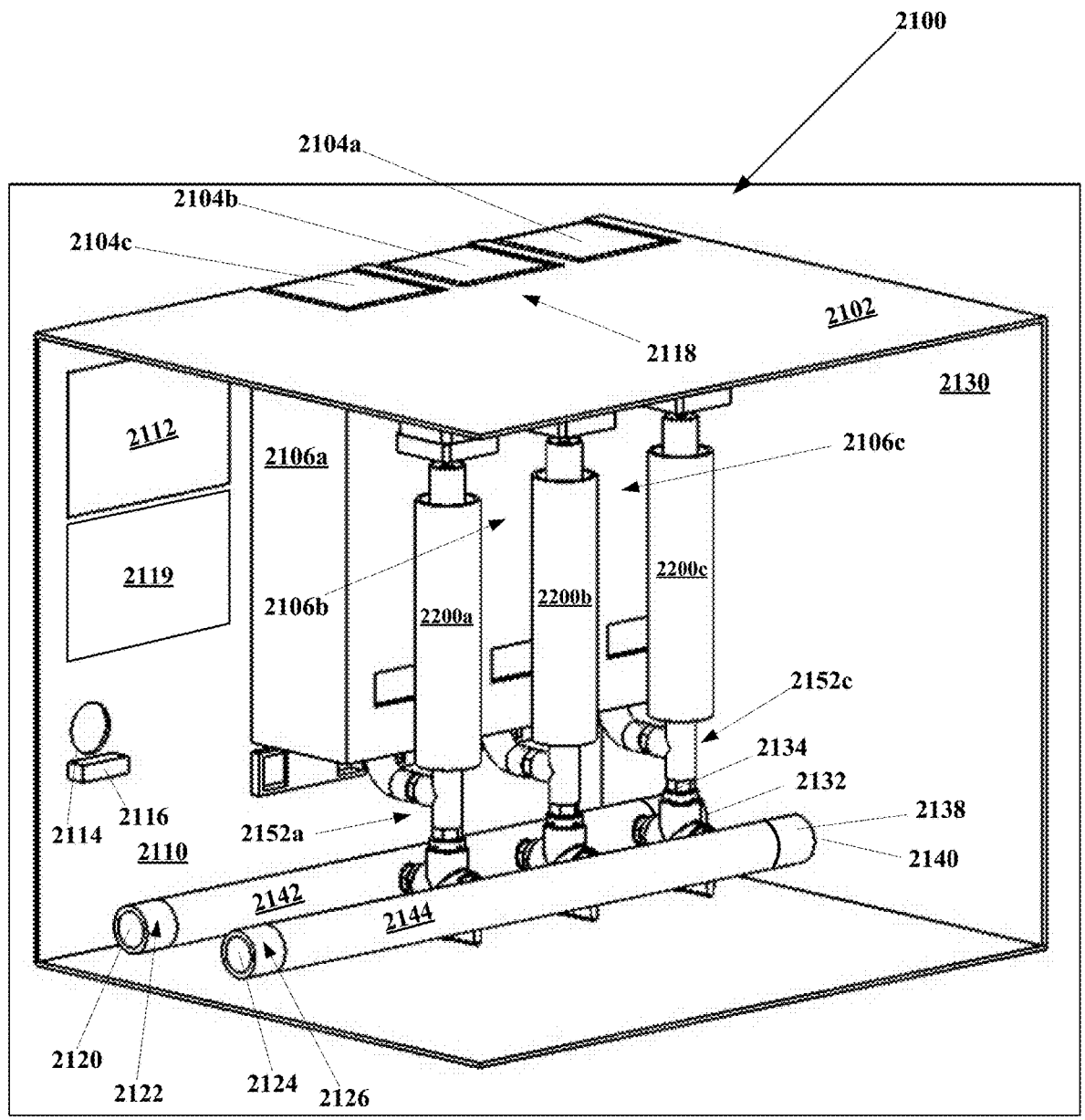

Looking at FIG. 21B, a perspective view of an interior 2130 of the apparatus 2100 is shown to include a left side cold water outlet 2132, a left side cold water outlet fitting 2134, a left side hot water outlet 2136, and a left side hot water outlet fitting 2138 disposed in a left side portion 2140. The apparatus 2100 also includes a cold water conduit 2142 and a hot water conduit 2144. The apparatus 2100 also includes three fluid injection assemblies 2200a-c for introducing the fluids from the three containers 2104a-c into either the cold water conduit 2142 and/or the hot water conduit 2144.

Looking at FIG. 21C, a front plan view of the apparatus 2100 showing all three containers 2104a-c in place in their slots 2106a-c.

Looking at FIG. 21D, a view of the apparatus 2100 along cutting line A-A is shown and FIG. 21E shows an expanded view of the region AA. The view of FIG. 21D shows the interior 2130, the container 2104c in its container slot 2106c, the injector assembly 2200c, the cold conduit 2142 and the hot water conduit 2144. The container 2104c includes a container fluid connector 2148c and its corresponding slot fluid connector 2150c. The apparatus 2100 also includes a fluid connecting conduit 2152c connecting the slot connector 2152c to the cold conduit 2142 and hot conduit 2144 and the injector assembly 2200c. The connecting conduit 2152c includes a curved section 2154c ending in a curved section check valve 2156c, a straight section 2158c including a straight section check valve 2160c, and a T 2162c including a cold water check valve 2164c and a hot water check valve 2166c. The T 2164c also includes a control valve 2168c for directing fluid flow into either the cold conduit 2140, hot conduit 2142 or both. The release button 2108c includes a release arm 2170c having a locking end 2172c. The container receiving slot 2106c includes a locking end receiving slots 2174c.

Figure 21F:
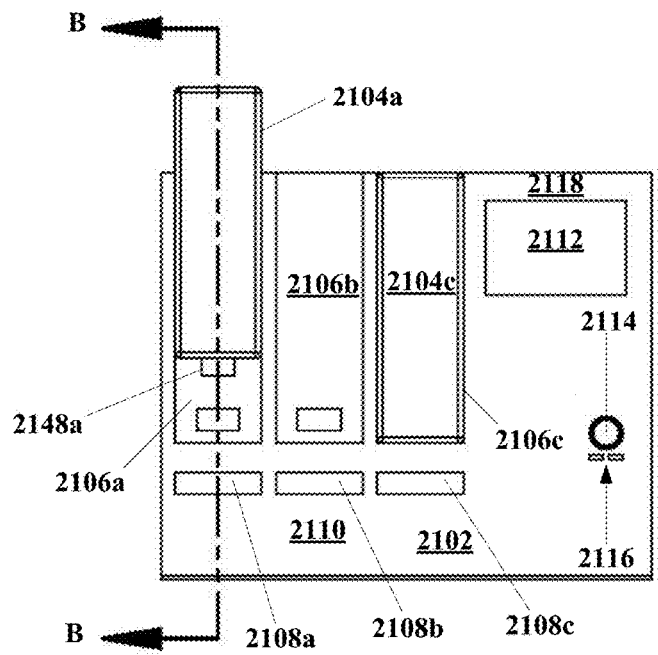

Looking at FIG. 21F, a front plan view of the apparatus 2100 showing the container 2104b removed from its container receiving slot 1206b, the container 2104b being removed from its slot 2106a and the container 2104c in place in its slot 2106c. The container 2104a includes the container fluid connector 2148a.

Figure 21G:
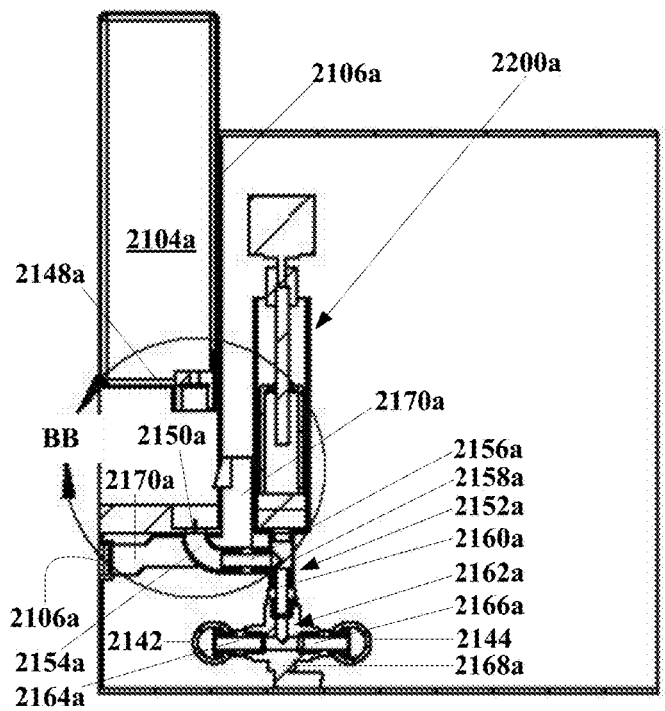
Figure 21H:
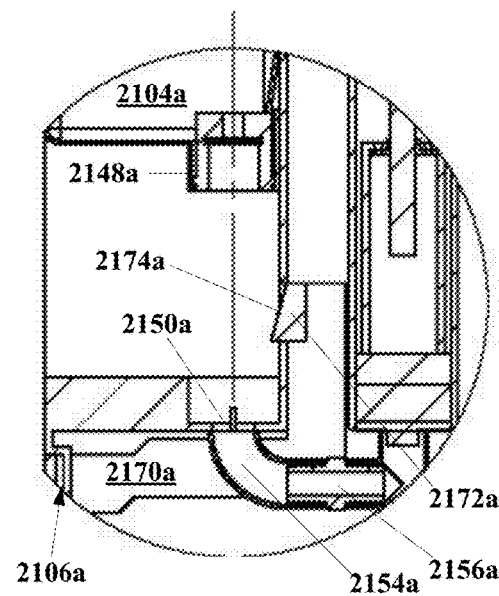

Looking at FIG. 21G, a view of the apparatus 2100 along cutting line A-A is shown and FIG. 21H shows an expanded view of the region AA. The view of FIG. 21D shows the interior 2130, the container 2104a being removed from its container slot 2106a, the injector assembly 2200a, the cold conduit 2142 and the hot water conduit 2144. The container 2104a includes the container fluid connector 2148c and its corresponding slot fluid connector 2150a. The apparatus 2100 also includes the fluid connecting conduit 2152a connecting the slot connector 2152a to the cold conduit 2142 and hot conduit 2144 and the injector assembly 2200a. The connecting conduit 2152a includes a curved section 2154c ending in a curved section check valve 2156a, a straight section 2158a including a straight section check valve 2160a, and a T 2162a including a cold water check valve 2164a and a hot water check valve 2166a. The T 2164a also includes a control valve 2168a for directing fluid flow into either the cold conduit 2140, hot conduit 2142 or both. The release button 2108a includes a release arm 2170a having a locking end 2172a. The container receiving slot 2106a includes a locking end receiving slots 2174a.

Referring to FIGS. 22A-C, several views of the injector or pump assemblies 2200a-c shown. Each of the injector or pump assemblies 2200a-c includes a motor 2202 including a motor shaft 2204. Each of the injector or pump assemblies 2204a-c also includes a syringe injector 2206. The syringe injector 2206 includes a threaded syringe shaft 2208, which is rotationally connected to the motor shaft 2204 via a collar 2210. Each of the injector or pump assemblies 2210a-c also includes a syringe plunger 2212. The plunger 2212 includes a plunger slide attachment 2214 and a threaded plunger slide 2216 disposed on a top 2218 of the plunger 2212 and a plunger pad 2220 disposed on a bottom 2222 of the plunger 2212.

The injector or pump assemblies 2200a-c operate by pulling fluid from the containers 2104a-c through the curved conduit sections 2154a-c of the connecting conduits 2150a-c, where the curved section check valves 2156a-c permit fluid flow in a forward direction and stops back flow. The pulling of the fluid is caused by upward motion of the syringe plunger 2212 due to the motor 2202 rotating the threaded plunger shaft 2208 raising the plunger 2212. Once a desired amount of fluid pulled into the syringe injector 2206, the motor 2202 reverses direction and pushes the fluid in the syringe injector 2206 through the straight section 2158 through the straight section check valve 2160 through either the cold water check valve 2164, the hot water check valve 2166 or both of the T 2162 and into either the cold water conduit 2142, the hot water conduit 2144 or both based on the control valve 2168 setting. Again, the check valves 2156, 2160, 2164, and 2166 all allow fluid flow only in the forward direction and stop back flow.

While the injector or pump assemblies 2200a-c are shown here as syringe injectors 2206 operated by a rotary motor, the injector or pump assemblies 2200a-c may be any the of injector or pump assembly that draws fluid from the container 2104a-c and injects the fluid into the cold conduit 2142, the hot conduit 2144, or both in a controlled manner. Other injector or pump assemblies 2200a-c may be based on centrifugal pumps, diaphragm pumps, gear pumps, peristaltic pumps, lobe pumps, piston pumps, or any other type of pump or fluid or liquid injector assembly.

Electronics Included in the Apparatuses of FIGS. 21 and 22

Referring now to FIG. 23, the electronics including with the apparatuses of FIGS. 21 and 22, generally 2300, is shown to include a power supply 2302, a processing unit or a microprocessing unit 2304, a touch screen 2306, a concierge button 2308, USB ports 2310, injector motors 2312, and control valves 2314. The power supply 2302 provides power to the processing unit or the microprocessing unit 2302, the touch screen 2306, the concierge button 2308, the USB ports 2310, injector motors 2312 (which may be pumps), and the control valves 2314 via power supply lines 2316. The processing unit or the microprocessing unit 2304 is in bi-direction communication with the touch screen 2306, the concierge button 2308, the USB ports 2310, injector motors 2312 (which may be pumps), and the control valves 2314 via communication links 2318.

The Apparatuses of FIGS. 21 and 22 Attached to a Washing Machine

Referring now to FIGS. 24A&B, a front and back view of an embodiment of a washing machine apparatus, generally 2400, is shown to include a washing machine 2402 having a washing machine control panel 2404 for controlling the washing machine (controls not shown), and a door 2406 having a handle 2408. The apparatus 2400 also includes a fluid dispensing unit 2410. The fluid dispensing unit 2410 includes three substantially rectangular solid fluid/liquid containers 2412a-c, three container receiving slot 2414a-c, and three container release buttons 2416a-c.

The fluid dispensing unit 2410 includes a touch screen 2418, a concierge button 2420, and one or more USB ports 2422, all in communication with a processor (not shown) including an operating system, memory, peripheral ports, and communication hardware and software described in FIG. 23.

The fluid dispensing unit 2410 also includes a cold water conduit 2424 having a cold water conduit inlet fitting 2426 and a cold water conduit outlet fitting 2428 and a hot water conduit 2430 having a hot water conduit inlet fitting 2432 and a hot water conduit outlet fitting 2434.

The fluid dispensing unit 2410 also includes three fluid injection assemblies 2436a-c for introducing the fluids from the three containers 2412a-c into either the cold water conduit 2424 and/or the hot water conduit 2430 as described above.

The apparatus 2400 also includes a cold water supply line 2438 having a cold water supply line fitting 2440 engaging the right cold water inlet fitting 2426 and a hot water supply line 2442 having a hot water supply line fitting 2444 engaging the right hot water inlet fitting 2432.

The apparatus 2400 also includes a cold water transfer line 2446 having a cold water transfer line inlet fitting 2448 engaging the left cold water outlet fitting 2428 and a cold water transfer line outlet fitting 2450. The apparatus 2400 also includes a hot water transfer line 2452 having a hot water transfer line inlet fitting 2454 engaging the left hot water outlet fitting 2434 and a hot water transfer line outlet fitting 2456.

The apparatus 2400 also includes a washing machine cold water inlet fitting 2458 engaging the cold water transfer line outlet 2450 and a washing machine hot water inlet fitting 2460 engaging the hot water transfer line outlet 2456.

The Apparatuses of FIGS. 21 and 22 Integrated into a Washing Machine

Figure 25B:
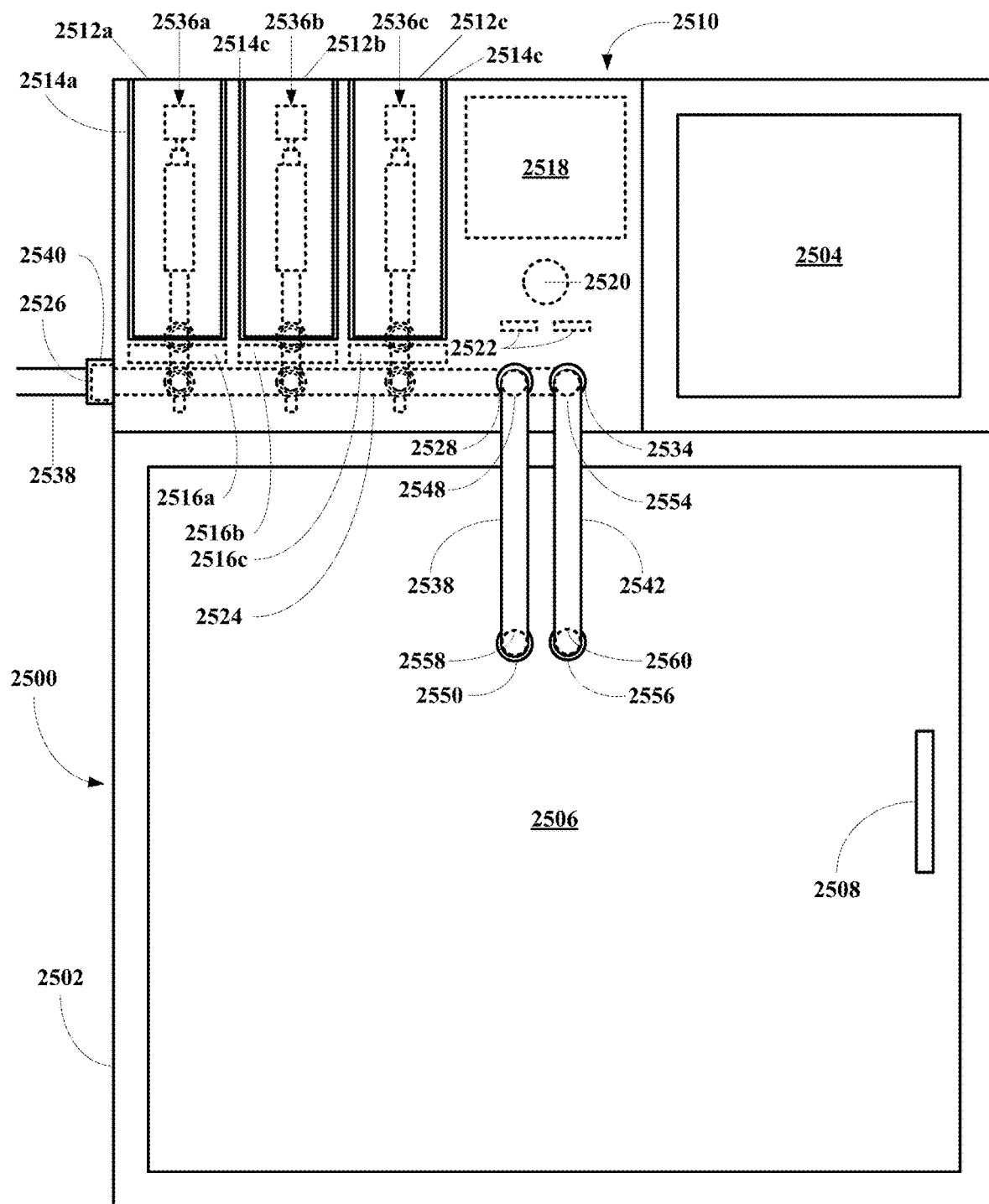

Referring now to FIG. 25, an embodiment of a washing machine apparatus, generally 2500, is shown to include a washing machine 2502 having a washing machine control panel 2504 for controlling the washing machine (controls not shown), a door 2506 having a handle 2508. The apparatus 2500 also includes a fluid dispensing unit 2510. The fluid dispensing unit 2510 includes three substantially rectangular solid fluid/liquid containers 2512a-c, three container receiving slot 2514a-c, and three container release buttons 2516a-c.

The fluid dispensing unit 2510 includes a touch screen 2518, a concierge button 2520, and one or more USB ports 2522, all in communication with a processor (not shown) including an operating system, memory, peripheral ports, and communication hardware and software described in FIG. 23.

The fluid dispensing unit 2510 also includes a cold water conduit 2524 having a cold water conduit inlet fitting 2526 and a cold water conduit outlet fitting 2528 and a hot water conduit 2530 having a hot water conduit inlet fitting 2532 and a hot water conduit outlet fitting 2534.

The fluid dispensing unit 2510 also includes three fluid injection assemblies 2536a-c for introducing the fluids from the three containers 2512a-c into either the cold water conduit 2524 and/or the hot water conduit 2530 as described above.

The apparatus 2500 also includes a cold water supply line 2538 having a cold water supply line fitting 2540 engaging the right cold water inlet fitting 2526 and a hot water supply line 2542 having a hot water supply line fitting 2544 engaging the right hot water inlet fitting 2532.

The apparatus 2500 also includes a cold water transfer line 2546 having a cold water transfer line inlet fitting 2548 engaging the left cold water outlet fitting 2528 and a cold water transfer line outlet fitting 2550. The apparatus 2500 also includes a hot water transfer line 2552 having a hot water transfer line inlet fitting 2554 engaging the left hot water outlet fitting 2534 and a hot water transfer line outlet fitting 2556.

The apparatus 2500 also includes a washing machine cold water inlet fitting 2558 engaging the cold water transfer line outlet 2550 and a washing machine hot water inlet fitting 2560 engaging the hot water transfer line outlet 2556.

In certain embodiments, the injection assemblies in any of the embodiments of FIGS. 21-25 may include a flow controller for monitoring fluid flow out of the pumps or injectors.

Pool Including Chemical Hub Apparatus

Referring now to FIG. 26, a pool 2600 including a circulating pump 2602 having a pump inlet 2604 and a pump outlet 2606, a filter 2608 having a filter inlet 2610 and a filter outlet 2612, and a PCH apparatus of this disclosure 2614 including a PCH inlet 2616 and a PCH outlet 2618.

The pool 2600 also includes a drain 2620 connected to a drain conduit 2622 and a pool skimmer 2624 connected to a skimmer conduit 2626. The drain conduit 2622 and the skimmer conduit 2626 are connected to a return conduit 2628.

The return conduit 2628 is connected to the pump inlet 2604. The pump outlet 2606 is connected to the filter inlet 2610 via a filter conduit 2630. The filter outlet 2612 is connected to the apparatus inlet 2616 via a PCH conduit 2632.

The pool 2600 also includes three pool returns 2634 (generally including a directional nozzle not shown). The returns 2632 are connected to the PCH outlet 2618 via a return conduit 2636.

The circulating pump 2602 circulates pool water from the pool 2600 through the skimmer 2624 and/or the drain 2620 to the filter 2608, from the filter 2608 to the apparatus 2614, where the water is tested and if necessary one or more pool chemicals are introduced into the water, and from the apparatus 2614 through the return conduit 2636 and out of the returns 2632.

Embodiments of a Pool Chemical Hub (PCH) Apparatus

FIGS. 27A-C depict embodiments of PCH apparatuses of this disclosure.

Looking at FIGS. 27A, a PCH apparatus, generally 2700, is shown to include a slab 2702 having slab threaded holes 2704 and a base 2706 having apertures 2708 and threaded bolts 2710 to engage the threaded slab holes 2704 securing the base 2706 to the slab 2702. The base 2706 also includes a water inlet lower portion 2712, a water outlet lower portion 2714, and base connectors 2716.

The PCH apparatus 2700 also includes a cover 2718 having cover connectors 2720 adapted to engage the base connectors 2716 to secure the cover 2718 to the base 2706. The base connectors 2716 and the cover connectors 2720 may be any type of connectors such as latch type connectors, spring connectors, wingnut connectors, snap connectors, or any other type of detachable connector. The cover 2718 also includes an inlet upper portion 2722 and an outlet upper portion 2724, wherein the inlet lower portion 2712 and the inlet upper portion 2722 hold an apparatus water inlet 2726 and the outlet lower portion 2714 and the outlet upper portion 2724 hold an apparatus water outlet 2728.

In certain embodiments, the base 2706 may also include a base groove 2730 and the cover 2718 may include a cover tongue 2732 adapted to engage the base groove 2722, which may obviate the need for the base and cover connectors 2716 and 2720, respectively.

Looking at FIG. 27B, a 3D perspective rendering of the PCH apparatus of FIG. 27A is shown.

Looking at FIG. 27C, the apparatus 2700 of Figure FIG. 27A is shown in an exploded perspective view showing all internal components housed within the cover 2718 and supported by the base 2706 and the slab 2702. The PCH apparatus 2700 includes the slab 2702, the treaded slab holes 2704 and the base 2706 having the lower inlet portion 2712 and the lower outlet portion 2714.

The PCH apparatus 2700 also includes a chemical testing and introduction assembly 2800. The assembly 2800 includes the apparatus water inlet 2726, the water outlet 2728, a water conduit 2802 having a chemical input ports 2804, and a test loop conduit 2806 having control valves 2808a&b and chemical sensors 2810.

The PCH apparatus 2700 also includes a control unit 2900 includes a power cable inlet 2902, a power cable 2904 having a plug 2906 (not shown), power supply ports 2908, and control ports 2910 described more fully herein.

The PCH apparatus 2700 also includes a container support assembly 3000 including a platform assembly base 3002 having legs 3004, a first container support member 3006 having a first container outlet aperture portion 3008 and a second container support member 3010 having a second container outlet aperture portion 3012, wherein the first and second conduit portions 3008 and 3012 combine to form an assembly outlet aperture 3014. The container support assembly 3000 also includes swivel members 3016 that allow the first and second container support members 3006 and 3010 to swivel outward to facilitate container replacement.

The PCH apparatus 2700 also includes six containers 3100, each of the containers 3100 includes an outlet 3102 and an outlet conduit 3104 (not shown), but shown and described more completely herein.

The PCH apparatuses operate in that the processing unit is configured to periodically open the control valves of the chemical testing and introduction assembly so that pool water flow into the test loop for a time sufficient for the test loop to be flushed of old pool water. Once the test loop has been flushed of old pool water, the processing unit is configured to close the control valves of the of the chemical testing and introduction assembly so that the new pool water in trapped in the test loop. Once the control valves have been closed and a sufficient time has elapsed so that the water in the test loop is still, the processing unit is further configured to activate the sensors and receive data from the sensors. The processing unit is further configured to compare the sensor data to pool chemical values stored in the processing units memory. The series of task is sometimes referred to as a test cycle. If each of the pool chemical values are within acceptable ranges for each of the pool chemical values, then the processing unit is configured to performs no further action until the next test cycle. If one or more of the pool chemical values fall outside of their acceptable ranges, then the processing unit is further configured to activate the pumps associated with the chemicals need to adjust the pool water and introduce an amount of the needed chemicals at a desired rate into the recirculating pool water. The test cycles and chemical introduction is performed on a continued basis based on the periodicity of the test, which may be set by the user. Generally, the test loop purge time is between about 30 seconds and about 5 minutes, the settle time is between about 30 seconds and about 5 minutes, and the test cycle time is between about 30 minutes and 7 days. In other embodiments, the test loop purge time is between about 1 minute and about 5 minutes, the settle time is between about 30 seconds and about 2.5 minutes, and the test cycle time is between about 4 hours and 7 days. In other embodiments, the test loop purge time is between about 1 minute and about 2.5 minutes, the settle time is between about 30 seconds and about 1 minutes, and the test cycle time is between about 8 hours and 7 days. In other embodiments, the test loop purge time is between about 1 minute and about 2 minutes, the settle time is between about 30 seconds and about 1 minutes, and the test cycle time is between about 1 day and 7 days. While specific ranges are set forth, the ranges include the endpoint values and all subranges. Thus the range between 30 seconds and 5 minutes includes all ranges between 30 seconds and 5 minutes and the same is true for all other ranges.

Embodiments of the Chemical Testing and Introduction Assembly

Looking at FIG. 28A, an embodiment of the chemical testing and introduction assembly 2800 is shown to include the water conduit 2802, the chemical ports 2804, the test loop conduit 2806, the control valves 2808a&b and chemical sensors 2810.

The water conduit 2802 includes a first T joint or fitting 2812 having the water inlet 2726, a test loop outlet 2814, and a first water conduit section outlet 2816. The water conduit 2802 also includes a first water conduit section 2802a having a first water conduit section inlet 2818 and a first water conduit section outlet 2820. The water conduit 2802 also includes a second T joint or fitting 2822 having a first water conduit section inlet 2824, a test loop inlet 2826, and a second water conduit section outlet 2828. The water conduit 2802 also includes a second water conduit section 2802b having a second water conduit section inlet 2830, a first elbow 2832, a second elbow 2834, the chemical introduction ports 2804, a water outlet fitting 2836, and the water outlet 2728.

The test loop conduit 2806 including a test loop conduit inlet 2838, the test loop conduit inlet control valve 2808a, a first elbow joint or fitting 2840, six sensors ports 2842, a second elbow joint or fitting 2844, the test loop outlet control valve 2808b and a test loop outlet 2846. The test loop conduit 2806 also includes six sensor ports 2848, and six chemical sensor 2810 including control connectors 2850.

The assembly 2800 also includes six pumps 2852 having inlets 2854, outlets 2856, inlet connectors 2858 and outlet connectors 2860. The assembly 2800 also includes power cables 2862 and control unit communication cables 2864.

Looking at FIGS. 28B&C, another embodiment of the chemical testing and introduction assembly 2800 is shown to include the first T joint or fitting 2812 having the water inlet 2726, a test loop conduit outlet 2814, and a first conduit section outlet 2816. The first conduit section 2802a having the first conduit section inlet 2818 and the first conduit section outlet 2820. The second T joint or fitting 2822 having the first conduit section inlet 2824, the test loop conduit inlet 2826, and the second conduit section outlet 2828. The second conduit section 2802b includes the inlet 2830, the first elbow 2832, the second elbow 2834, the chemical introduction ports 2804, and the water outlet 2728.

The assembly 2800 also includes the test loop conduit 2806 including a test loop conduit inlet 2838, the test loop inlet control valve 2808a, the first elbow joint or fitting 2840, five sensors ports 2842, the second elbow joint or fitting 2844, the test loop outlet control valve 2808b, the test loop outlet 2846, five chemical sensor ports 2848, and five chemical sensors 2810. The conduit section 2802b also includes the chemical input ports 2804.

Embodiments of the Control Unit

Figure 29A:
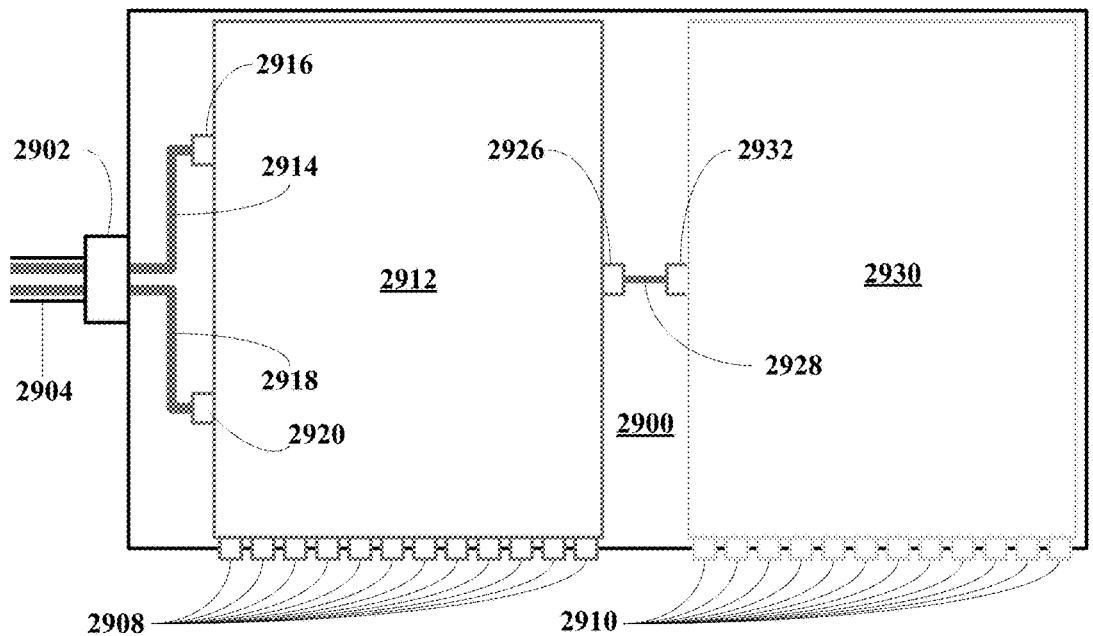

Looking at FIGS. 29A&B, two embodiments of the control unit 2900 is shown to include the power cable inlet 2902, the power cable 2904, the power supply ports 2908, and the control ports 2910.

The control unit 2900 further includes a power supply 2912. The power supply 2912 includes a positive power supply conductor 2914 having a positive power supply connector 2916 and a negative power supply conductor 2918 having a negative power supply connector 2920. The power supply 2912 also includes a processing unit outlet connector 2926 and a processing unit power cable 2928.

The control unit 2900 also includes a processing unit 2930 including a power inlet connector 2932.

Figure 29B:
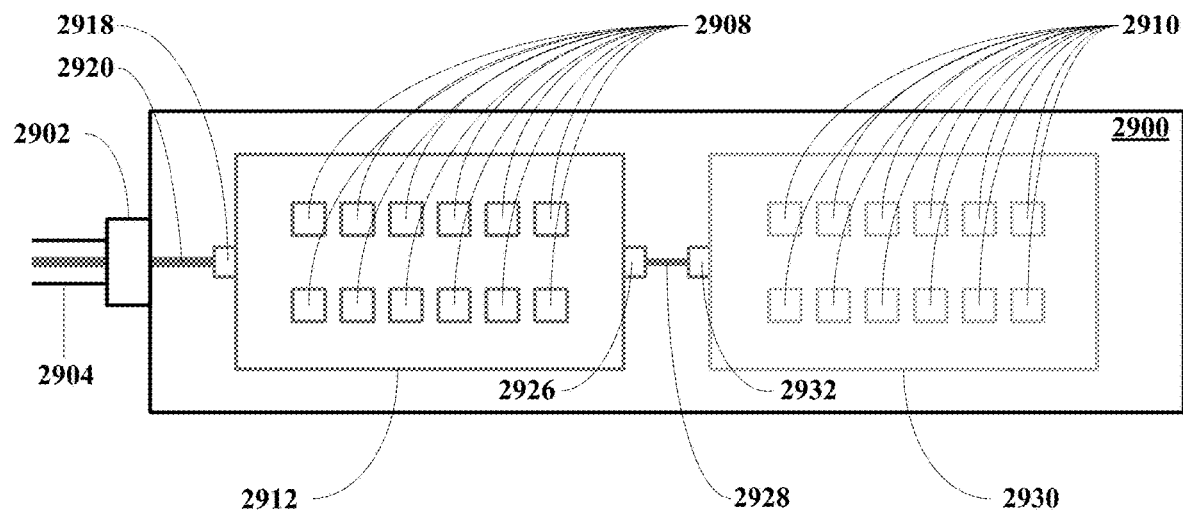

Looking at FIGS. 29B, the power supply ports 2908 and the control ports 2910 are shown in a different configuration. Of course, it should be recognized that the power supply ports 2908 and the control ports 2910 may be arranged in any configuration and may be distributed on the sides or bottom and top depending on space and cabling requirements.

Figure 29C:
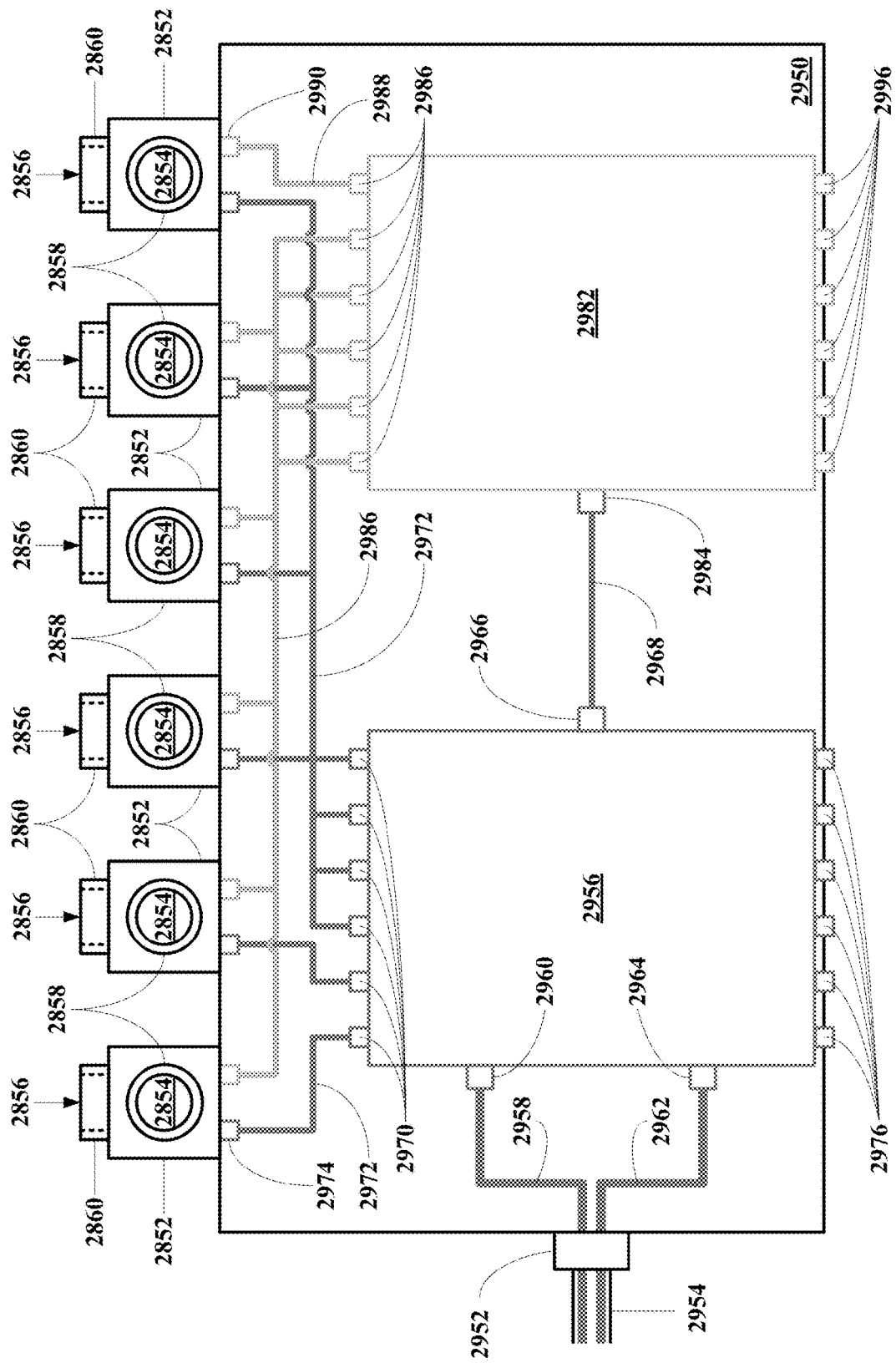

Looking at FIG. 29C, another embodiment of the control unit 2950 is shown to include the power cable inlet 2952 and the power cable 2954.

The control unit 2950 also includes a power supply 2956. The power supply 2956 includes a positive power supply conductor 2958 having a positive power supply connector 2960 and a negative power supply conductor 2962 having a negative power supply connector 2964. The power supply 2956 also includes a processing unit outlet connector 2966 and a processing unit power cable 2968. The power supply 2956 also includes pump power supply outlet connectors 2970, pump power supply cables 2972, and pump power supply inlet connectors 2974. The power supply 2956 also includes sensor outlet connectors 2976.

The control unit 2950 also includes a processing unit 2982 including a power inlet connector 2984. The processing unit 2982 also includes pump control outlet connectors 2986, and pump control cables 2988, and pump control inlet connectors 2990. The processing unit 2982 also includes sensor control outlet connectors 2996.

The control unit 2950 also includes the pumps 2852 including the inlet 2860, the inlet connector 2862, the outlet 2864, and the outlet connector 2866. The pump power supply inlet connectors 2974 and the pump control inlet connectors 2990 are integrated into the pumps 2858.

Figure 29D:
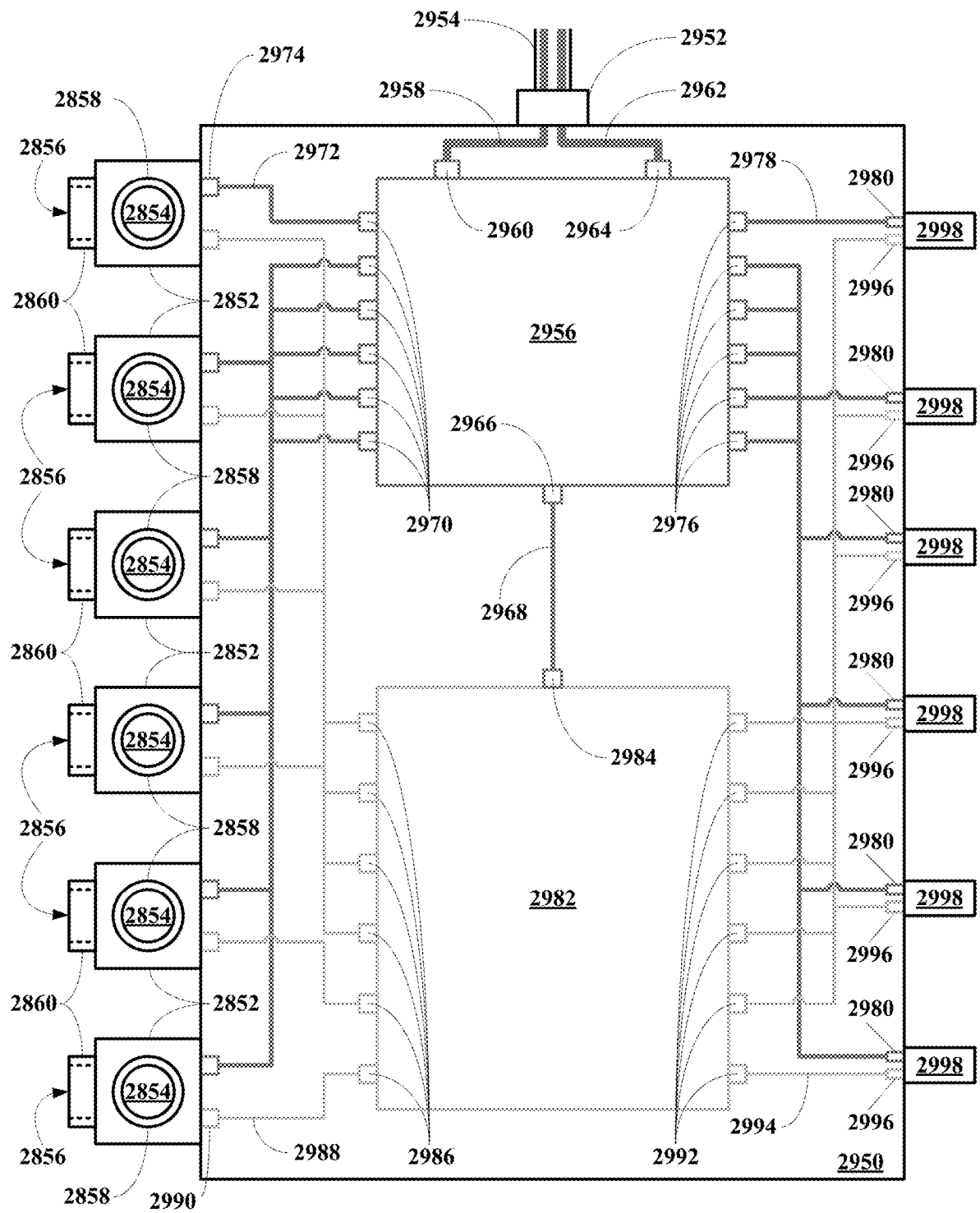

Looking at FIGS. 29D, another embodiment of the control unit 2950 is shown to include the power cable inlet 2952 and the power cable 2954.

The control unit 2950 also includes a power supply 2956. The power supply 2956 includes a positive power supply conductor 2958 having a positive power supply connector 2960 and a negative power supply conductor 2962 having a negative power supply connector 2964. The power supply 2956 also includes a processing unit outlet connector 2966 and a processing unit power cable 2968. The power supply 2956 also includes pump power supply outlet connectors 2970, pump power supply cables 2972, and pump power supply inlet connectors 2974. The power supply 2956 also includes sensor power supply outlet connectors 2976, sensor power supply cables 2978, and sensor power supply inlets connectors 2980.

The control unit 2950 also includes a processing unit 2982 including a power inlet connector 2984. The processing unit 2982 also includes pump control outlet connectors 2986, pump control cables 2988, and pump control inlet connectors 2990. The processing unit 2982 also includes sensor control unit outlet connectors 2992, sensor control unit cable 2994, and sensor control unit inlet connectors 2996.

The control unit 2950 also includes the pumps 2858 including the inlet 2860, the inlet connector 2862, the outlet 2864, and the outlet connector 2866. The pump power supply inlet connectors 2974 and the pump control inlet connectors 2990 are integrated into the pumps 2858. The control unit 2950 also includes sensor outlet connectors 2998 that are integrated with the sensor power supply inlets connectors 2980 and the sensor control unit inlet connectors 2996, wherein the connectors 2998 are adapted to connect to a sensor cable that provides both power from the power supply 2956 and control communication with the processing unit 2982. It should be recognized that the control cable provide two way communication pathways between the pumps and the processing unit and between the sensors and the processing unit for controlling the amount and rate of fluid introduction into recirculating pool water.

Embodiments of the Container Support Assembly

Figure 30A:
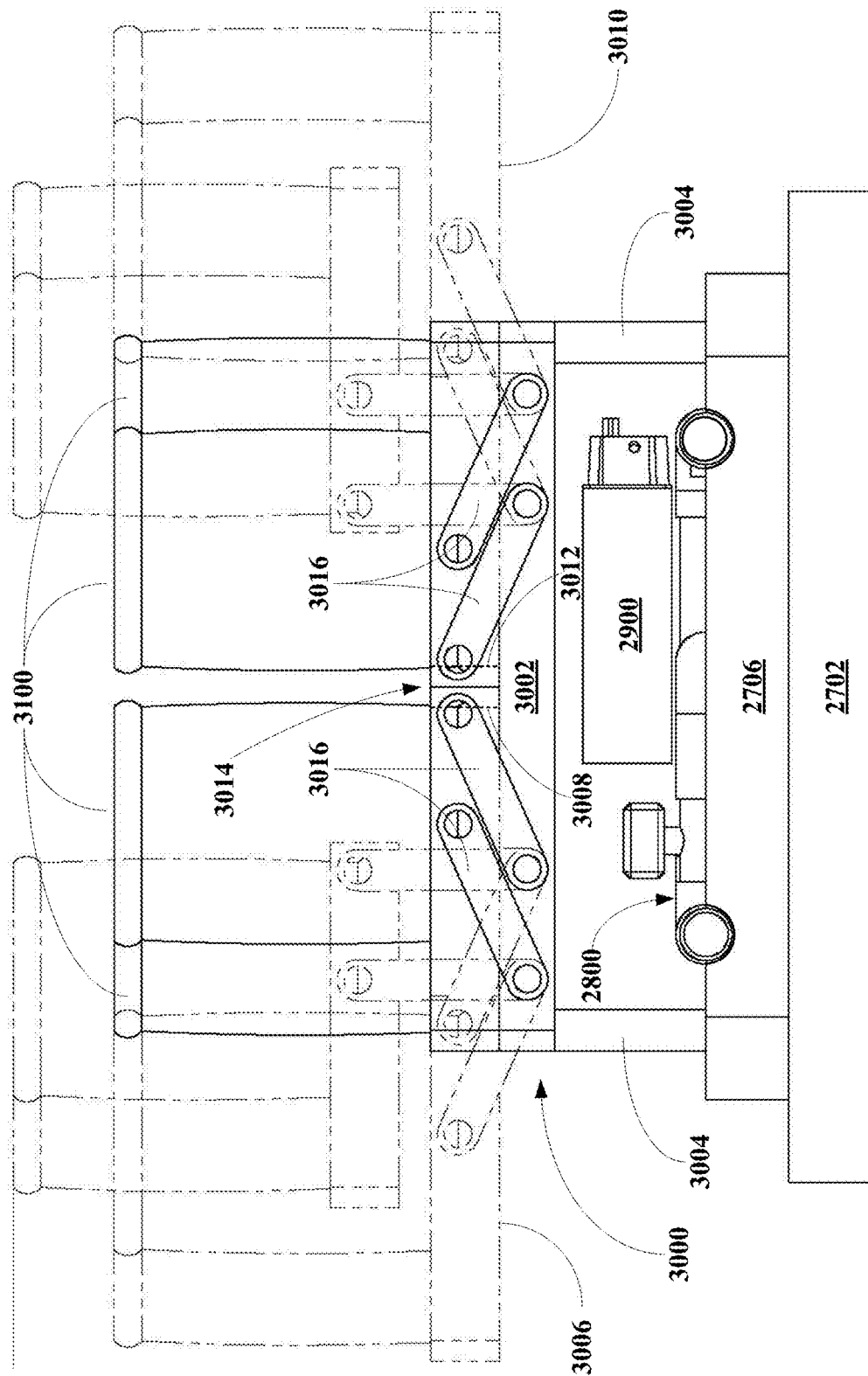

Looking at FIG. 30A, the container support assembly 3000 is shown to include the platform assembly base 3002 having legs 3004, the first container support member 3006 having the first container outlet aperture portion 3008 and the second container support member 3010 having the second container outlet aperture portion 3012, wherein the first and second conduit portions 3008 and 3012 combine to form the assembly outlet aperture 3014. The container support assembly 3000 also includes the swivel members 3016 that allow the first and second container support members 3006 and 3010 to swivel outward to facilitate container replacement.

Figure 30B:
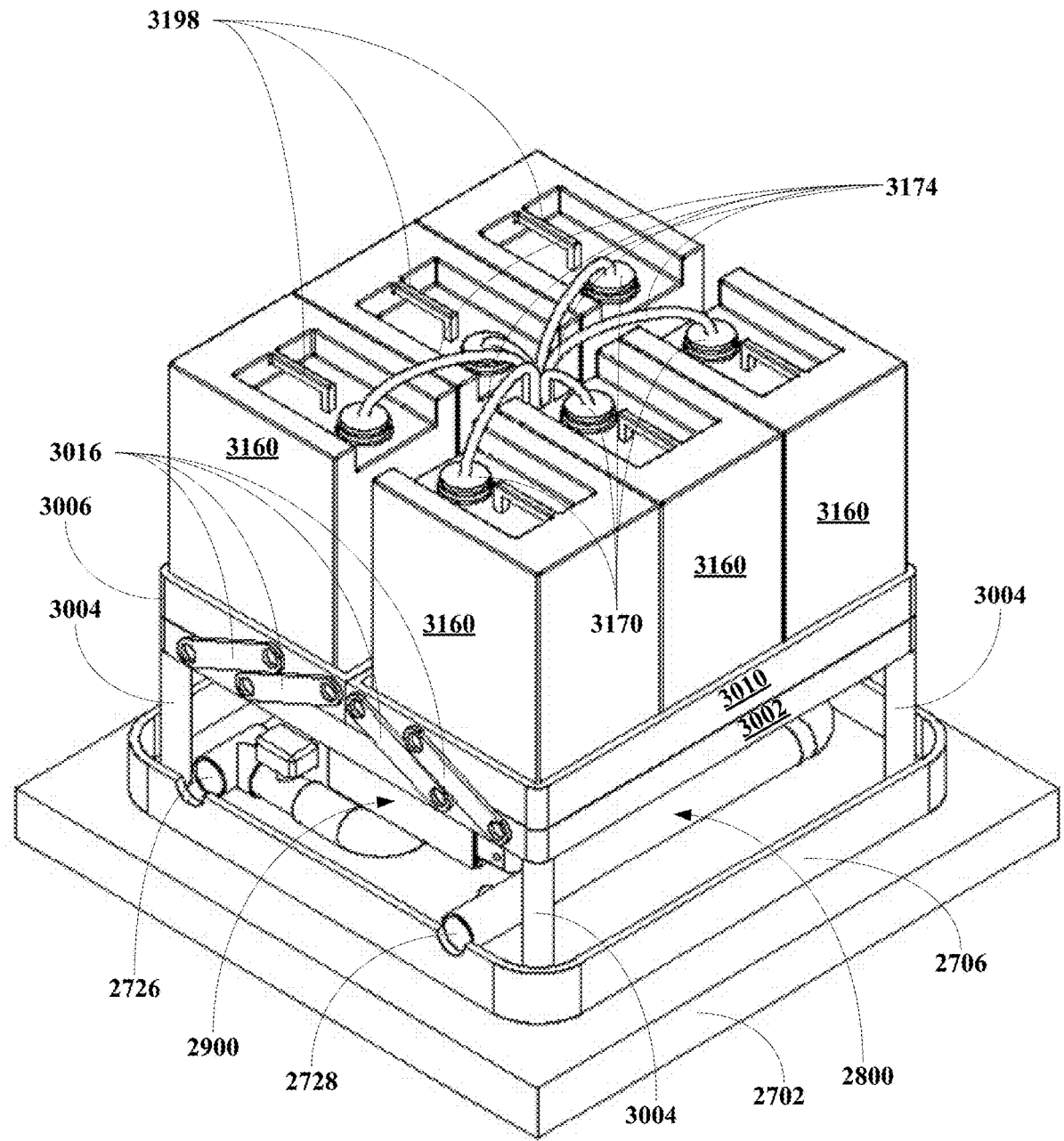

Looking at FIGS. 30B, the container support assembly 3000 is shown to include the platform assembly base 3002 having legs 3004, the first container support member 3006 having the first container outlet aperture portion 3008 and the second container support member 3010 having the second container outlet aperture portion 3012, wherein the first and second conduit portions 3008 and 3012 combine to form the assembly outlet aperture 3014. The container support assembly 3000 also includes the swivel members 3016 that allow the first and second container support members 3006 and 3010 to swivel outward to facilitate container replacement. This embodiment includes the containers of FIG. 31C described below.

Figure 30C:
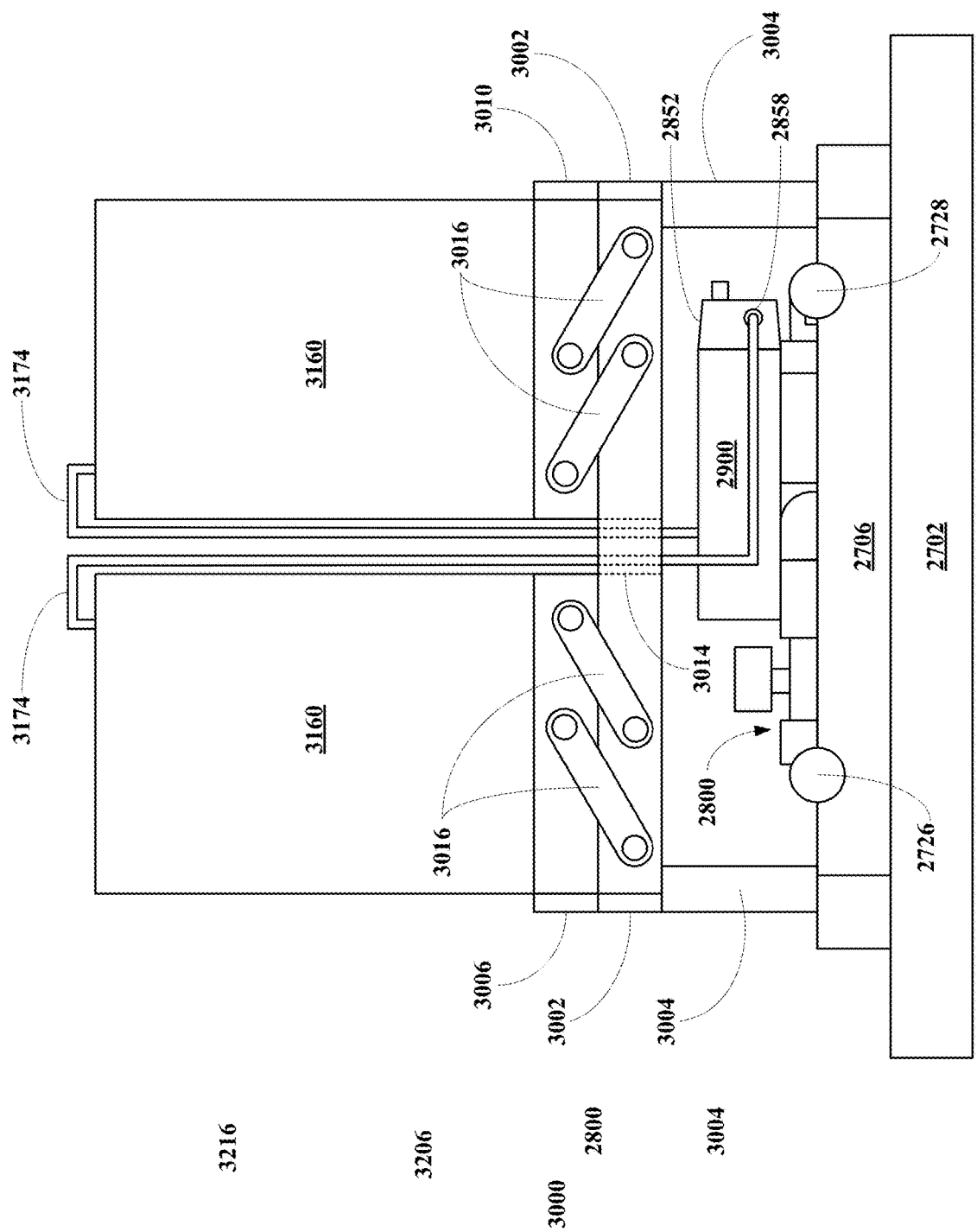

Looking at FIGS. 30C, the container support assembly 3000 of FIG. 30A is shown in its collapsed state.

Figure 30D:
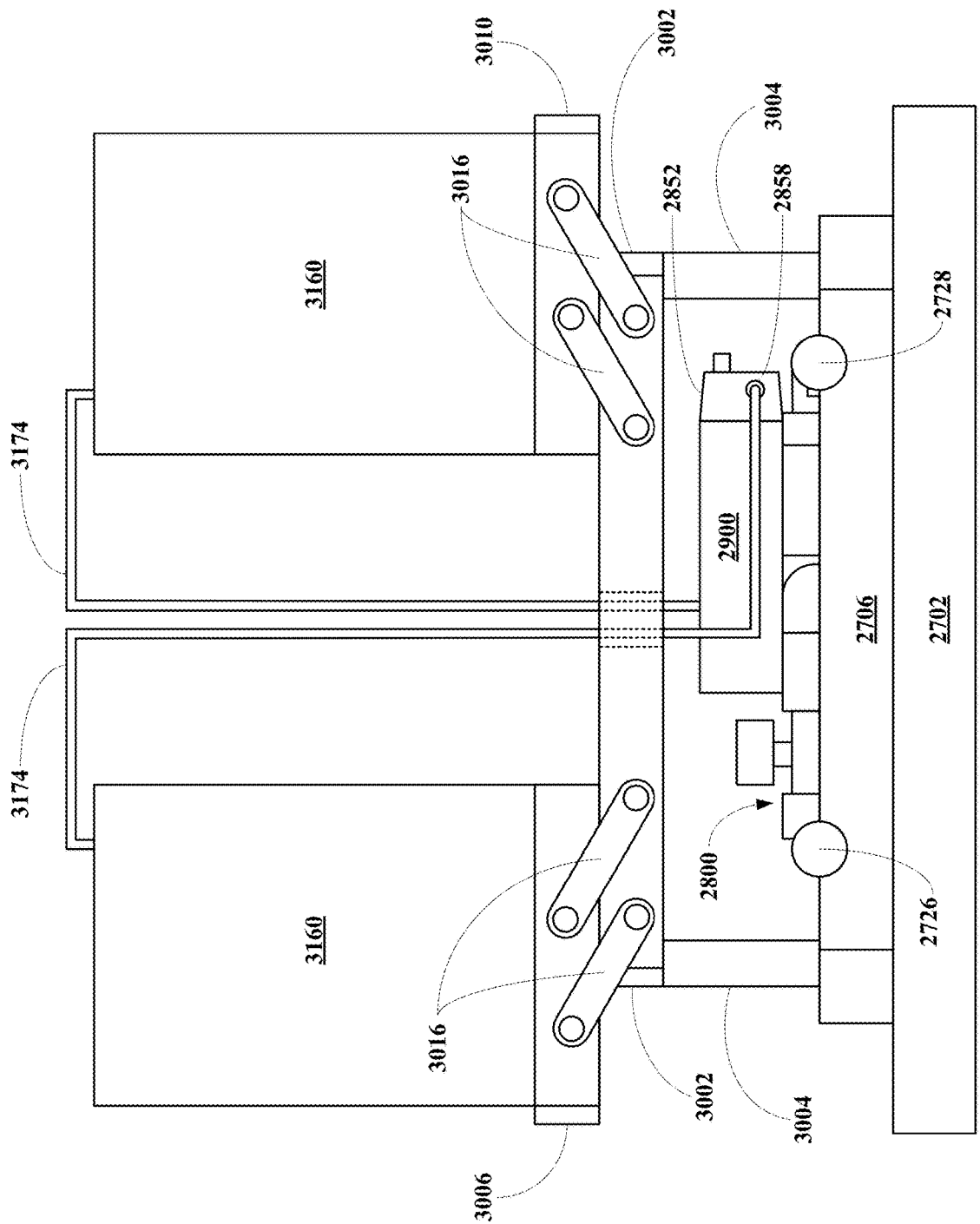

Looking at FIGS. 30D, the container support assembly 3000 of FIG. 30A shown in its expanded state.

Embodiments of the Containers

Looking at FIG. 31A, a first embodiment of a container 3100 is shown to include a top 3102, a bottom 3104, a side wall 3106, an inlet 3108, and an inlet cap 3110. The container 3100 also includes an outlet 3112, an outlet connector 3114, and a container conduit 3116 having a container conduit proximal end connector 3118 and a container conduit distal end connector 3120. The distal end connector 3120 is adapted to engage one of the pump inlets 2854.

Looking at FIG. 31B, a second embodiment of a container 3130 is shown to include a top 3132, a bottom 3134, a side wall 3136, an inlet 3138, and an inlet cap 3140. The container 3130 also includes an outlet 3142, an outlet connector 3144, a base 3146, a base aperture 3148, a container conduit 3150 having a container conduit proximal end connector 3152 and a container conduit distal end connector 3154. The distal end connector 3154 is adapted to engage one of the pump inlets 2854.

Looking at FIG. 31C, a third embodiment of a container 3160 is shown to include a top 3162, a bottom 3164, a side wall 3166, an inlet 3168, and an inlet cap 3170 having a conduit aperture 3172. The container 3160 also includes a container conduit 3174 having a proximal end 3176 and a distal end connector 3178. The container 3160 is shown partially filled with a fluid 3180 having a fluid level 3182. The proximal end 3176 of the container conduit 3174 is designed to be inserted through or integral with the cap 3170 and disposed within the fluid 3180 near the bottom 3164 of the container 3160, wherein the term near means with about 1 inch of the bottom 3164 or within about 0.75 inches of the bottom 3164 or within about 0.5 of the bottom 3164 or within about 0.25 of the bottom 3164 or within about 0.1 of the bottom 3164 or where in a tip 3177 is in contact with the bottom 3164. The container 3160 also includes a fluid level sensor 3184 including a sensor float 3186, a sensor arm 3188, a power inlet connector 3190, a power supply cable 3192, a control inlet connector 3194, and a control cable 3196. The container 3160 also includes a handle 3198. The distal end connectors 3178 is adapted to engage one of the pump inlets 2854. It should be recognized that the fluid level sensor may be any type of fluid level sensor including an optical sensor, a sonic sensor, or any other type of sensor that can detect a fluid level in a container. It should also be recognized that the conduits herein may be rigid tubing or flexible tubing depending on design criteria.

Closing

All references cited herein are incorporated by reference. Although the disclosure has been disclosed with reference to its preferred embodiments, from reading this description those of skill in the art may appreciate changes and modification that may be made which do not depart from the scope and spirit of the disclosure as described above and claimed hereafter.

The invention claimed is:

1. An apparatus comprising:
one or more removable fluid containers, each of the one or more removable fluid containers includes:
a container fluid outlet;
a cold water conduit including:
a cold water inlet adapted to engage a cold water supply line,
a cold water outlet adapted to engage a washing machine cold water inlet, and
one or more cold water conduit fluid introduction ports distributed at locations along a length of the cold water conduit;
a hot water conduit including:
a hot water inlet adapted to engage a hot water supply line,
a hot water outlet adapted to engage a washing machine hot water inlet, and
one or more hot water conduit fluid introduction ports distributed at equivalent locations along a length of the hot water conduit relative to the one or more cold water conduit fluid introduction ports;
one or more fluid injection assemblies, each of the one or more fluid injection assemblies includes:
a fluid injector including:
an injector inlet, and
an injector outlet,
a fluid conduit assembly including:
a fluid conduit assembly inlet conduit having:
an inlet adapted to engage one of the removable container fluid outlets, and
an outlet adapted to engage the injector inlet,
a fluid conduit assembly outlet conduit having:
an inlet adapted to engage the injector outlet,
a cold water outlet adapted to engage one of the cold water conduit fluid introduction ports, and
a hot water outlet adapted to engage one of the hot water conduit fluid introduction ports; and
a control assembly including:
a power supply,
a processing unit or a microprocessing unit,
one or more output devices, and
one or more input devices,
wherein:
the power supply supplies power to the processing unit or the microprocessing unit, the one or more output devices, the one or more input devices, and the one or more fluid injection assemblies,
the processing unit or the microprocessing unit is in communication with the one or more input devices, the one or more output devices, and the one or more fluid injection assemblies, and
the control assembly controls a fluid flow rate of fluid from each of the one or more removable fluid containers into the one or more cold water conduit fluid introduction ports, into the one or more hot water conduit fluid introduction ports, or into both the one or more cold water conduit fluid introduction ports, and the one or more hot water conduit fluid introduction ports.

2. The apparatus of claim 1, wherein the control assembly further includes:
concierge button, and
one or more USB ports, and
wherein:
the one or more input devices are selected from the group consisting of a touch screen, a microphone, a remote control device, and combinations thereof, and the one or more output devices are selected from the group consisting of a touch screen, a display device, a speaker, a remote control device, and combinations thereof.

3. The apparatus of claim 1, wherein:
the inlet of the fluid conduit assembly of each of the one or more injection assemblies includes a check value,
the outlet of the fluid conduit assembly of each of the one or more injection assemblies includes a check value,
the cold water outlet of the fluid conduit assembly of each of the one or more injection assemblies includes a check value, and
the hot water outlet of the fluid conduit assembly of each of the one or more injection assemblies includes a check value.

4. The apparatus of claim 1, further comprising:
one or more container receiving slots, each of the one or more container receiving slots is adapted to receive one of the one or more removable fluid containers and
each of the one or more container receiving slots include:
a slot connector, and
a locking slot,
one or more container release buttons, each of the one or more container release buttons is associated with one of the one or more removable fluid containers receiving slots and
each of the one or more container release buttons include:
a release arm, and
a locking end adapted to engage the locking slot for disengaging the locking slot so that the associated container may be removed.

5. The apparatus of claim 1, wherein each of the one or more fluid injection assemblies comprises an electric pump.

6. The apparatus of claim 1, wherein each of the one or more fluid injection assemblies comprises:
an electric rotary motor including:
a motor shaft,
a collar,
a syringe injector including:
a threaded syringe shaft,
a syringe plunger having:
a top including:
a plunger slide attachment,
a plunger threaded slide,
a bottom including:
a plunger pad,
wherein:
the collar is adapted to couple the motor shaft and the threaded syringe shaft,
the power supply supplies the power to the electric rotary motor, and
the processing unit or the microprocessing unit is in communication with the electric rotary motor and controls the electric rotary motor.

7. The apparatus of claim 1, wherein:
the cold water outlet of the fluid conduit assembly outlet conduit of each of the one or more fluid injection assemblies includes a control valve adapted to control fluid flow into on of the one or more cold water conduit fluid introduction ports, and
the hot water outlet of the fluid conduit assembly outlet conduit of each of the one or more fluid injection assemblies includes a control valve adapted to control fluid flow into on of the one or more hot water conduit fluid introduction ports.

8. The apparatus of claim 7, wherein the control valve comprises:
a manual control valve, or
an electronic control valve adapted to receive the power from the power supply and to be controlled by the processing unit or the microprocessing unit.

9. An apparatus comprising:
a washing machine including:
a control panel,
a cold water inlet, and
a hot water inlet;
a laundry fluid dispensing apparatus comprising:
one or more removable fluid containers, each of the one or more removable fluid container includes:
a container fluid outlet;
a cold water conduit including:
a cold water inlet adapted to engage a cold water supply line,
a cold water outlet adapted to engage the washing machine cold water inlet, and
one or more cold water conduit fluid introduction ports distributed at locations along a length of the cold water conduit;
a hot water conduit including:
a hot water inlet adapted to engage a hot water supply line,
a hot water outlet to engage the washing machine hot water inlet, and
one or more hot water conduit fluid introduction ports distributed at equivalent locations along a length of the hot water conduit relative to the one or more cold water conduit fluid introduction ports;
one or more electromechanical fluid injection assemblies, each of the one or more electromechanical fluid injection assemblies includes:
an electromechanical fluid injector including:
an injector inlet, and
an injector outlet,
a fluid conduit assembly including:
a fluid conduit assembly inlet conduit having:
an inlet adapted to engage one of the removable container fluid outlets, and
an outlet adapted to engage the injector inlet,
a fluid conduit assembly outlet conduit having:
an inlet adapted to engage the injector outlet,
a cold water outlet adapted to engage one of the cold water conduit fluid introduction ports, and
a hot water outlet adapted to engage one of the hot water conduit fluid introduction ports; and
a control assembly including:
a power supply,
a processing unit or a microprocessing unit,
one or more output devices, and
one or more input devices,
wherein:
the power supply supplies power to the processing unit or the microprocessing unit,
the one or more output devices, the one or more input devices, and the one or more electrochemical fluid injection assemblies,
the processing unit or the microprocessing unit is in communication with the one or more input devices, the one or more output devices, and the one or more electrochemical fluid injection assemblies, and
the control assembly controls a fluid flow rate of fluid from each of the one or more removable fluid containers into the one or more cold water conduit fluid introduction ports, into the one or more hot water conduit fluid introduction ports, or into both the one or more cold water conduit fluid introduction ports, and into the one or more hot water conduit fluid introduction ports.

10. The apparatus of claim 9, wherein the control assembly further includes:
concierge button, and
one or more USB ports, and
wherein:
the one or more input devices are selected from the group consisting of a touch screen, a microphone, a remote control device, and combinations thereof, and the one or more output devices are selected from the group consisting of a touch screen, a display device, a speaker, a remote control device, and combinations thereof.

11. The apparatus of claim 9, wherein:
the inlet of the fluid conduit assembly of each of the one or more injection assemblies includes a check value,
the outlet of the fluid conduit assembly of each of the one or more injection assemblies includes a check value,
the cold water outlet of the fluid conduit assembly of each of the one or more injection assemblies includes a check value, and
the hot water outlet of the fluid conduit assembly of each of the one or more injection assemblies includes a check value.

12. The apparatus of claim 9, further comprising:
one or more container receiving slots, each of the one or more container receiving slots is adapted to receive one of the one or more removable fluid containers and each of the one or more container receiving slots includes:
a slot connector, and
a locking slot,
one or more container release buttons, each of the one or more container release buttons is associated with one of the one or more container receiving slots and each of the one or more container release buttons includes:
a release arm, and
a locking end adapted to engage the locking slot for disengaging the locking slot so that the associated container may be removed.

13. The apparatus of claim 9, wherein each of the one or more fluid injection assemblies comprises an electric pump.

14. The apparatus of claim 9, wherein each of the one or more fluid injection assemblies comprises:
an electric rotary motor including:
a motor shaft,
a collar,
a syringe injector including:
a threaded syringe shaft,
a syringe plunger having:
a top including:
a plunger slide attachment,
a plunger threaded slide,
a bottom including:
a plunger pad,
wherein:
the collar is adapted to couple the motor shaft and the threaded syringe shaft,
the power supply supplies the power to the electric rotary motor, and
the processing unit or the microprocessing unit is in communication with the electric rotary motor and controls the electric rotary motor.

15. The apparatus of claim 9, wherein each of the one or more electromechanical fluid injection assemblies, further includes:
the cold water outlet of the fluid conduit assembly outlet conduit of each of the one or more fluid injection assemblies includes a control valve adapted to control fluid flow into on of the one or more cold water conduit fluid introduction ports, and
the hot water outlet of the fluid conduit assembly outlet conduit of each of the one or more fluid injection assemblies includes a control valve adapted to control fluid flow into on of the one or more hot water conduit fluid introduction ports.

16. The apparatus of claim 15, wherein the control valve comprises:
a manual control valve, or
an electronic control valve adapted to receive the power from the power supply and to be controlled by the processing unit or the microprocessing unit.

* * * * *